United States Patent
Cho et al.

(10) Patent No.: US 12,542,169 B2
(45) Date of Patent: Feb. 3, 2026

(54) DEVICE, OPERATING METHOD, MEMORY DEVICE, AND CXL MEMORY EXPANSION DEVICE

(71) Applicant: Samsung Electronics Co., Ltd., Suwon-si (KR)

(72) Inventors: Sunghye Cho, Suwon-si (KR); Eunae Lee, Suwon-si (KR); Jungmin You, Suwon-si (KR); Yeonggeol Song, Suwon-si (KR); Kyomin Sohn, Suwon-si (KR); Kijun Lee, Suwon-si (KR); Myungkyu Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 18/470,471

(22) Filed: Sep. 20, 2023

(65) Prior Publication Data

US 2024/0096395 A1    Mar. 21, 2024

(30) Foreign Application Priority Data

Sep. 21, 2022  (KR) .................. 10-2022-0119545
Jan. 30, 2023  (KR) .................. 10-2023-0011865

(51) Int. Cl.
  *G11C 11/406*  (2006.01)
  *G11C 11/4078* (2006.01)

(52) U.S. Cl.
  CPC ... *G11C 11/40622* (2013.01); *G11C 11/40611* (2013.01); *G11C 11/4078* (2013.01)

(58) Field of Classification Search
  CPC ......... G11C 11/40622; G11C 11/40611; G11C 11/4078
  See application file for complete search history.

(56) References Cited

U.S. PATENT DOCUMENTS

| | | |
|---|---|---|
| 9,685,240 B1 | 6/2017 | Park |
| 9,892,779 B2 | 2/2018 | Kang et al. |
| 10,262,717 B2 | 4/2019 | Fisch et al. |
| 10,600,470 B2 | 3/2020 | Bang |
| 10,734,058 B2 | 8/2020 | Shim et al. |
| 10,916,293 B1 | 2/2021 | Lai et al. |
| 10,950,289 B2 | 3/2021 | Ito et al. |

(Continued)

FOREIGN PATENT DOCUMENTS

| | | |
|---|---|---|
| JP | 2022114622 A | 8/2022 |
| KR | 1020210158582 A | 12/2021 |

(Continued)

*Primary Examiner* — Min Huang
(74) *Attorney, Agent, or Firm* — Wolf, Greenfield & Sacks, P.C.

(57) ABSTRACT

A device, an operating method of a memory controller, a memory device, and a compute express link (CXL) memory expansion device all for managing a row hammer are provided. The device includes a volatile memory and a memory controller that is configured to detect, based on input row addresses, a pattern size of a row hammer attack pattern and a row distribution of row hammer addresses, to determine, according to a type of the row distribution, whether to perform refresh management, and for every L access corresponding to the pattern size, to provide, to the volatile memory, a refresh management command and a target row address, where L is an integer greater than or equal to 1.

20 Claims, 43 Drawing Sheets

(56) References Cited

U.S. PATENT DOCUMENTS

| | | | |
|---|---|---|---|
| 10,950,292 B1 | 3/2021 | Seyedzadehdelcheh et al. | |
| 11,087,821 B2* | 8/2021 | Son | G11C 11/4085 |
| 11,158,364 B2 | 10/2021 | Penney et al. | |
| 11,354,408 B2 | 6/2022 | Ghosh et al. | |
| 11,468,936 B2 | 10/2022 | Lim | |
| 11,631,448 B1 | 4/2023 | Lee et al. | |
| 2020/0341847 A1* | 10/2020 | Boehm | G11C 29/52 |
| 2021/0117320 A1* | 4/2021 | Mahesh | G06F 11/1076 |
| 2022/0113868 A1 | 4/2022 | Cowles et al. | |
| 2022/0199144 A1 | 6/2022 | Roberts | |
| 2022/0246201 A1 | 8/2022 | Kim et al. | |
| 2024/0096391 A1* | 3/2024 | Cho | G11C 11/40622 |

FOREIGN PATENT DOCUMENTS

| | | |
|---|---|---|
| KR | 102385443 B1 | 4/2022 |
| KR | 1020220111444 A | 8/2022 |
| KR | 1020230068232 A | 5/2023 |

* cited by examiner

FIG. 19

| ATTACK PATTERN | | NUMBER OF ROW | | | TRUE/FALSE | | | PATTERN SIZE (ESTIMATION) | PATTERN SIZE (OUTPUT) |
|---|---|---|---|---|---|---|---|---|---|
| APS | RH# | L = 500 | L = 1000 | L = 1500 | L = 500 | L = 1000 | L = 1500 | | |
| 200 | A | A | A | A | TRUE | TRUE | TRUE | 0 ~ 500 | 500 |
| 800 | B | ≠ B | B | B | FALSE | TRUE | TRUE | 500 ~ 1000 | 1000 |
| 1200 | C | ≠ C | ≠ C | C | FALSE | FALSE | TRUE | 1000 ~ 1500 | 1500 |
| 3000 | D | ≠ D | ≠ D | ≠ D | FALSE | FALSE | TRUE | 1000 ~ 1500 | 1500 |

DEVICE, OPERATING METHOD, MEMORY DEVICE, AND CXL MEMORY EXPANSION DEVICE

REFERENCE TO PRIORITY APPLICATION

This application claims priority under 35 U.S.C. § 119 to Korean Patent Application Nos. 10-2022-0119545 and 10-2023-0011865, respectively filed on Sep. 21, 2022, and Jan. 30, 2023, in the Korean Intellectual Property Office, the disclosures of which are incorporated by reference herein in their entireties.

BACKGROUND

1. Field

The inventive concept relates to an electronic device, more particularly, to an integrated circuit memory device for managing a row hammer address and an operating method thereof, and more particularly, to a device, an operating method of a memory controller, a memory device, and a compute express link (CXL) memory expansion device for managing a row hammer address.

2. Description of Related Art

Systems using semiconductor chips widely use Dynamic Random Access Memory (DRAM) as an operating memory or a main memory of the systems. DRAM cell sizes are decreasing to increase DRAM capacity and density. Some DRAM-based systems may experience intermittent failures due to heavy workloads. These failures often can be traced by repeated accesses to a single row of memory cells, so-called row hammering. Repetitive access to a particular row may cause an increased rate of decay of adjacent rows (e.g., victim rows) due to parasitic electromagnetic coupling between the rows. Also, memory cells connected to victim rows may be disturbed, causing data corruption in which a bit value within a memory cell data is flipped.

To reduce row hammering, a DRAM may monitor row hammer addresses that are intensively accessed among access addresses for a certain period of time. The DRAM may store row hammer addresses in one or more registers and perform a refresh operation on a memory cell row physically adjacent to the memory cell rows corresponding to the row hammer addresses.

In general, DRAM uses registers (or latches) to control row hammer, and the number of row hammer addresses may be determined by the number of registers. However, the types of row hammer attacks are diverse, and if the number of row hammer addresses increases according to the type of row hammer attack, the number of registers in DRAM may also increase. However, there is a manufacturing limit with respect to significantly increasing the number of registers, and increasing the number of registers adversely affects DRAM density.

Accordingly, there is a need for memory devices and operating methods that defend against various types of row hammer attacks without increasing the number of registers.

SUMMARY

The inventive concept provides a memory device and an operation method thereof for managing various types of row hammer attacks and reducing the number of registers associated with row hammering, and provides a device, an operating method of a memory controller, a memory device, and a compute express link (CXL) memory expansion device, the device, the operating method, the memory device, and the CXL memory expansion device being used for estimating a pattern size of various row hammer attack patterns and adjusting a timing of a refresh operation according to the estimated pattern size.

Also, the inventive concept provides a memory device for reducing the number of registers and at the same time managing various row hammer attack types and an operating method of the memory device.

According to an aspect of the inventive concept, there is provided a memory device having a memory cell array therein, which includes a plurality of memory cell rows. A row hammer managing circuit is provided, which is configured to detect a row hammer address based on a pre row hammer address, and each of a plurality of input row addresses included in a plurality of accesses during a monitoring period for monitoring the plurality of accesses to the plurality of memory cell rows. The row hammer managing circuit is also configured to output the row hammer address in response to a refresh command, such as a refresh command provided by a host. A refresh control circuit is also provided, which is configured to perform a refresh operation on a memory cell row immediately physically adjacent to a memory cell row corresponding to the row hammer address.

According to another embodiment of the inventive concept, a method of operating a memory device is provided, which includes storing, in a second register, an input row address greater than a pre row hammer address among a plurality of input row addresses or a first minimum input row address among the plurality of input row addresses as a row hammer address, based on the plurality of input row addresses included in the plurality of accesses by a host and a pre row hammer address stored in a first register. A refresh operation is also performed on a memory cell row physically adjacent to a memory cell row corresponding to the row hammer address, in response to a refresh command provided by the host. In addition, a row hammer address may be stored as the pre row hammer address in the first register in response to the refresh command.

According to a further embodiment of the inventive concept, a memory device is provided, which includes a memory cell array therein. This memory cell array includes a plurality of memory cell rows. A row hammer managing circuit is provided, which is configured to detect a row hammer address during a monitoring period for monitoring a plurality of accesses to the plurality of memory cell rows, and to output the row hammer address in response to a refresh command provided from a host. A refresh control circuit is provided, which is configured to output a target row address to perform a refresh operation on a memory cell row physically adjacent to a memory cell row corresponding to the row hammer address. The row hammer managing circuit can include: a first register configured to store a pre row hammer address detected as the row hammer address in a monitoring period prior to the monitoring period, a first comparator configured to output a first comparison result signal indicating a result of comparing an input row address provided from the host with the pre row hammer address, a second register configured to store the input row address, a second comparator configured to output a second comparison result signal indicating a result of comparing the input row address with a row address stored in the second register, a flag generating circuit configured to output a flag signal based on the first comparison result signal and the second comparison result signal, and a register control circuit configured to control the second register to output the row address stored in the second register as the row hammer address based on the refresh command, the first comparison result signal, the second comparison result signal, and the flag signal.

According to a further embodiment of the inventive concept, there is provided a memory device having a memory cell array therein, which includes a plurality of memory cell rows. A row hammer managing circuit is provided, which includes a first register configured to store a pre row hammer address detected in a monitoring period for monitoring a plurality of accesses to the plurality of memory cell rows, and a second register configured to sequentially store one row address greater than the pre row hammer address for each subsequent monitoring period following the monitoring period. A refresh control circuit is provided, which is configured to output a target row address of a memory cell row physically adjacent to a memory cell row corresponding to the row address stored in the second register during a refresh operation.

According to another embodiment of the inventive concept, there is provided an electronic device including a host, which is configured to sequentially output input row addresses and periodically output a refresh command, and a memory device, which is configured to detect a row hammer address based on the input row addresses in a monitoring period and perform a refresh operation in response to the refresh command. The memory device includes a memory cell array having a plurality of memory cell rows therein. A row hammer managing circuit is provided, which is configured to: detect the row hammer address based on each of the input row addresses and a pre row hammer address detected before the monitoring period, and to output the row hammer address in response to the refresh command. A refresh control circuit is provided, which is configured to perform a refresh operation on a memory cell row that is physically adjacent to a memory cell row corresponding to the row hammer address.

According to a further embodiment of the inventive concept, a memory device is provided with: a memory cell array having a plurality of rows of memory cells therein, a row hammer managing circuit configured to detect a row hammer address associated with a row of memory cells within the plurality thereof, in response to a plurality of word line accesses to the memory cell array during a monitoring time period; and a refresh control circuit configured to perform a refresh operation on at least one row of memory cells extending immediately adjacent the row of memory cells associated with the row hammer address, in response to the detection of the row hammer address by the row hammer managing circuit.

According to an aspect of the inventive concept, there is provided a device communicating with a host, the device including a volatile memory including a plurality of memory cell rows, and a memory controller configured to detect, based on input row addresses accessed by the host, a pattern size of a row hammer attack pattern and row distribution of row hammer addresses in the row hammer attack pattern, to determine, according to a type of the row distribution, whether to perform refresh management, and for every L access corresponding to the pattern size, to provide, to the volatile memory, a refresh management command according to the refresh management and a target row address corresponding to a target memory cell row from among the plurality of memory cell rows, where L is an integer greater than or equal to 1.

According to another aspect of the inventive concept, there is provided an operating method of a memory controller, the operating method including detecting, based on input row addresses accessed by a host, a pattern size of a row hammer attack pattern and uniform row distribution of row hammer addresses in the row hammer attack pattern, and for every L access corresponding to the pattern size, outputting a refresh management command and a target row address corresponding to a target memory cell row from among a plurality of memory cell rows, where L is an integer greater than or equal to 1.

According to another aspect of the inventive concept, there is provided a memory device including a memory cell array including a plurality of memory cell rows, a row hammer management circuit configured to detect, based on active commands and input row addresses provided from a memory controller, a pattern size of a row hammer attack pattern and row distribution of row hammer addresses in the row hammer attack pattern, and to output, for every L access corresponding to the pattern size, the row hammer address, when a type of the row distribution is a uniform type, and a refresh control circuit configured to output, during a refresh operation, based on the row hammer address, a target row address corresponding to a target memory cell row from among the plurality of memory cell rows, where L is an integer greater than or equal to 1.

According to another aspect of the inventive concept, there is provided a compute express link (CXL) memory expansion device configured to communicate with a host processor through a non-coherent protocol and a memory access protocol, the CXL memory expansion device including a volatile memory including a plurality of memory cell rows, and a CXL memory controller configured to detect, based on input row addresses accessed by the host processor, a pattern size of a row hammer attack pattern and row distribution of row hammer addresses in the row hammer attack pattern, to determine, according to a type of the row distribution, whether to perform refresh management; and for every L access corresponding to the pattern size, to provide, to the volatile memory, a refresh management command according to the refresh management and a target row address corresponding to a target memory cell row from among the plurality of memory cell rows, where L is an integer greater than or equal to 1.

BRIEF DESCRIPTION OF THE DRAWINGS

Embodiments of the inventive concept will be more clearly understood from the following detailed description taken in conjunction with the accompanying drawings in which:

FIG. 19 is a diagram illustrating an operation of detecting a pattern size, according to an embodiment of the present disclosure;

DETAILED DESCRIPTION OF THE EMBODIMENTS

Figure 1:
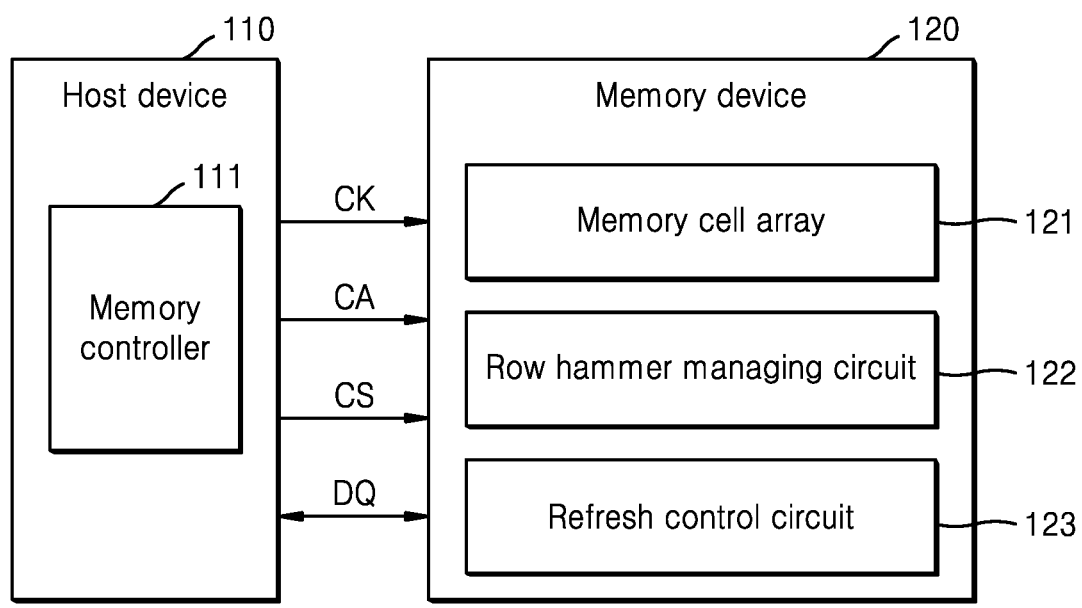
FIG. 1 is a diagram illustrating an electronic device according to embodiments of the present disclosure.

Hereinafter, embodiments of the present disclosure will be described in detail with reference to the accompanying drawings. The same reference numerals are used for the same components in the drawings, and duplicate descriptions thereof are omitted. As used herein, the term "and/or" includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination. In the present specification, although terms such as first and second are used to describe various elements or components, it goes without saying that these elements or components are not limited by these terms. These terms are only used to distinguish a single element or component from other elements or components. Therefore, it goes without saying that a first element or component referred to below may be a second element or component within the technical idea of embodiments of the present inventive concept.

FIG. 1 is a diagram illustrating an electronic device according to embodiments of the present disclosure.

Referring to FIG. 1, an electronic device 100 may be, for example, a computing system, such as a computer, a notebook computer, a server, a workstation, a portable communication terminal, a personal digital assistant (PDA), a portable multimedia player (PMP), a smart phone, or a wearable device. The electronic device 100 may include a host device 110 and a memory device 120.

The host device 110 may be a part of components included in a computing system, such as a graphics card. The host device 110 may be communicatively connected to the memory device 120 through a memory bus.

As a functional block for performing general computer operations in the electronic device 100, the host device 110 may correspond to a central processing unit (CPU), a digital signal processor (DSP), a graphics processing unit (GPU), or an application processor (AP). The host device 110 may include a memory controller 111 that controls data transmission/reception to or from the memory device 120. The host device 110 may be referred to as a host.

In some embodiments, the memory controller 111 may provide accesses to the memory device 120 through a memory bus. In one embodiment, access may include an active command and a row address. However, embodiments of the inventive concept are not limited thereto, and the access may further include a write command or a read command, a column address, and a pre-charge command, for example.

In one embodiment, the memory controller 111 may sequentially output accesses. When access includes an active command and a row address, the memory controller 111 may sequentially output a plurality of active commands and a plurality of row addresses. In some embodiments, the memory controller 111 may periodically output a refresh command. The refresh command may be a command instructing the memory device 120 to perform a refresh operation.

The memory controller 111 may access the memory device 120 according to a memory request from the host device 110. The memory controller 111 may include a memory physical layer interface (memory PHY) for interfacing with the memory device 120, such as selecting rows and columns corresponding to memory locations, and writing data to or reading data from memory locations. The memory PHY may include a physical or electrical layer and a logical layer provided for signals, frequency, timing, driving, detailed operating parameters, and any functionality used for efficient communication between the memory controller 111 and the memory device 120. The memory PHY may support features of the double data rate (DDR) and/or low-power DDR (LPDDR) protocol of the Joint Electron Device Engineering Council (JEDEC) standard.

The memory controller 111 and the memory device 120 may be connected to one another through a memory bus. Although it is shown in FIG. 1 that a clock signal CK, a command/address CA, a chip select signal CS, and data DQ are each provided through one signal line in FIG. 1, in practice, each of the clock signal CK, command/address CA, chip select signal CS, and data DQ may be provided through a plurality of signal lines or buses. Signal lines between the memory controller 111 and the memory device 120 may be connected through connectors. Connectors may be implemented as pins, balls, signal lines, or other hardware components, for example.

The clock signal CK may be transmitted from the memory controller 111 to the memory device 120 through a clock signal line of a memory bus. The command/address CA may be transmitted from the memory controller 111 to the memory device 120 through a command/address signal line of a memory bus. The chip select signal CS may be transmitted from the memory controller 111 to the memory device 120 through a chip select line of a memory bus. For example, a signal transmitted through a command/address signal line when the chip select signal CS is activated to a logic high level may be a command. Data DQ may be transmitted from the memory controller 111 to the memory device 120 or from the memory device 120 to the memory controller 111 through a data bus composed of bidirectional signal lines of a memory bus.

The memory device 120 may write data DQ or read data DQ and perform a refresh operation under control by the memory controller 111. For example, the memory device 120 may be a double data rate synchronous dynamic random access memory (DDR SDRAM) device. However, embodiments of the inventive concept are not limited thereto, and the memory device 120 may be any one of volatile memory devices, such as LPDDR SDRAM, wide Input/Output (I/O) DRAM, high bandwidth memory (HBM), hybrid memory cube (HMC), and the like.

In some embodiments, the memory device 120 may detect a row hammer address based on active commands and row addresses provided from the memory controller 111 in the monitoring period. In one embodiment, the monitoring period may be a refresh rate time interval tREFi, as described below with reference to FIG. 4. In another embodiment, the monitoring period may be a period between two refresh operation periods ROP, as described below with reference to FIGS. 5B and 5C. The memory device 120 may perform a refresh operation based on a row hammer address detected in response to a refresh command provided from the memory controller 111. A row address provided to the memory device 120 from the memory controller 111 may be referred to as an input row address.

The memory device 120 may include a memory cell array 121, a row hammer managing circuit 122, and a refresh control circuit 123. The memory cell array 121 may include a plurality of word lines, a plurality of bit lines, and a plurality of memory cells. A plurality of memory cells may be formed at points where word lines intersect with bit lines. A memory cell of the memory cell array 121 may be a volatile memory cell, for example, a DRAM cell.

The row hammer managing circuit 122 may count the number of access times during the monitoring period. The row hammer managing circuit 122 may detect a row hammer address based on a pre row hammer address and each of a plurality of input row addresses. The input row address may be a row address provided from the memory controller 111. The pre row hammer address may be a row address detected as a row hammer address in a monitoring period prior to the current monitoring period. The pre row hammer address may be stored in the row hammer managing circuit 122.

In one embodiment, the row hammer managing circuit 122 may output a row hammer address to the refresh control circuit 123 in response to a refresh command.

In another embodiment, the row hammer managing circuit 122 may provide a row hammer address to the memory controller 111 through a data bus. The row hammer managing circuit 122 may output the target row address to the refresh control circuit 123 in response to the refresh command received from the memory controller 111 and at least one target row address. The target row address may be row addresses of memory cells physically adjacent to memory cells associated with the row hammer addresses.

The refresh control circuit 123 may perform a refresh operation on a memory cell row physically adjacent to the memory cell row corresponding to the row hammer address. In an embodiment, the refresh control circuit 123 may acquire a target row address based on the row hammer address provided from the row hammer managing circuit 122 and provide the target row address to the memory cell array 121.

Figure 2:
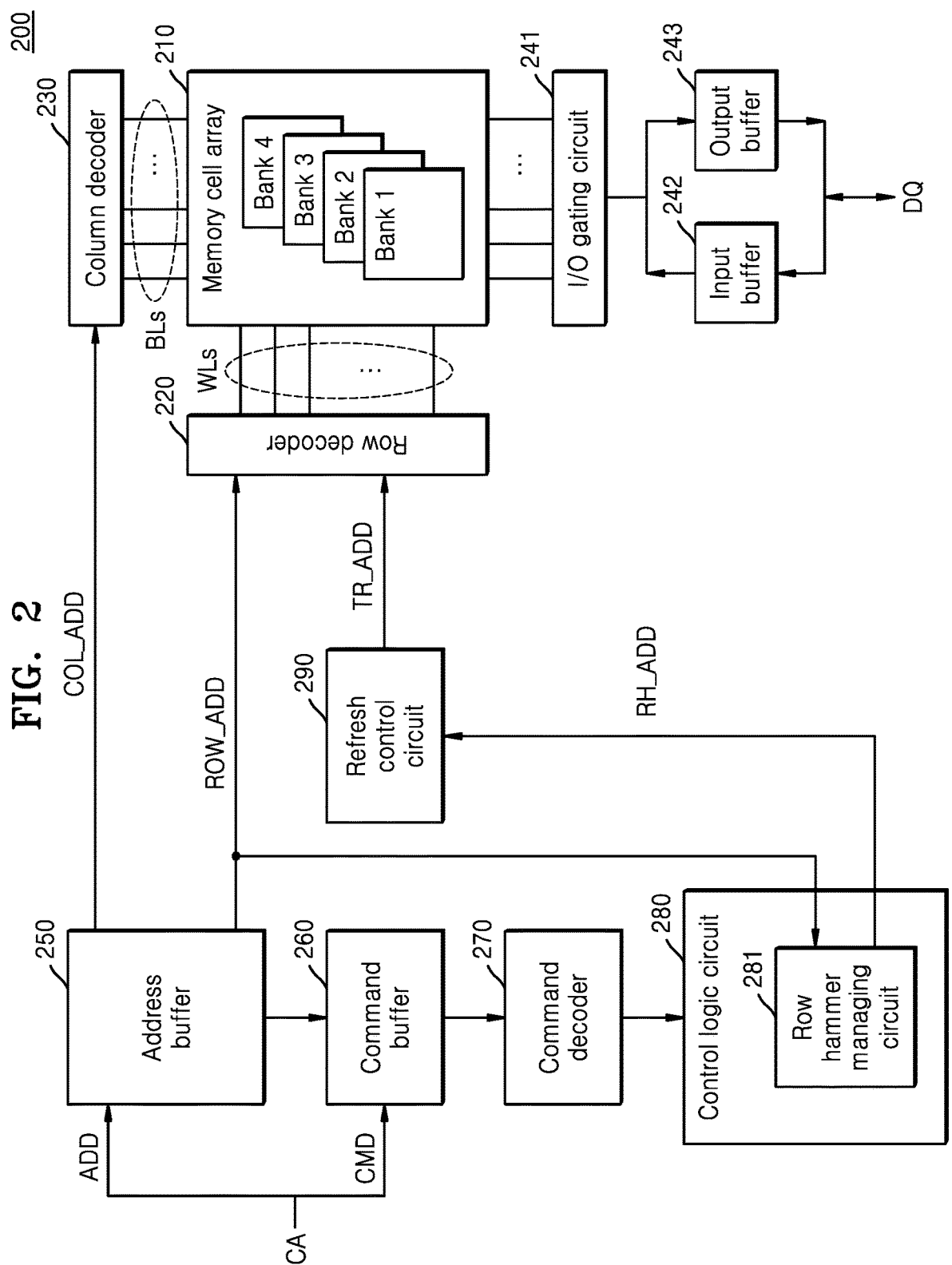
FIG. 2 is a diagram illustrating a memory device according to example embodiments of the present disclosure.

FIG. 2 is a diagram illustrating a memory device according to example embodiments of the present disclosure. A memory device 200 shown in FIG. 2 may correspond to the memory device 120 shown in FIG. 1. The configuration of the memory device 200 shown in FIG. 2 may be provided as an example. Referring to FIG. 2, the memory device 200 may include a memory cell array 210, a row decoder 220, a column decoder 230, an input/output (I/O) gating circuit 241, an input buffer 242, an output buffer 243, an address buffer 250, a command buffer 260, a command decoder 270, a control logic circuit 280, and a refresh control circuit 290. Although not shown in FIG. 2, the memory device 200 may further include a clock buffer, a mode register set (MRS), a bank control logic, a voltage generating circuit, and the like.

The memory cell array 210 may include a plurality of memory cells provided in a matrix form arranged in rows and columns. The memory cell array 210 may include a plurality of word lines WLs and a plurality of bit lines BLs connected to a plurality of memory cells. A plurality of word lines WLs may be connected to rows of a plurality of memory cells. A row of memory cells may be memory cells connected to a certain word line. A plurality of bit lines BLs may be connected to columns of a plurality of memory cells. A column of memory cells may be memory cells connected to a certain bit line. Data of memory cells connected to an active word line may be sensed and amplified by sense amplifiers connected to a plurality of bit lines BLs.

In some embodiments, the memory cell array 210 may include a plurality of banks. For example, the memory cell array 210 may include first to fourth banks BANK1 to BANK4. The bank control logic may generate bank control signals in response to the bank address. Also, the row decoder 220 and the column decoder 230 of the bank corresponding to the bank address among the first to fourth banks BANK1 to BANK4 may be activated in response to the bank control signals. A memory device 200 including four banks is illustrated in FIG. 2, but is not limited thereto, and according to embodiments, the memory device 200 may include any number of banks.

The row decoder 220 and the column decoder 230 may be disposed to correspond to each of the first to fourth banks BANK1 to BANK4, and the row decoder 220 and the column decoder 230 connected to the bank corresponding to the bank address may be activated. The row decoder 220 may decode the input row address ROW_ADD received from the address buffer 250 and select a word line corresponding to the input row address ROW_ADD from among a plurality of word lines WLs. In some embodiments, the row decoder 220 may include a word line driver that activates a selected word line.

The column decoder 230 may select predetermined bit lines from among a plurality of bit lines BLs of the memory cell array 210. The column decoder 230 may generate a column select signal by decoding a burst address that is gradually increased by +1 based on the column address COL_ADD in a burst mode, and connect bit lines selected by the column select signal to the I/O gating circuit 241. The burst address may be addresses of column locations accessible in relation to the burst length for a read command and/or a write command.

The I/O gating circuit 241 may include read data latches for storing read data of bit lines selected by a column select signal, and a write driver for writing write data into the memory cell array 210. The input buffer 242 and the output buffer 243 may be included. Read data stored in the I/O gating circuit 241 (e.g., read data latches) may be provided to the data bus through the output buffer 243. Write data may be stored in the memory cell array 210 through the input buffer 242 connected to the data bus and the I/O gating circuit 241 (e.g., a write driver).

The address buffer 250 may receive the address ADD included in the command/address CA from the memory controller 111. The address ADD may include a bank address, an input row address ROW_ADD, and a column address COL_ADD. The address buffer 250 may provide a bank address to the bank control logic, provide an input row address ROW_ADD to the row decoder 220, and provide a column address COL_ADD to the column decoder 230.

The command buffer 260 may receive the command CMD included in the command/address CA. The command buffer 260 may provide the command CMD to the command decoder 270. The command decoder 270 may decode the command CMD and provide a corresponding command, for example, an active command, a write command, a read command, a pre-charge command, a refresh command, and the like, to the control logic circuit 280.

The control logic circuit 280 may receive the clock signal CK and the command CMD and generate control signals for controlling an operation timing of the memory device 200 and/or a memory operation. The control logic circuit 280 may provide control signals to circuits of the memory device 200 to operate as set in the operation and control parameters stored by the MRS. The control logic circuit 280 may read data from the memory cell array 210 and write data to the memory cell array 210 using control signals. Although the address buffer 250, the command buffer 260, the command decoder 270, and the control logic circuit 280 are shown in FIG. 2 as separate components, the address buffer 250, the command buffer 260, the command decoder 270, and the control logic circuit 280 may be implemented as a single element. In addition, although the command CMD and the address ADD are provided as separate signals in FIG. 2, the address may also be included in the command as presented in the LPDDR standard or the like.

The control logic circuit 280 may count the number of times accessing each of the memory cell rows in the memory cell array 210. Also, the control logic circuit 280 may initialize the counted number of access times in response to the refresh command.

In some embodiments, the control logic circuit 280 may include a row hammer managing circuit 281. Although the row hammer managing circuit 281 is shown in FIG. 2 as being included in the control logic circuit 280, embodiments of the inventive concept are not limited thereto, and the row hammer managing circuit 281 may be disposed outside the control logic circuit 280 as a separate configuration from the control logic circuit 280. The row hammer managing circuit 281 may be implemented in hardware, firmware, software, or a combination thereof for controlling and/or managing row hammers.

The row hammer managing circuit 281 may detect a row hammer address RH_ADD during a monitoring period for monitoring accesses to a plurality of memory cell rows. In some embodiments, when the access includes the input row address ROW_ADD, the row hammer managing circuit 281 may detect the row hammer address RH_ADD based on the input row address ROW_ADD. In an embodiment, the row hammer managing circuit 281 may detect a row hammer address RH_ADD based on a pre row hammer address and each of a plurality of input row addresses during the monitoring period.

In some embodiments, the row hammer managing circuit 281 may transmit the detected row hammer address RH_ADD to the memory controller 111. In one embodiment, the memory controller 111 may issue a refresh command in response to a row hammer address RH_ADD. In another embodiment, the memory controller 111 transmits an address (e.g., at least one target row address TR_ADD) of a memory cell row physically adjacent to a memory cell row having a row hammer address RH_ADD among a plurality of memory cell rows to the memory device 200 together with the refresh command in response to the row hammer address RH_ADD.

The row hammer managing circuit 281 may provide the row hammer address RH_ADD to the refresh control circuit 290 in response to a refresh command. In an embodiment, the row hammer managing circuit 281 may transfer at least one target row address TR_ADD provided from the memory controller 111 to the refresh control circuit 290.

The refresh control circuit 290 may perform a refresh operation on a memory cell row physically adjacent to the memory cell row corresponding to the row hammer address RH_ADD. In an embodiment, the refresh control circuit 290 may provide the row decoder 220 with at least one target row address TR_ADD transmitted from the row hammer managing circuit 281 to perform a refresh operation. In another embodiment, the refresh control circuit 290 may obtain at least one target row address TR_ADD based on the row hammer address RH_ADD transmitted from the row hammer managing circuit 281, and provide at least one target row address TR_ADD to the row decoder 220. During a refresh operation, a memory cell row having a target row address TR_ADD may be refreshed.

The control logic circuit 280 may control the refresh control circuit 290 so that the refresh control circuit 290 performs a normal refresh operation on a plurality of memory cell rows in response to a refresh command. The normal refresh operation may be an operation of sequentially refreshing a plurality of memory cell rows by increasing a refresh counter value by +1. The control logic circuit 280 may also control the refresh control circuit 290 to perform a target row refresh operation in response to a refresh command. The target row refresh operation may be an operation of refreshing a certain memory cell row subjected to a row hammer attack. In an embodiment, the refresh control circuit 290 may sequentially perform a normal refresh operation and a target refresh operation.

Figure 3:
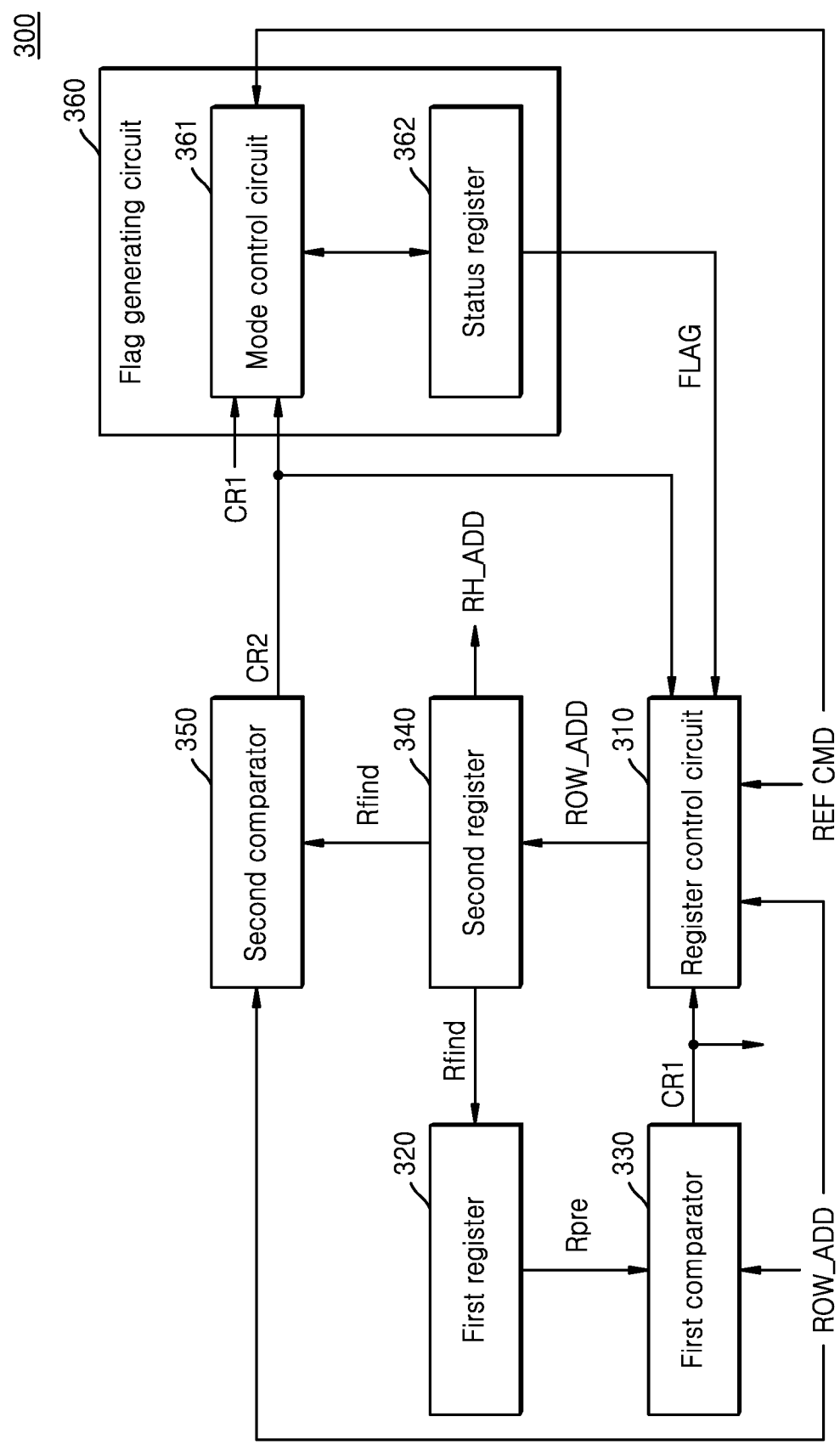
FIG. 3 is a diagram illustrating a row hammer managing circuit according to embodiments of the present disclosure.

FIG. 3 is a diagram illustrating a row hammer managing circuit according to embodiments of the present disclosure. Referring to FIG. 3, the row hammer managing circuit 300 may include a register control circuit 310, a first register 320, a first comparator 330, a second register 340, a second comparator 350, and a flag generating circuit 360. The register control circuit 310 may control the second register 340, in response to the refresh command REF CMD, the first comparison result signal CR1, the second comparison result signal CR2, and the flag signal FLAG.

According to an embodiment, the register control circuit 310 may provide an input row address ROW_ADD to the second register 340 and the second register 340 may store the input row address ROW_ADD. When a first input row address is input for the first time in a monitoring period, the flag signal FLAG may have a first bit value. For example, the first bit value may be "0" and the second bit value may be "1", but embodiments of the inventive concept are not limited thereto. Hereinafter, it is assumed that the first bit value of the flag signal FLAG is "0" and the second bit value is "1". The foregoing embodiment will be described later with reference to FIG. 7.

In some embodiments, when the first input row address is less than or equal to a pre row hammer address Rpre, the flag signal FLAG may be generated to have a first bit value. When the first input row address is greater than the pre row hammer address Rpre, the flag signal FLAG may be generated to have a second bit value. A pre row hammer address Rpre may refer to a row address on which a refresh operation has been performed. In some embodiments, the flag signal FLAG has a first bit value, and in the monitoring period, the input row address ROW_ADD input after the first input row address may be greater than the pre row hammer address Rpre. In this case, the register control circuit 310 may provide the input row address ROW_ADD to the second register 340 so that the second register 340 stores the input row address ROW_ADD. Also, a bit value of the flag signal FLAG may be changed from a first bit value to a second bit value. When one row address is greater than another row address, the address value of the one row address is relatively larger or the number of the one row address is relatively greater than the other row address. Here, a plurality of row addresses are sequentially arranged in the memory cell array. For example, a second row address having a greater address value than a first row address may mean that the second row address that is next in sequence in terms of addressing has a greater address value than that of the first row address. The foregoing embodiment will be described later with reference to FIG. 8.

In some embodiments, the flag signal FLAG may have a first bit value, and the input row address ROW_ADD input after the first input row address may be less than or equal to the pre row hammer address Rpre, and the input row address ROW_ADD may be less than or equal to the row address Rfind stored in the second register 340. In this case, the register control circuit 310 may provide the input row address ROW_ADD to the second register 340 so that the second register 340 stores the input row address ROW_ADD. Also, the flag signal FLAG may maintain the first bit value. The foregoing embodiment will be described later with reference to FIG. 8.

In some embodiments, the flag signal FLAG may have a first bit value, and the input row address ROW_ADD input after the first input row address may be less than or equal to the pre row hammer address Rpre, and the input row address ROW_ADD may be greater than the row address Rfind stored in the second register 340. In this case, the register control circuit 310 may wait without storing the input row address ROW_ADD in the second register 340. Also, the flag signal FLAG may maintain the first bit value. The foregoing embodiment will be described later with reference to FIG. 8.

In some embodiments, the flag signal FLAG may have a second bit value, and the input row address ROW_ADD input after the first input row address may be greater than the pre row hammer address Rpre, and may be less than the row address Rfind stored in the second register 340. In this case, the register control circuit 310 may provide the input row address ROW_ADD to the second register 340 so that the second register 340 stores the input row address ROW_ADD. Also, the flag signal FLAG may maintain the second bit value. The foregoing embodiment will be described later with reference to FIG. 9.

In some embodiments, the register control circuit 310 may control the second register 340 so that the second register 340 provides the row address Rfind to the first register 320 in response to the refresh command REF CMD. The register control circuit 310 may control the second register 340 so that the second register 340 provides the row address Rfind to the refresh control circuit 290 as the row hammer address RH_ADD in response to the refresh command REF CMD. At this time, the flag signal FLAG may have an initial value. The initial value may be, for example, a first bit value. However, embodiments of the inventive concept are not limited thereto.

The first register 320 may store a pre row hammer address Rpre. The pre row hammer address Rpre may be a row address that has been detected as a row hammer address in a monitoring period prior to the monitoring period. The first register 320 may provide the pre row hammer address Rpre to the first comparator 330. In some embodiments, the first register 320 may store the row address Rfind output from the second register 340 as a pre row hammer address Rpre. In this specification, the row address stored in the first register 320 may be referred to as a pre row hammer address Rpre.

The first comparator 330 may compare the input row address ROW_ADD provided from the memory controller 111 to the pre row hammer address Rpre, and output a first comparison result signal CR1. The first comparison result signal CR1 may indicate a comparison result between the input row address ROW_ADD and the pre row hammer address Rpre. For example, when the input row address ROW_ADD is less than or equal to the pre row hammer address Rpre, the first comparison result signal CR1 may have a first value. In another example, when the input row address ROW_ADD is greater than the pre row hammer address Rpre, the first comparison result signal CR1 may have a second value that is different from the first value. In one embodiment, the first value and the second value may be expressed as bit values, but are not limited thereto. The first comparison result signal CR1 may be provided to the register control circuit 310 and the flag generating circuit 360. The first comparator 330 may be implemented as a digital comparator, but is not limited thereto.

The second register 340 may store the input row address ROW_ADD under control by the register control circuit 310. The second register 340 may provide the stored row address Rfind to the second comparator 350. The second register 340 may output the stored row address Rfind under control by the register control circuit 310. The output row address Rfind may be provided to the first register 320 and may be provided to the row hammer control circuit 290 as the row hammer address RH_ADD. In some embodiments, during the monitoring period, the input row address ROW_ADD may be stored in the second register 340 as a candidate for the row hammer address RH_ADD. Then, when a refresh operation according to the refresh command REF CMD is performed, the row address Rfind previously stored as a row hammer address RH_ADD candidate in the second register 340 may be output as the row hammer address RH_ADD.

In some embodiments, the input row address ROW_ADD detected as the row hammer address RH_ADD may be greater than the pre row hammer address Rpre. Also, the number of input row addresses ROW_ADD detected as row hammer addresses RH_ADD during a certain monitoring period may be one. Accordingly, one row hammer address RH_ADD greater than the pre row hammer address Rpre may be detected one-by-one for each monitoring period. In some embodiments, the input row address ROW_ADD detected as the row hammer address RH_ADD greater than the pre row hammer address Rpre may be sequentially stored in the second register 340. Here, the sequentially stored order may be an ascending order, and in this case, the ascending order may refer to the fact that the number of row addresses gradually increases. However, embodiments of the inventive concept are not limited to only this storage order.

The second comparator 350 may compare the input row address ROW_ADD with the row address Rfind stored in the second register 340 and output a second comparison result signal CR2. The second comparison result signal CR2 may indicate a comparison result between the input row address ROW_ADD and the row address Rfind. For example, when the input row address ROW_ADD is less than the row address Rfind, the second comparison result signal CR2 may have a third value. In another example, if the input row address ROW_ADD is greater than or equal to the row address Rfind, the second comparison result signal CR2 may have a fourth value that is different from the third value. In one embodiment, the third value and the fourth value may be expressed as bit values, but are not limited thereto. The second comparison result signal CR2 may be provided to the register control circuit 310 and the flag generating circuit 360. The second comparator 350 may be implemented as a digital comparator, but is not limited thereto.

The flag generating circuit 360 may output a flag signal FLAG based on the first comparison result signal CR1 and the second comparison result signal CR2. In some embodiments, when the input row address ROW_ADD is less than or equal to the pre row hammer address Rpre, the flag generating circuit 360 may output a flag signal FLAG having a first bit value. In some embodiments, during a state where the flag signal FLAG has a first bit value, when the input row address ROW_ADD is greater than the pre row hammer address Rpre, the flag generating circuit 360 may output a flag signal FLAG having a second bit value.

In some embodiments, the flag generating circuit 360 may initialize the flag signal FLAG in response to the refresh command REF CMD. At this time, the flag signal FLAG may have an initial value, and the initial value may be, for example, a first bit value. The flag signal FLAG, having a first bit value or a second bit value, may be a signal instructing execution of one of the first mode and the second mode. In one embodiment, when the flag signal FLAG has a first bit value, the row hammer managing circuit 300 may execute the first mode. The first mode may be a mode for detecting a first minimum input row address among the plurality of input row addresses ROW_ADD. In another embodiment, when the flag signal FLAG has a second bit value, the row hammer managing circuit 300 may execute the second mode. The second mode may be a mode for detecting a second minimum input row address among input row addresses ROW_ADD greater than the pre row hammer address Rpre.

The flag generating circuit 360 may include a mode control circuit 361 and a status register 362. The mode control circuit 361 may control the status register 362 based on the first comparison result signal CR1, the second comparison result signal CR2, and the refresh command REF CMD.

In some embodiments, the mode control circuit 361 may control the status register 362 to output the flag signal FLAG having an initial value in response to the refresh command REF CMD. The initial value may be, for example, a first bit value. In some embodiments, with the flag signal FLAG having an initial value, when the first comparison result signal CR1 has a first value, the mode control circuit 361 may control the status register 362 to output a flag signal FLAG having a first bit value. In some embodiments, with the flag signal FLAG having an initial value, when the first comparison result signal CR1 has the second value, the mode control circuit 361 may control the status register 362 to output the flag signal FLAG having the second bit value. In some embodiments, in a state where the flag signal FLAG has a first bit value, the first comparison result signal CR1 has a first value, and when the second comparison result signal CR2 has the third value, the mode control circuit 361 may control the status register 362 to output the flag signal FLAG having the first bit value.

As described above, the row hammer managing circuit 300 includes a register for storing an address that has been detected as a row hammer address and a register for storing an address to be detected as a row hammer address, and it has the advantage of efficiently controlling row hammer while reducing the number of registers. Moreover, because the number of registers included in the row hammer managing circuit 300 is reduced, there is an effect of improving the degree of integration of the memory device.

Figure 4:
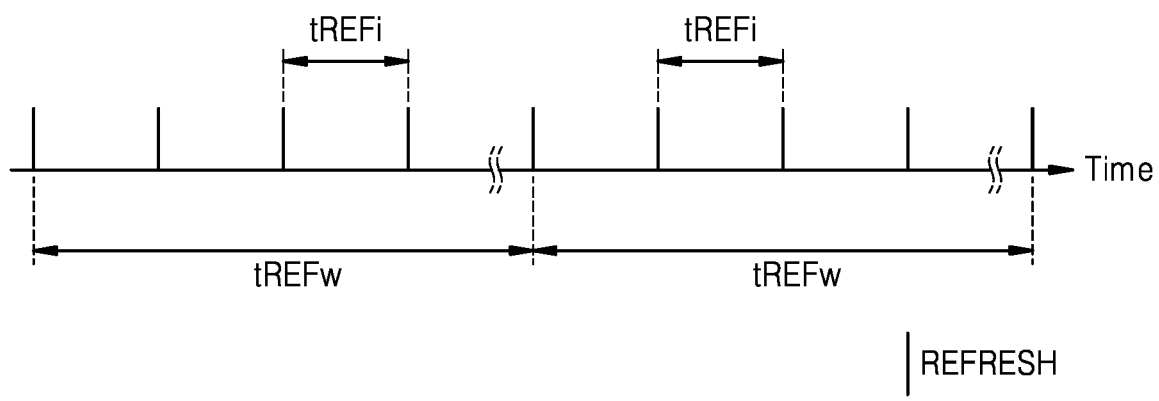
FIG. 4 is a diagram illustrating timing of a refresh operation according to embodiments of the present disclosure.

FIG. 4 is a diagram illustrating timing of a refresh operation according to an embodiment of the present disclosure. Referring to FIG. 4, a 32 millisecond or 64 millisecond refresh window time interval tREFw, which is defined in the JEDEC standard, may be set. Depending on the embodiment, the monitoring period according to embodiments of the present disclosure may correspond to the refresh rate time interval tREFi. The refresh rate time interval tREFi may be, for example, the number of refresh commands REFRESH of about 8K within a 32 millisecond refresh window time interval tREFw. However, embodiments of the inventive concept are not limited thereto, and may include any other refresh rate at which the memory device 120 capable of operating.

Figure 5A:
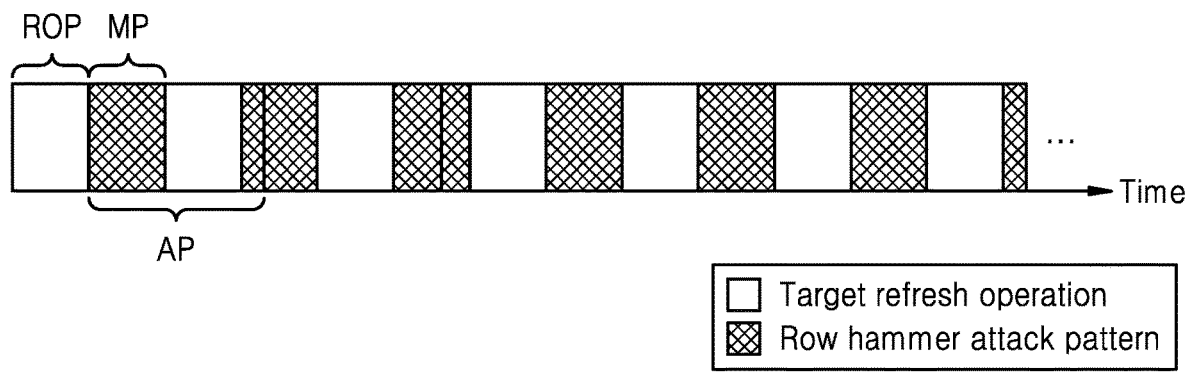
FIGS. 5A, 5B, and 5C are diagrams illustrating a refresh operation period and a monitoring period according to embodiments of the present disclosure.
Figure 5B:
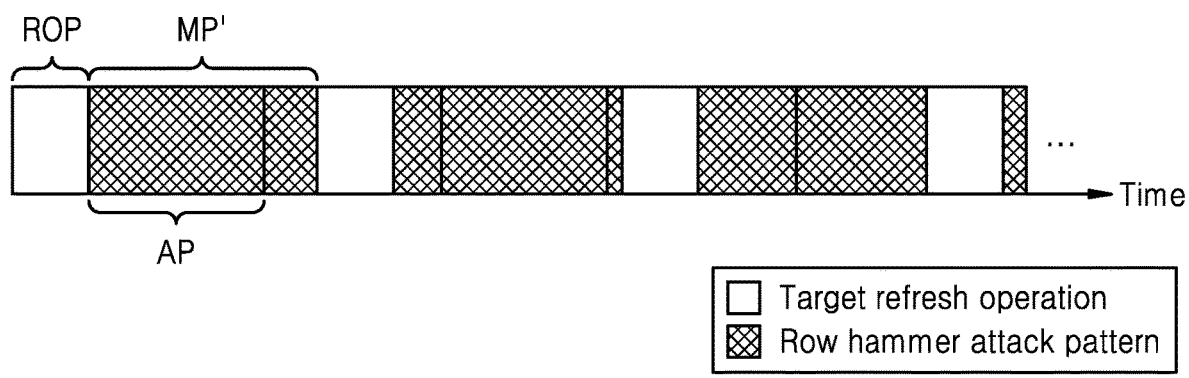
Figure 5C:
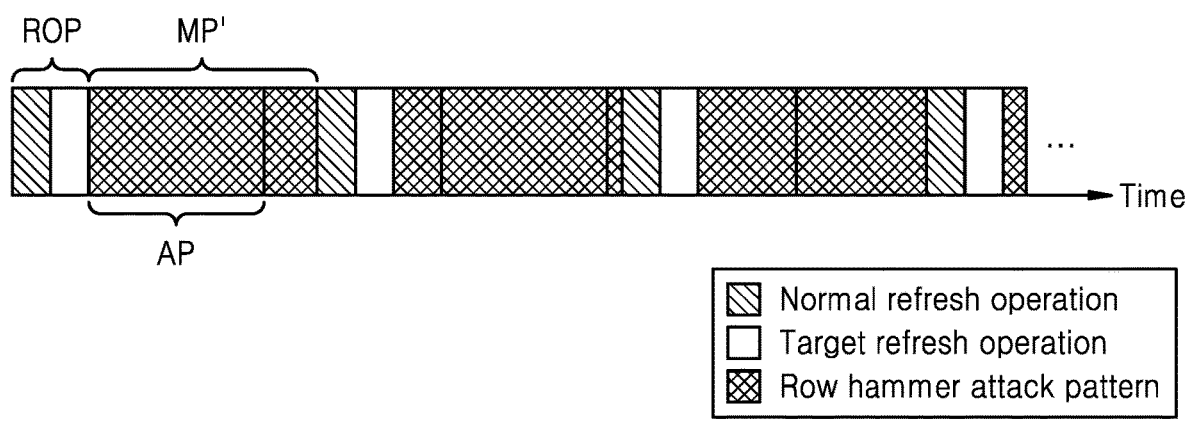

FIGS. 5A, 5B, and 5C are diagrams illustrating a refresh operation period and a monitoring period according to embodiments of the present disclosure. Referring to FIGS. 1, 3, and 5A, the memory controller 111 may periodically output a refresh command REF CMD using known algorithms and timing schedules, for example. Accordingly, the refresh operation period ROP and the monitoring period MP may occur sequentially. During the refresh operation period ROP, the memory device 120 may perform a refresh operation. As shown in FIG. 5A, the refresh operation may be a target refresh operation.

Row hammer attack patterns may exist in various forms. For example, a row hammer attack pattern may include National Cyber Security Center (NCSC), A4, Google type 1, Uniform random, Blacksmith, and the like. However, embodiments of the inventive concept are not limited thereto, and may include other row hammer attack patterns capable of hammering one or more rows of a memory cell array. As described above, since there are various row hammer attack patterns, the pattern size AP of the row hammer attack pattern may also be different for each pattern. The pattern size AP of the row hammer attack pattern may correspond to a period during which all of the memory cell rows to be attacked among a plurality of memory cell rows are completely attacked. Since the row hammer managing circuit 122 may count access corresponding to the memory cell row to be attacked, the pattern size AP of the row hammer attack pattern may correspond to a period during which all of a plurality of accesses thereto are counted. The pattern size AP of the row hammer attack pattern may be referred to as pattern length, pattern size, pattern operation time, and the like. However, as shown in FIG. 5A, if the monitoring period MP is less than the pattern size AP of the row hammer attack pattern, in the row hammer attack pattern, there is a case where all memory cell rows to be attacked cannot be monitored.

Referring to FIG. 5B, in some embodiments, the monitoring period MP' may be larger than the pattern size AP of the row hammer attack pattern. In one embodiment, the monitoring period MP' may be greater than or equal to a period during which all of the plurality of accesses thereto are counted. In another embodiment, the monitoring period MP' may be defined as the number of active commands that are greater than or equal to 1K. However, embodiments of the inventive concept are not limited thereto. In some embodiments, the memory device 120 may perform a target refresh operation during the refresh operation period ROP.

Referring to FIG. 5C, in some embodiments, the monitoring period MP' is greater than the pattern size AP of the row hammer attack pattern, and in the refresh operation period ROP, the memory device 120 may perform a normal refresh operation and a target refresh operation. In one embodiment, a normal refresh operation and a target refresh operation may be sequentially performed, and for example, a target refresh operation may be performed after a normal refresh operation is performed. As described above, by setting the monitoring period MP' of the memory device 120 to be greater than the pattern size AP of the row hammer attack pattern, the performance and reliability of a memory device that controls row hammer for various row hammer attack patterns may be improved.

Figure 6:
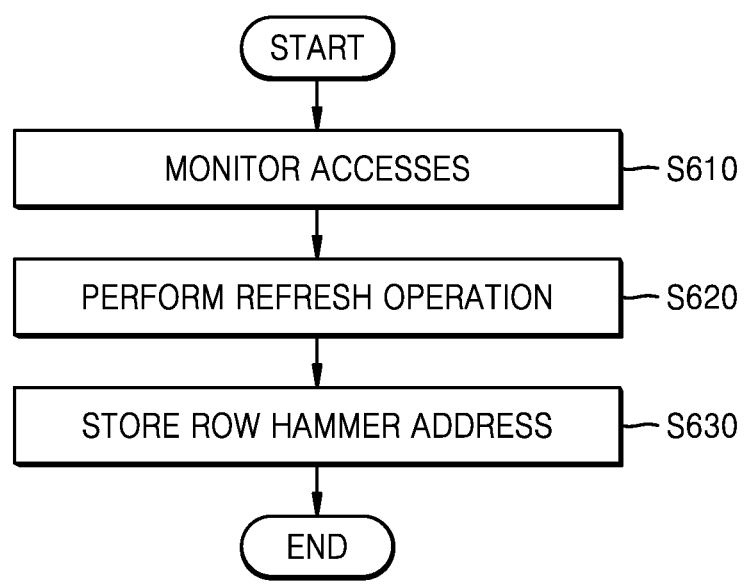
FIG. 6 is a flowchart illustrating a method of operating a memory device, according to example embodiments of the present disclosure.

FIG. 6 is a flowchart illustrating a method of operating a memory device, according to an embodiment of the present disclosure. Referring to FIGS. 3 and 6, a method of operating the memory device 120 of the present disclosure may include monitoring accesses in S610, performing a refresh operation in S620, and storing row hammer addresses in S630. The monitoring of the accesses in S610 is an operation in which the memory device 120 searches for a row hammer address RH_ADD based on the plurality of input row addresses ROW_ADD and the pre row hammer address Rpre stored in the first register 320. A plurality of input row addresses ROW_ADD may be included in a plurality of accesses by the host device 110. In one embodiment, in the monitoring of the accesses in S610, an input row address greater than the pre row hammer address Rpre among the plurality of input row addresses ROW_ADD, or a first minimum input row address among a plurality of input row addresses ROW_ADD may be stored in the second register 340 as a row hammer address RH_ADD.

The performing of the refresh operation in S620 is an operation in which the memory device 120 performs a refresh operation on a memory cell row that is physically adjacent to the memory cell row corresponding to the row hammer address RH_ADD in response to the refresh command REF CMD provided from the host device 110. The storing of the row hammer address in S630 is an operation in which the memory device 120 stores the row hammer address RH_ADD in the first register 320 as the pre row hammer address Rpre in response to the refresh command REF CMD. Specifically, for example, the register control circuit 310 may control the second register 340 to provide the row address Rfind stored in the second register 340 to the first register 320 in response to the refresh command REF CMD. Also, the flag generating circuit 360 may output a flag signal FLAG having the first bit value as an initial value. According to the method described above, by controlling various types of row hammers while reducing the number of registers for storing row hammer addresses, there is an effect of improving the degree of integration of a memory device. In addition, according to the above method, by controlling various types of row hammers, the performance and reliability of the memory device may be improved.

Figure 7:
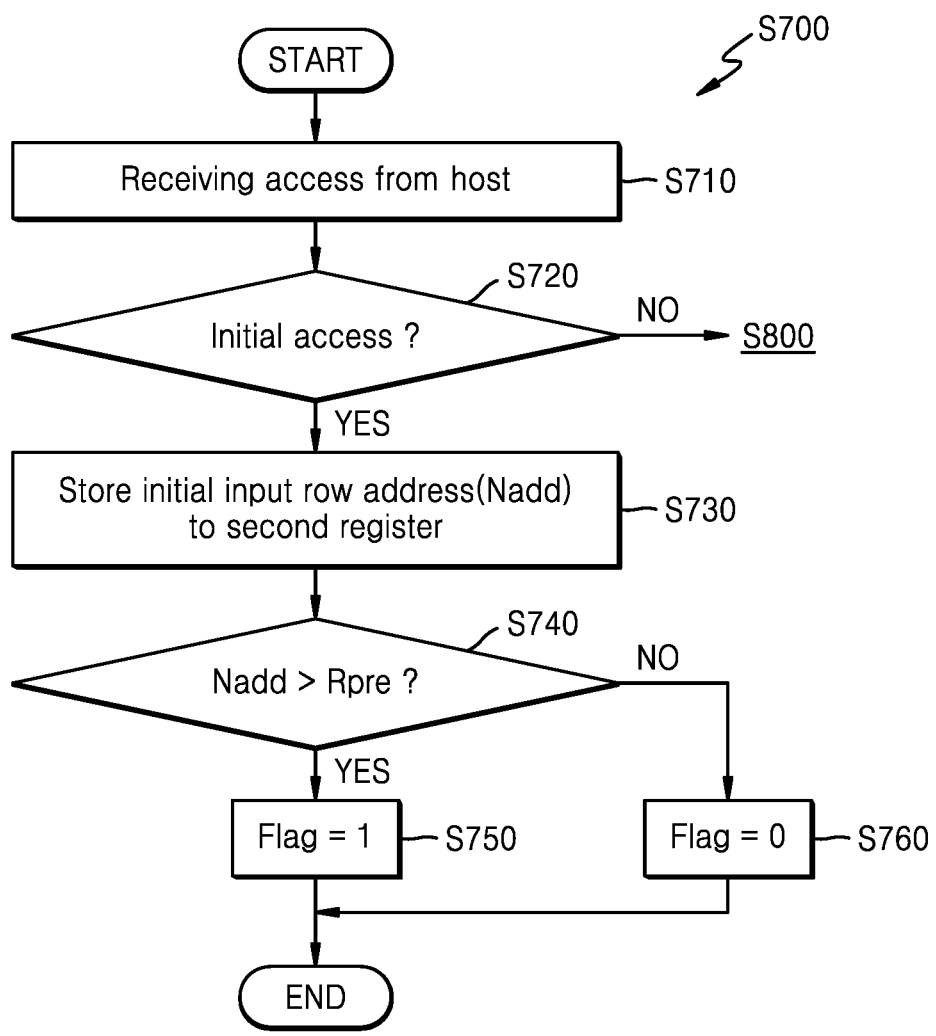
FIG. 7 is a flowchart illustrating embodiments of the operation of monitoring accesses shown in FIG. 6.

FIG. 7 is a flowchart illustrating embodiments of the operation of monitoring accesses shown in FIG. 6. Referring to FIGS. 3, 6, and 7, the monitoring of the accesses shown in S610 in FIG. 6 will be referred to as storing the row hammer address RH_ADD in the second register 340 in S700. In S710, the host (e.g., the host device 110) transfers access to the memory device 120. In S720, a check is performed as to whether the received access is an initial access. The initial access may include an initial input row address Nadd. If the received access is initial access (S720, Yes), the initial input row address Nadd is stored in the second register 340 in S730. In particular, for example, the register control circuit 310 provides the initial input row address Nadd to the second register 340 to store the initial input row address Nadd in the second register 340. In S740, the initial input row address Nadd is compared to the pre row hammer address Rpre. Specifically, for example, it may be determined whether the initial input row address Nadd is greater than the pre row hammer address Rpre by the first comparator 330.

In one embodiment, one mode of the first mode and the second mode is executed according to a comparison result between the initial input row address Nadd and the pre row hammer address Rpre. The first mode may be a mode for detecting a first minimum input row address among the plurality of input row addresses ROW_ADD. The second mode may be a mode for detecting a second minimum input row address among input row addresses ROW_ADD greater than the pre row hammer address Rpre. In particular, if the initial input row address Nadd is greater than the pre row hammer address Rpre (S740, Yes), in S750, the bit value of the flag signal FLAG may be set to "1" (or the second bit value). However, if the initial input row address Nadd is less than or equal to the pre row hammer address Rpre (S740, No), in S760, the bit value of the flag signal FLAG may be set to "0" (or the first bit value). And, if the received access is not initial access (S720, No), S800 is performed. S800 will be described later with reference to FIG. 8.

Figure 8:
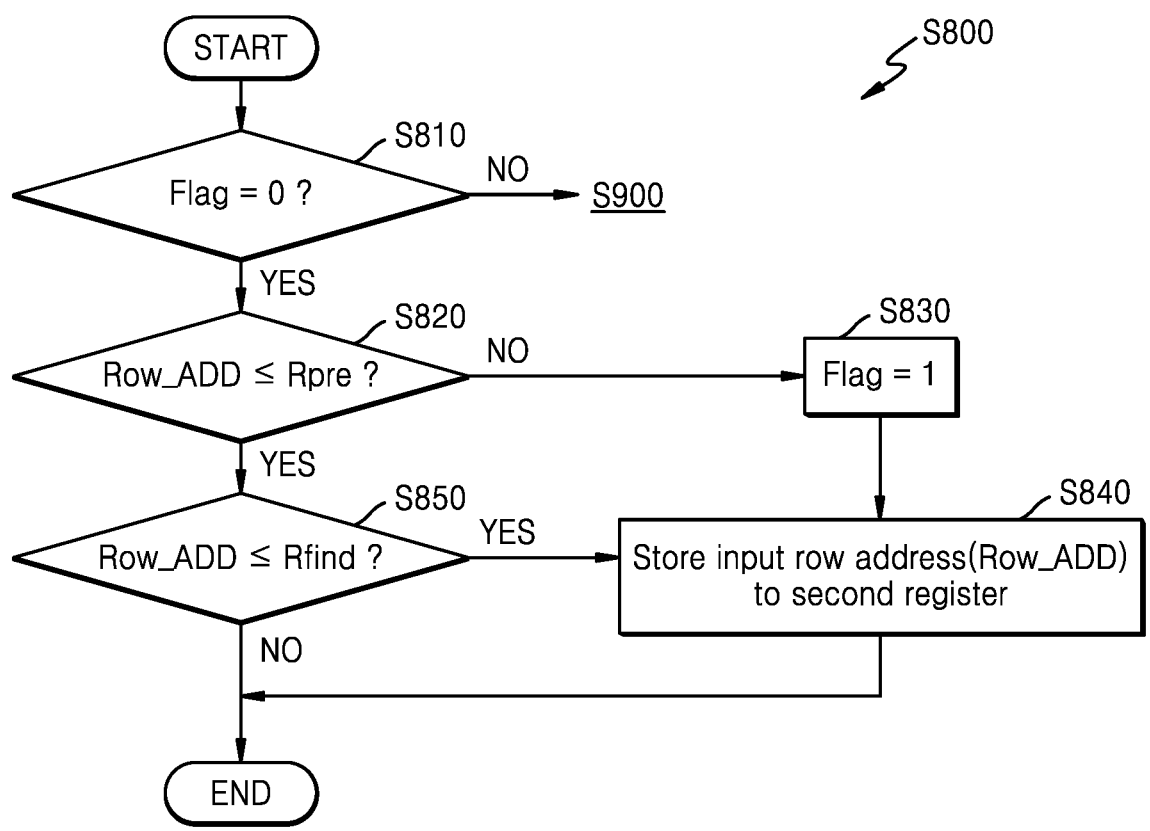
FIG. 8 is a flowchart illustrating another embodiment of the operation of monitoring accesses shown in FIG. 6.

FIG. 8 is a flowchart illustrating another embodiment of the operation of monitoring accesses shown in FIG. 6. Referring to FIGS. 3, 6, and 8, in S810, it is checked whether the bit value of the flag is the first bit value. Specifically, for example, the register control circuit 310 may check the bit value of the flag.

If the bit value of the flag is the first bit value (S810, Yes), the first mode is executed in operation S820. In addition, during the first mode, it is further checked whether the input row address ROW_ADD input after the initial input row address Nadd is equal to or less than the pre row hammer address Rpre. Specifically, for example, the first comparator 330 may compare the input row address ROW_ADD to the pre row hammer address Rpre. If the input row address ROW_ADD is greater than the pre row hammer address Rpre (S820, No), in S830, for example, the flag generating circuit 360 changes the bit value of the flag signal FLAG from the first bit value to the second bit value, and the second mode is executed.

In S840, the register control circuit 310 stores the input row address ROW_ADD in the second register 340. If the input row address ROW_ADD is less than or equal to the pre row hammer address Rpre (S820, Yes), in S850, it is checked whether the input row address ROW_ADD is less than or equal to the row address Rfind stored in the second register 340.

If the input row address ROW_ADD is less than or equal to the row address Rfind (S850, Yes), S840 is performed. In this case, the first mode is continuously executed by the flag generating circuit 360 maintaining the bit value of the flag signal as the first bit value. If the bit value of the flag is the second bit value (S810, No), S900 is performed. S900 will be described later with reference to FIG. 9.

Figure 9:
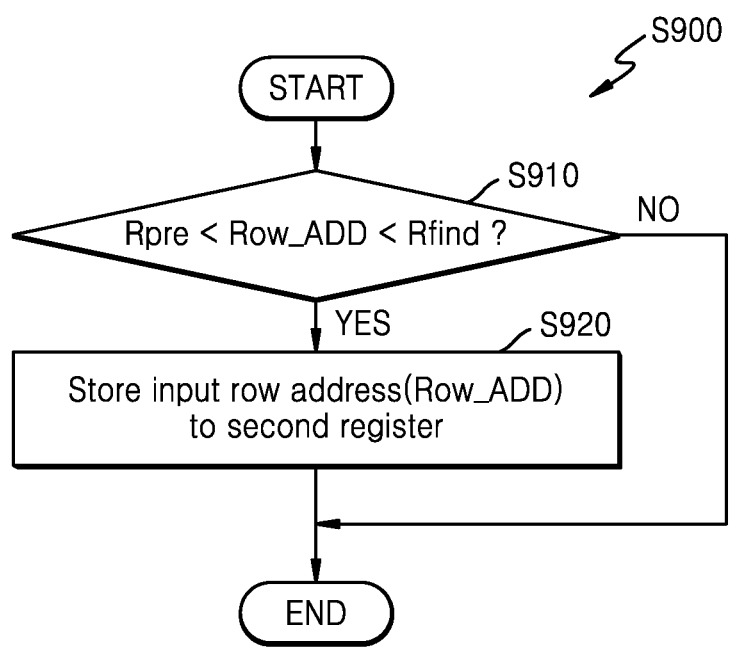
FIG. 9 is a flowchart illustrating another embodiment of the operation of monitoring accesses shown in FIG. 6.

FIG. 9 is a flowchart illustrating another embodiment of the operation of monitoring accesses shown in FIG. 6. Referring to FIGS. 3, 6, and 9, S900 is an operation in which the second mode is executed. In S910, it is checked whether the input row address ROW_ADD input after the initial input row address Nadd is greater than the pre row hammer address Rpre and less than the row address Rfind stored in the second register 340.

If the input row address ROW_ADD is larger than the pre row hammer address Rpre and less than the row address Rfind (S910, Yes), in S920, the register control circuit 310 stores the input row address ROW_ADD in the second register 340. In this case, the flag generating circuit 360 may maintain the bit value of the flag as the second bit value.

Figure 10:
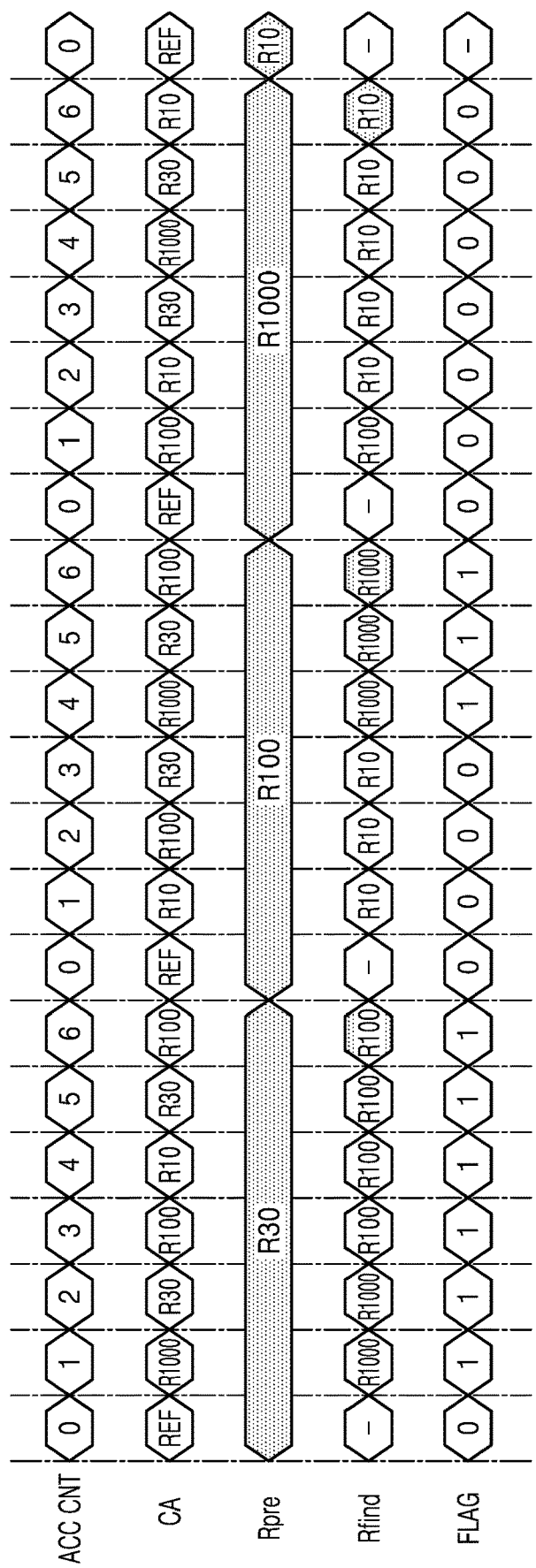
FIG. 10 is a diagram illustrating timing of an operation of managing row hammers according to embodiments of the present disclosure.

FIG. 10 is a diagram illustrating timing of an operation of managing row hammers according to embodiments of the present disclosure. Referring to FIGS. 3 and 10, it is assumed that the row hammer attack pattern is a pattern in which a row hammer attack is performed one or more times on memory cell rows having row address 10 R10, row address 30 R30, row address 100 R100, and row address 1000 R1000, respectively. The refresh operation period may correspond to the type of row address subject to row hammer attack. For example, in the row hammer attack pattern shown in FIG. 10, since there are four types of row addresses subjected to row hammer attacks, the refresh operation period shown in FIG. 10 may be four. A command REF may be input for each period of a refresh operation. The total number of access times within the period of the refresh operation may correspond to the product of the type of row address subject to row hammer attack and the period. For example, within a period corresponding to the time interval between one command REF and another command REF, since the number of access counts ACC CNT is "6", the total number of access times within the period of the refresh operation may be "24 (=6*4)". However, embodiments of the inventive concept are not limited thereto. The command REF may be the refresh command REF CMD described above with reference to FIG. 3.

Referring to FIG. 10, for example, the monitoring period may be a corresponding period from when the command REF is input until the next command REF is input. It is assumed that the initial value of the pre row hammer address Rpre is row address 30 R30.

The access count ACC CNT may be increased by +1 whenever each of the row addresses R10, R30, R100, and R1000 is input to the row hammer managing circuit 300. The access count ACC CNT may be initialized to an initial value in response to input of the command REF. Referring to FIG. 10, for example, the access count ACC CNT may be initialized to "0" when the refresh command REF CMD is input to the row hammer managing circuit 300. When the command REF is input, the flag signal FLAG may be a first bit value (e.g., "0").

Referring to the first monitoring period shown in FIG. 10, in the first monitoring period, the row address 1000 R1000, the row address 30 R30, the row address 100 R100, the row address 10 R10, the row address 30 R30, and the row address 100 R100 may be sequentially input. In some embodiments, the row hammer managing circuit 300 may temporarily store the initial input row address input as initial in the monitoring period as a candidate for the row hammer address.

Referring still to FIG. 10, during the first monitoring period, the initial input row address is row address 1000 R1000. The register control circuit 310 stores the row address 1000 R1000 in the second register 340. The row address 1000 R1000 is stored in the second register 340 as a row hammer address candidate (e.g., the row address Rfind shown in FIG. 10).

In some embodiments, the row hammer managing circuit 300 may execute one of the first mode and the second mode based on the initial input row address and the pre row hammer address. Referring to FIG. 10, for example, since the row address 1000 R1000 is greater than the row address 30 R30, the bit value of the flag signal FLAG is the second bit value (e.g., "1"). As the flag signal FLAG has the second bit value, the second mode may be executed.

In some embodiments, if an input row address input after the initial input row address in the second mode is greater than a pre row hammer address and the input row address is less than a row address temporarily stored as a row hammer address candidate, the row hammer managing circuit 300 may temporarily store the input row address as a row hammer address candidate. However, according to an embodiment, if the input row address in the second mode is greater than the pre row hammer address Rpre and less than the row address Rfind already stored in the second register 340, an input row address may be stored in the second register 340.

Referring still to FIG. 10, for example, row address 30 R30 input next to row address 1000 R1000 is the same as the pre row hammer address Rpre. Therefore, the row address 30 R30 is not stored in the second register 340. The row address 100 R100 input next to the row address 30 R30 is greater than the row address 30 R30, which is the pre row hammer address Rpre. Also, the row address 100 R100 is less than the row address 1000 R1000, which is the row address Rfind previously stored in the second register 340. Accordingly, the row address 100 R100 is stored in the second register 340. In this way, the row address 10 R10, the row address 30 R30, and the row address 100 R100 are sequentially input, and according to the size condition in the second mode described above, the row address Rfind stored in the second register 340 is the row address 100 R100.

In some embodiments, the row hammer managing circuit 300 may output a row address temporarily stored as a row hammer address candidate as a row hammer address in the monitoring period in the second mode in response to the refresh command REF CMD. As indicated in the row address Rfind in the first monitoring period shown in FIG. 10, in the first monitoring period, row address 100 R100 is detected as a row hammer address RH_ADD next to row address 30 R30. Also, the row address 100 R100 may be output in response to the command REF.

In some embodiments, the row hammer managing circuit 300 may detect, as a row hammer address RH_ADD, a first input row address greater than a pre row hammer address Rpre among a plurality of input row addresses in a first monitoring period, and store the detected first input row address in the second register 340. In one embodiment, the first input row address (or first row address) may be the smallest row address among input row addresses (or row addresses) input during the first monitoring period. Referring to FIG. 10, for example, among row addresses 10 R10, row addresses 30 R30, row addresses 100 R100, and row addresses 1000 R1000 input during the first monitoring period, row addresses greater than the row address 30 R30, which is the pre row hammer address Rpre, are the row address 100 R100 and the row address 1000 R1000. Since the smallest row address among the row address 100 R100 and the row address 1000 R1000 is the row address 100 R100, the first input row address (or first row address) is the row address 100 R100.

In some embodiments, during a refresh operation after the first monitoring period, the row hammer managing circuit 300 may store the first input row address (or first row address) in the first register 320 as a pre row hammer address Rpre. Referring to FIG. 10, for example, if the command REF is input after the first monitoring period, the row address 100 R100, which is the row address Rfind detected in the first monitoring period, is stored in the first register 320 as the pre row hammer address Rpre.

Referring to the second monitoring period after the first monitoring period shown in FIG. 10, in the second monitoring period, the row address 10 R10, the row address 100 R100, the row address 30 R30, the row address 1000 R1000, the row address 30 R30, and the row address 100 R100 may be sequentially input. In some embodiments, the row hammer managing circuit 300 may store the first input row address (or first row address) as the pre row hammer address Rpre in the second monitoring period. For example, referring to FIG. 10, since the first input row address (or first row address) is row address 100 R100, the row address 100 R100 is stored in the first register 320 as a pre row hammer address Rpre in the second monitoring period. When the command REF is input, the flag signal FLAG may be a first bit value (e.g., "0"). Row address 10 R10, which is an initial input row address, is stored in the second register 340 (e.g., the row address Rfind).

In some embodiments, the row hammer managing circuit 300 may execute the first mode when the initial input row address is less than or equal to the pre row hammer address Rpre. Referring to FIG. 10, for example, since the row address 10 R10 is less than the row address 100 R100, the flag signal FLAG maintains the first bit value, so that the first mode is executed. Then, since row addresses 100 R100 and row addresses 30 R30 are each greater than row address 10 R10 stored as a candidate (e.g., the row address Rfind) for the row hammer address RH_ADD in the first mode, the bit value of the flag signal FLAG is still the first bit value.

In some embodiments, in the first mode, if the input row address input after the initial input row address is greater than the pre row hammer address Rpre, the row hammer managing circuit 300 may temporarily store the input row address as a row hammer address RH_ADD candidate and execute the second mode. Referring to FIG. 10, for example, since row address 1000 R1000 input after row address 30 R30 is greater than row address 100 R100, the row address 1000 R1000 is stored in the second register 340. Also, the bit value of the flag signal FLAG is changed from the first bit value to the second bit value (e.g., "1"). In the second mode, since the row address 30 R30 input after the row address 1000 R1000 is less than the pre row hammer address Rpre, and the row address 100 R100 input after the row address 30 R30 is the same as the pre row hammer address Rpre, the row address Rfind stored in the second register 340 is maintained as the row address 1000 R1000.

In some embodiments, in the second monitoring period, the row hammer managing circuit 300 may detect a second input row address (or second row address) greater than the first input row address (or first row address) as a row hammer address RH_ADD, and store the second input row address (or second row address) in the second register 340. In an embodiment, the second input row address (or second row address) may be a next smallest row address after the first input row address (or first row address) among the row addresses input during the second monitoring period. Referring to FIG. 10, for example, the first input row address (or first row address) is the row address 100 R100. Among row addresses 10 R10, row addresses 30 R30, row addresses 100 R100, and row addresses 1000 R1000 input during the second monitoring period, a row address greater than the row address 100 R100 is row address 1000 R1000. Accordingly, the second input row address (or second row address) is row address 1000 R1000.

In some embodiments, during a refresh operation after the second monitoring period, the row hammer managing circuit 300 may store the second input row address (or second row address) in the first register 320 as a pre row hammer address Rpre. Referring to FIG. 10, a row address 1000 R1000 is stored in the first register 320 as a pre row hammer address Rpre. When the command REF is input, the flag signal FLAG may be a first bit value (e.g., "0").

In some embodiments, in the third monitoring period after the second monitoring period shown in FIG. 10, row address 100 R100, which is an initial input row address, is stored in the second register 340 (e.g., row address Rfind).

In some embodiments, in the first mode, if the input row address input after the initial input row address is less than or equal to the pre row hammer address and the input row address is less than or equal to the row address temporarily stored as a row hammer address candidate, the row hammer managing circuit 300 may temporarily store the input row address as a row hammer address candidate. For example, referring to FIG. 10, since row address 10 R10 input after row address 100 R100 is less than row address 1000 R1000 and less than row address 100 R100, row address 10 R10 is stored in the second register 340. At this time, the flag signal FLAG is maintained at the first bit value. Row addresses R30, R1000, R30, and R10 input after row address 10 R10 in the first mode are less than or equal to row address 1000 R1000, which is a pre row hammer address Rpre. Also, the row addresses R30, R1000, R30, and R10 are greater than or equal to row address 10 R10, which is the row address Rfind stored in the second register 340. Accordingly, the row address 10 R10 is continuously stored in the second register 340.

In some embodiments, when a plurality of input row addresses are less than or equal to the pre row hammer address, the row hammer managing circuit 300 may detect a minimum input row address among a plurality of input row addresses as the row hammer address RH_ADD. Referring to FIG. 10, for example, in the third monitoring period, the plurality of input row addresses are row address 100 R100, row address 10 R10, row address 30 R30, row address 1000 R1000, row address 30 R30, and row address 10 R10. In the third monitoring period, since the pre row hammer address Rpre is the row address 1000 R1000, among the plurality of input row addresses, the smallest input row address is row address 10 R10, and row address 10 R10 is detected as the row hammer address RH_ADD. In response to the command REF input after the third monitoring period, the row address 10 R10 is output as the row hammer address RH_ADD.

According to the above-described embodiment, by controlling various types of row hammers while reducing the number of registers for storing row hammer addresses, there is an effect of improving the degree of integration of a memory device. In addition, according to the above embodiment, by controlling various types of row hammers, the performance and reliability of the memory device may be improved.

Figure 11:
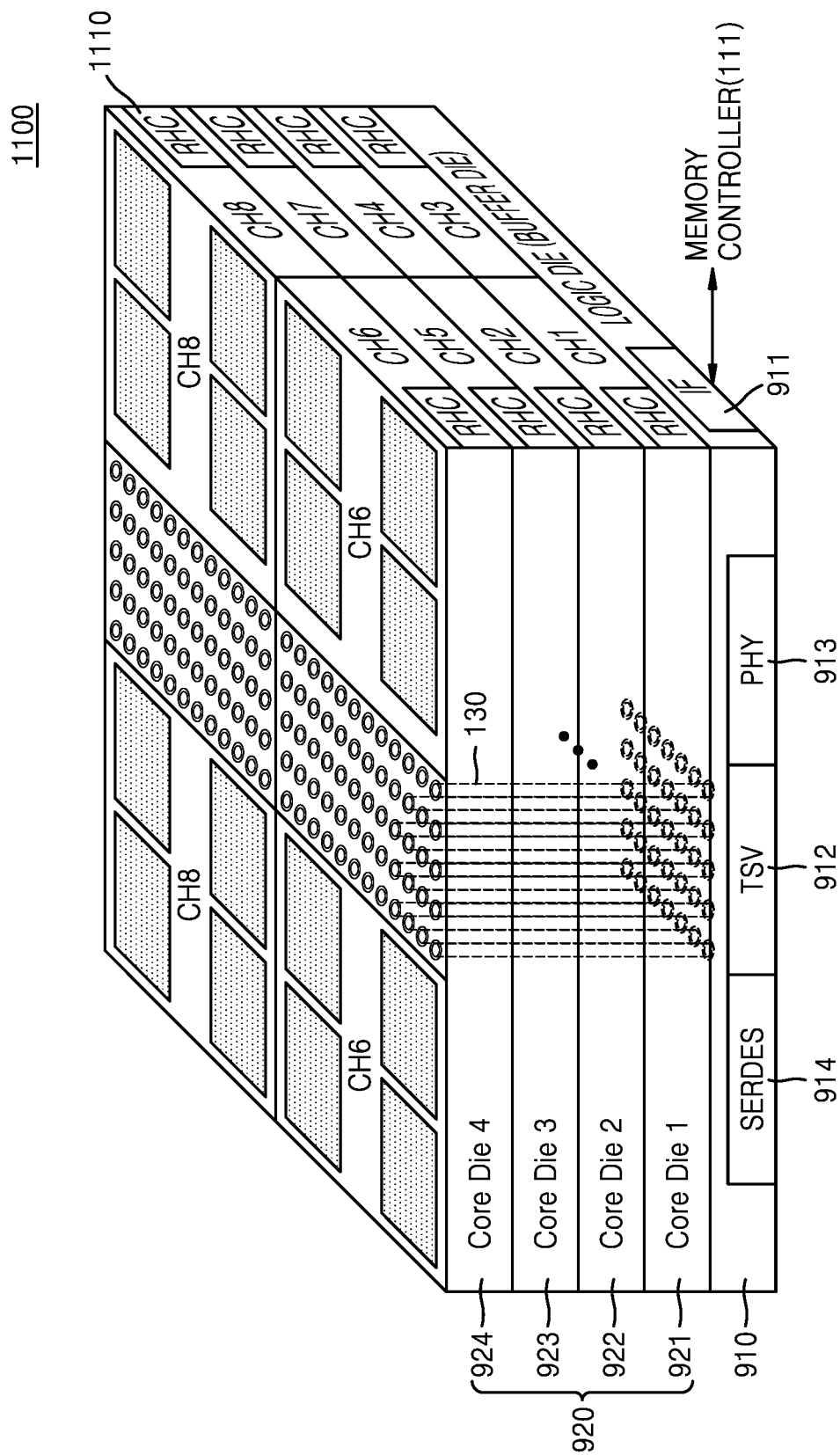
FIG. 11 is a diagram illustrating a memory device implemented as a high bandwidth memory (HBM) according to an embodiment of the present disclosure.

FIG. 11 is a diagram illustrating a memory device implemented as a high bandwidth memory (HBM) according to an embodiment of the present disclosure. Referring now to FIG. 11, the HBM configuration shown in FIG. 11 may be provided as an example and is not limited to that shown in FIG. 11. The memory device 1100 shown in FIG. 11 may be referred to as HBM. The memory device 1100 may be connected to a host (e.g., the host device 110 shown in FIG. 1) through the HBM protocol of the JEDEC standard. The HBM protocol may be a high-performance random access memory interface for three-dimensional stacked memories (e.g., DRAM). The memory device 1100 generally achieves a wider bandwidth, while consuming less power, in a substantially less form factor than other DRAM technologies (e.g., DDR4, GDDR5, etc.).

The memory device 1100 may have a high bandwidth by including a plurality of channels CH1 to CH8 having interfaces independent of each other. The memory device 1100 may include a plurality of dies 910 and 920. For example, the memory device 1100 may include a logic die (or buffer die) 910 and one or more core dies 920. One or more core dies 920 may be stacked over the logic die 910. In FIG. 11, the first to fourth core dies 921 to 924 may be included in the memory device 1100, but the number of one or more core dies 920 may be variously changed. One or more core dies 920 may be referred to as memory dies.

Each of the first to fourth core dies 921 to 924 may include one or more channels. For example, each of the first to fourth core dies 921 to 924 may include two channels, and the memory device 1100 may include eight channels CH1 to CH8. Specifically, for example, the first core die 921 may include a first channel CH1 and a third channel CH3, the second core die 922 may include a second channel CH2 and a fourth channel CH4, the third core die 923 may include a fifth channel CH5 and a seventh channel CH7, and the fourth core die 924 may include a sixth channel CH6 and an eighth channel CH8.

The logic die 910 may include an interface circuit (IF) 911 that communicates with the memory controller 111. The logic die 910 may receive commands/addresses and data from the memory controller 111 through the interface circuit 911. The interface circuit 911 is a channel through which the memory controller 111 requests a memory operation or calculation process, and may transfer a command/address and data. Each of the core dies 920 or each of the channels CH1 to CH8 may include a processor-in-memory (PIM) circuit.

Each of the channels CH1 to CH8 may include a plurality of banks, and one or more processing elements may be provided in a PIM circuit of each channel. As an example, the number of processing elements in each channel may be equal to the number of banks. As the number of processing elements is less than the number of banks, one processing element may be shared by at least two banks. The PIM circuit of each channel may execute a kernel offloaded by the memory controller 111.

Each of the channels CH1 to CH8 may include the row hammer managing circuit (RHC) 1110 described above with reference to FIGS. 1 to 10. Each of the channels CH1 to CH8 may further include a memory cell array and a refresh control circuit. The logic die 910 may further include a through silicon via (TSV) region 912, an HBM physical layer interface (HBM PHY) region 913, and a serializer/deserializer (SERDES) region 914. The TSV region 912 is a region in which a TSV for communication with the core dies 920 is formed, and is a region in which the bus(es) 130 disposed corresponding to the channel(s) CH1 to CH8 are formed. When each channel CH1 to CH8 has a bandwidth of 128 bits, the TSVs may include configurations for data I/O of 1024 bits.

The HBM PHY region 913 may include a plurality of I/O circuits for communication with the memory controller 111 and the channels CH1 to CH8, and for example, the HBM PHY region 913 may include one or more interconnect circuits for connecting the memory controller 111 to the channels CH1 to CH8. The HBM PHY region 913 may include physical or electrical layers and logical layers provided for signals, frequency, timing, driving, detailed operating parameters and any functionality used for efficient communication between the memory controller 111 and the channels CH1 to CH8. The HBM PHY region 913 may perform memory interfacing such as selecting a row and column corresponding to a memory cell for a corresponding channel, writing data to the memory cell, or reading the written data. The HBM PHY region 913 may support features of the HBM protocol of the JEDEC standard.

As the processing throughput of the processor(s) of the memory controller 111 increases, and as demands for memory bandwidth increase, the SERDES area 914 is a region that provides a SERDES interface of the JEDEC standard. The SERDES region 914 may include a SERDES transmitter portion, a SERDES receiver portion, and a controller portion. The SERDES transmitter portion includes a parallel-to-serial circuit and a transmitter, and is capable of receiving a parallel data stream and serializing the received parallel data stream. The SERDES receiver portion includes a receiver amplifier, an equalizer, a clock and data recovery circuit, and a serial-to-parallel circuit, and may receive the serial data stream and parallelize the received serial data stream. The controller portion may include an error detection circuit, an error correction circuit, and a register such as First In First Out (FIFO).

The memory controller 111 may transmit commands/addresses and data through the bus(es) 130 disposed corresponding to the channel(s) CH1 to CH8. In some embodiments, the bus 130 may be formed to be divided for each channel, or a part of the bus 130 may be shared by at least two channels. The memory controller 111 may provide commands/addresses and data so that at least some of the plurality of computational tasks or kernels are executed in the memory device 1100. Operation processing may be performed in the PIM circuit of the channel designated by the memory controller 111. In one example, if the received command/address indicates an arithmetic process, the PIM circuit of the corresponding channel may perform operation processing using write data provided from the memory controller 111 and/or read data provided from the corresponding channel. In one example, when a command/address received through a corresponding channel of the memory device 1100 indicates a memory operation, a data access operation may be performed.

Figure 12:
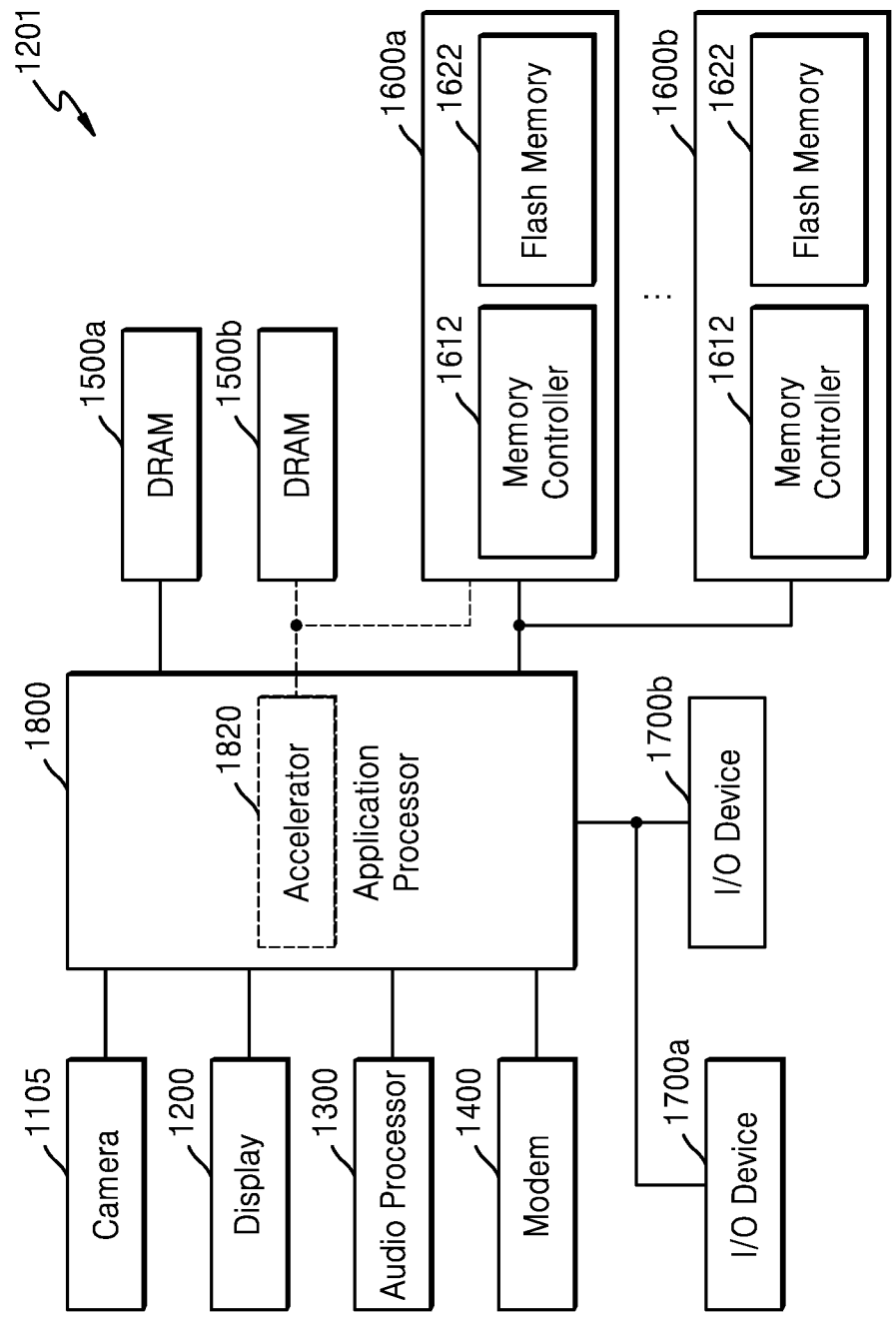
FIG. 12 is a diagram illustrating a system according to embodiments of the present disclosure.

FIG. 12 is a diagram illustrating a system according to embodiments of the present disclosure. Referring to FIG. 12, the system 1201 may include a camera 1105, a display 1200, an audio processor 1300, a modem 1400, DRAMs 1500a and 1500b, flash memory devices 1600a and 1600b, I/O devices 1700a and 1700b, and an AP 1800. The system 1201 may be implemented as a laptop computer, a mobile phone, a smart phone, a tablet personal computer, a wearable device, a healthcare device, or an Internet of Things (IoT) device. In addition, the system 1201 may be implemented as a server or a personal computer. The camera 1105 may take a still image or a moving picture according to a user's control, and may store the captured image/video data or transmit the stored captured image/video data to the display 1200. The audio processor 1300 may process audio data included in content of the flash memory devices 1600a and 1600b or a network. The modem 1400 modulates and transmits a signal to transmit/receive wired/wireless data, and may demodulate the modulated signal to restore the original signal at the receiving end. The I/O devices 1700a and 1700b may include devices that provide digital input and/or output functionality such as a Universal Serial Bus (USB) or storage, a digital camera, a Secure Digital (SD) card, a Digital Versatile Disc (DVD), a network adapter, a touch screen, and the like.

The AP 1800 may control the overall operation of the system 1201. The AP 1800 may control the display 1200 so that a part of the content stored in the flash memory devices 1600a and 1600b is displayed on the display 1200. When a user input is received through the I/O devices 1700a and 1700b, the AP 1800 may perform a control operation corresponding to the user input. The AP 1800 may include an accelerator block, which is a dedicated circuit for artificial intelligence (AI) data operation, or may include an accelerator chip 1820 separately from the AP 1800. A DRAM 1500b may be additionally mounted to the accelerator block or accelerator chip 1820. The accelerator chip 1820 is a function block that professionally performs a certain function of the AP 1800, and may include a GPU that is a function block that specializes in processing graphic data, a Neural Processing Unit (NPU) that is a block for professionally performing AI calculations and inference, and a Data Processing Unit (DPU) that is a block for specializing in data transfer.

The system 1201 may include the plurality of DRAMs 1500a and 1500b. The AP 1800 may control the DRAMs 1500a and 1500b through the command and mode register (MRS) setting that meets the JEDEC standard, and communicate by setting the DRAM interface protocol to use company-specific functions such as low voltage/high speed/reliability and Cyclic Redundancy Check (CRC)/Error Correction Code (ECC) functions. For example, the AP 1800 may communicate with the DRAM 1500a through an interface conforming to JEDEC standards such as LPDDR4 and LPDDR5, and the accelerator block or accelerator chip 1820 may communicate by setting a new DRAM interface protocol to control the DRAM 1500b having a higher bandwidth than the DRAM 1500a.

Although only the DRAMs 1500a and 1500b are illustrated in FIG. 12, embodiments of the inventive concept are not limited thereto, and if bandwidth, reaction speed, and voltage conditions of the AP 1800 or accelerator chip 1820 are satisfied, any memory, such as PRAM, SRAM, MRAM, RRAM, FRAM, or Hybrid RAM, may be used. The DRAMs 1500a and 1500b have relatively less latency and bandwidth than the I/O devices 1700a and 1700b or the flash memory devices 1600a and 1600b. The DRAMs 1500a and 1500b may be initialized at the power-on time point of system 1201, and may be used as a temporary storage location for the operating system and application data loaded with the operating system and application data, or may be used as an execution space for various software codes.

In the DRAMs 1500a and 1500b, addition/subtraction/multiplication/division operations, vector operations, address operations, or Fast Fourier Transform (FFT) operations may be performed. In addition, a function used for inference may be performed in the DRAMs 1500a and 1500b. Here, the inference may be performed in a deep learning algorithm using an artificial neural network. The deep learning algorithm may include a training operation of learning a model through various data and an inference operation of recognizing data with the learned model. As an embodiment, the image captured by the user through the camera 1105 is signal-processed and stored in the DRAM 1500b, and the accelerator block or accelerator chip 1820 may perform AI data operation for recognizing data using data stored in the DRAM 1500b and a function used for inference.

The system 1201 may include a plurality of storage or a plurality of flash memory devices 1600a and 1600b having a larger capacity than the DRAMs 1500a and 1500b. The accelerator block or accelerator chip 1820 may perform a training operation and AI data operation by using the flash memory devices 1600a and 1600b. In an embodiment, the flash memory devices 1600a and 1600b may each include a memory controller 1612 and a flash memory 1622 and may more efficiently perform a training operation and an inference AI data operation performed by the AP 1800 and/or the accelerator chip 1820 using the arithmetic device provided in the memory controller 1612. The flash memory devices 1600a and 1600b may store pictures taken through the camera 1105 or data transmitted through a data network. For example, augmented reality/virtual reality, High Definition (HD), or Ultra High Definition (UHD) content may be stored. The DRAMs 1500a and 1500b may include the row hammer managing circuit described with reference to FIGS. 1 to 10.

Figure 13:
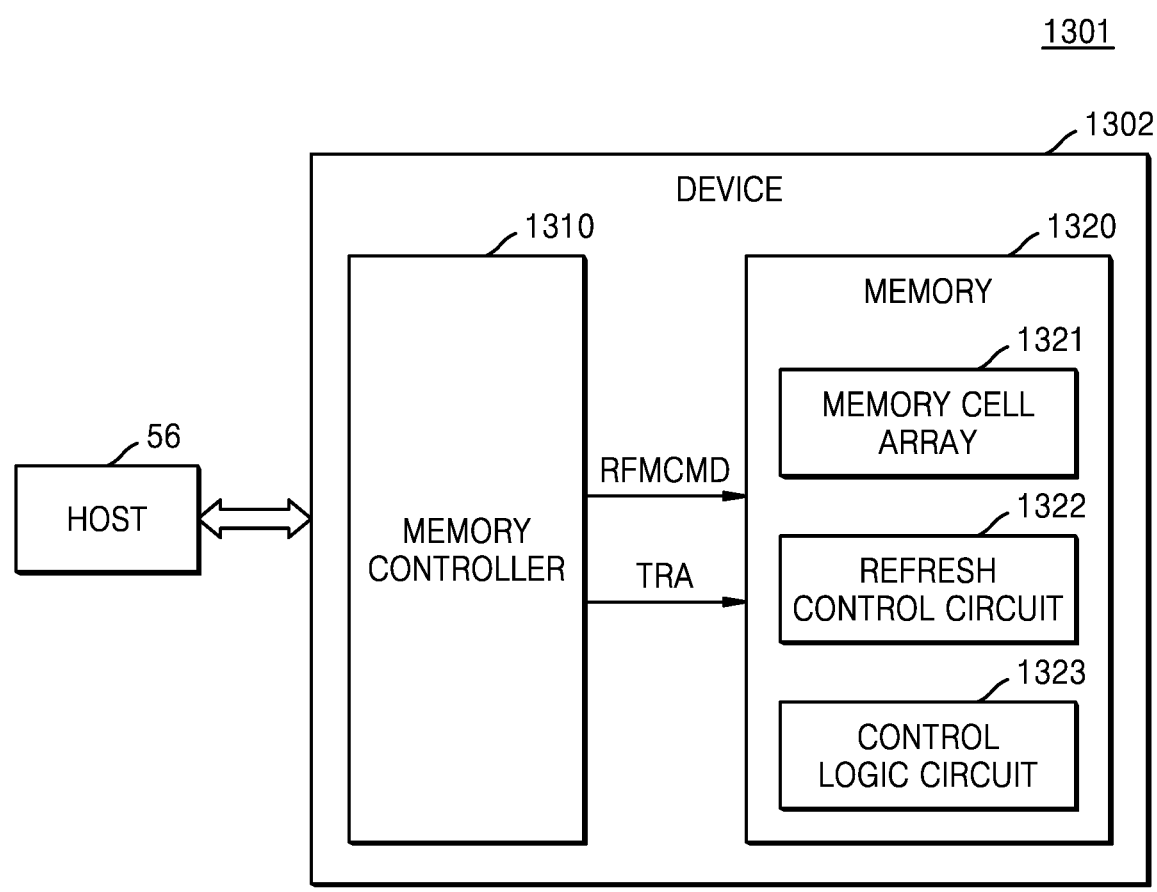
FIG. 13 is a diagram illustrating a system according to some embodiments of the present disclosure.

FIG. 13 is a diagram illustrating a system 1301 according to some embodiments.

Referring to FIG. 13, the system 1301 may be a computing system, such as a computer, a notebook computer, a server, a work station, a portable communication terminal, a personal digital assistant (PDA), a portable multimedia player (PMP), a smartphone, and a wearable device. The system 1301 may include a host 56 and a device 1302.

The host 56 may provide accesses to the device 1302 to the device 1302, like a host device 110 of FIG. 1. An access may include an active command and a row address. However, the access is not limited thereto. The row address provided by the host 56 may be referred to as an input row address. The host 56 may sequentially output the accesses.

The device 1302 may be a storage device or a memory device configured to write data or read data in response to a request by the host 56. The device 1302 may communicate with the host 56 through a communication interface. The device 1302 may include a memory controller 1310 and a memory 1320.

The memory controller 1310 may control the memory 1320 to write data or read stored data in response to the access by the host 56. For example, the memory controller 1310 may output, to the memory 1320, a write command and address instructing data writing. As another example, the memory controller 1310 may output, to the memory 1320, a read command and address instructing reading of data stored in the memory 1320. As another example, the memory controller 1310 may output, to the memory 1320, a refresh command (and at least one row address).

The memory controller 1310 may receive the input row addresses accessed by the host 56. Also, based on the input row addresses, the memory controller 1310 may detect a pattern size of a row hammer attack pattern and row distribution of row hammer addresses in the row hammer attack pattern.

There may be various row hammer attack patterns. For example, the row hammer attack patterns may include national cyber security center (NCSC), A4, Google type 1, uniform random, blacksmith, etc.

The pattern size may correspond to a period during which attacks on all memory cell rows subject to attack, from among a plurality of memory cell rows of a memory cell array 1321, are completed. That is, the pattern size may denote a minimum length of repetition of an access order. Here, the minimum length may be the minimum number of accesses or the minimum number of row addresses. For example, when the row addresses of number 1, number 2, number 3, number 2, and number 3 are repeated (that is, "12323 . . . "), the pattern size may be 5. As described above, because there may be various row hammer attack patterns, the pattern size may vary according to the attack patterns. The pattern size may be referred to as a pattern length, a pattern operation time, etc.

The row hammer address may be a row address corresponding to a memory cell row attacked in the row hammer attack pattern.

The memory cell row may be memory cells connected to the same word line from among a plurality of memory cells included in the memory cell array 1321.

The row distribution may be distribution of the number of accesses with respect to memory cell rows in a row hammer attack pattern. Types of row distribution may be divided into a uniform type and a non-uniform type.

The uniform type may denote that the distribution of the number of accesses to memory cell rows in the row hammer attack pattern is uniform. For example, when the row hammer attack pattern is a pattern whereby the row addresses of number 1, number 2, number 3, number 3, number 2, number 1, number 1, number 2, number 3, number 3, number 2, and number 1 are accessed (that is, "123321123321"), the pattern size may be 6, and the row addresses of number 1, number 2, and number 3 are each equally accessed four times, and thus, the row distribution with respect to the corresponding row hammer attack may be uniform.

The non-uniform type may denote that the distribution of the number of accesses to the memory cell rows in the row hammer attack pattern is non-uniform.

The memory controller 1310 may determine whether to perform refresh management according to the row distribution type of the row hammer addresses. The refresh management may be defined by a double data rate (DDR) and/or a low power DDR (LPDDR) of the joint electron device engineering council (JEDEC) standards, and in detail, was started to be adopted from the DDR5 standards and the LPDDR5 standards. A refresh management interface may provide an additional time margin, rather than insufficient refresh time margin stealing, while not disrupting the passive DRAM characteristics.

When the refresh management is determined, the memory controller 1310 may provide, to the memory 1320, a refresh management command RFMCMD and a target row address TRA according to the refresh management, for every L access (L is an integer greater than or equal to 1) corresponding to the pattern size. When the refresh management command RFMCMD is provided to the memory 1320, a time margin for performing a refresh operation on a row hammer address, the time margin corresponding to a predetermined time period, may be provided. A target row address TRA may be a row hammer address that is detected and may be a row address corresponding to a target memory cell row that is subject to be refreshed from among the plurality of memory cell rows of the memory cell array 1321.

The memory 1320 may be realized as a volatile memory. The volatile memory include, for example, dynamic random-access memory (DRAM), static random-access memory (SRAM), mobile DRAM, DDR synchronous DRAM (DDR SDRAM), LPDDR SDRAM, graphic DDR (GDDR) SDRAM, rambus DRAM (RDRAM), etc. However, the volatile memory is not limited thereto.

The memory 1320 may include the memory cell array 1321, a refresh control circuit 1322, and a control logic circuit 1323.

The memory cell array 1321 may include a plurality of memory cell rows. A memory cell included in a memory cell row may include a volatile memory cell, for example, a DRAM cell.

The refresh control circuit 1322 may perform a refresh operation on the target memory cell row corresponding to the target row address TRA. Also, the refresh control circuit 1322 may additionally perform a refresh operation on at least one memory cell row adjacent to the target memory cell row.

The control logic circuit 1323 may generate control signals configured to control an operation timing of the memory 1320 and/or a memory operation. The control logic circuit 1323 may output, to the refresh control circuit 1322, some of generated control signals.

As described above, by estimating the pattern size of various row hammer attack patterns and adjusting a timing of the refresh operation according to the estimated pattern size, the performance and reliability of the device 1302 may be improved.

Also, as described above, by performing the refresh management operation on the uniform row hammer attack pattern, the performance and the reliability of the device 1302 may be improved.

Figure 14:
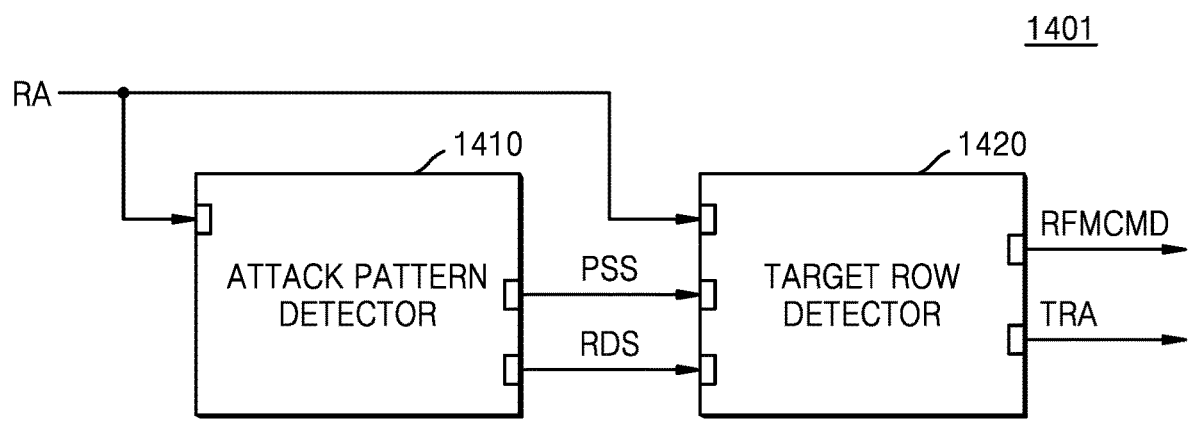
FIG. 14 is a diagram illustrating a memory controller according to some embodiments of the present disclosure.

FIG. 14 is a diagram illustrating a memory controller 1401 according to some embodiments.

Referring to FIG. 14, the memory controller 1401 may correspond to the memory controller 1310 of FIG. 13. The memory controller 1401 may include an attack pattern detector 1410 and a target row detector 1420.

The attack pattern detector 1410 may sequentially receive input row addresses RA. The input row addresses RA may be provided by the host 56 of FIG. 13.

The attack pattern detector 1410 may detect a pattern size of a row hammer attack pattern, based on the number of rows of a row hammer address that is attacked from among the input row addresses RA. The attack pattern detector 1410 may output a pattern size signal PSS indicating the pattern size of the row hammer attack pattern to the target row detector 1420. The pattern size signal PSS may be a signal including a plurality of bits. For example, when the pattern size is L, a value of the pattern size signal PSS may be L.

The attack pattern detector 1410 may detect row distribution based on an access number ratio in the input row addresses RA. The attack pattern detector 1410 may output a row distribution signal RDS indicating a row distribution type to the target row detector 1420. The row distribution signal RDS may have a first logic level or a second logic level. For example, when a logic level of the row distribution signal RDS is the first logic level, the row distribution type may be a uniform type, and when the logic level of the row distribution signal RDS is the second logic level, the row distribution type may be a non-uniform type. However, the row distribution signal RDS is not limited thereto.

The access number ratio may be an access number ratio of a row hammer address most attacked to the number of accesses of a row hammer address least attacked (for example, "the number of accesses (of the row address most attacked)"/"the number of accesses (of the row address least attacked)").

The row hammer address least attacked may be a row address having the least number of accesses in the row hammer attack pattern. The row hammer address most attacked may be a row address having the greatest number of accesses in the row hammer attack pattern.

The target row detector 1420 may sequentially receive the input row addresses RA. During a monitoring period, the target row detector 1420 may search for an input row address that is greater than a pre-row hammer address already detected, from among the input row addresses RA, as the target row address TRA. For example, that any one row address is greater than another row address may denote that an address value of the row address is relatively greater than that of the other row address, or a number of the row address is relatively greater than that of the other row address.

The pre-row hammer address may be a row address, detection of which as a row hammer address is completed during a previous monitoring period before a current monitoring period.

The monitoring period may be a period during which L input row addresses according to a pattern size signal PSS are input.

When a row distribution signal RDS indicates that the row distribution type is a uniform type, the target row detector 1420 may, in response to the row distribution signal RDS, output a refresh management command RFMCMD together with the target row address TRA. For example, the target row detector 1420 may, in response to the first logic level of the row distribution signal RDS, output the refresh management command RFMCMD and the target row address TRA.

When the row distribution signal RDS indicates that the row distribution type is a non-uniform type, the target row detector 1420 may, in response to the row distribution signal RDS, not output the refresh management command RFMCMD and the target row address TRA and may stand by. For example, the target row detector 1420 may stand by, in response to the second logic level of the row distribution signal RDS.

When the row distribution is estimated to be uniform, it may be possible to manage the disturbance according to an estimated pattern size.

When the row distribution is estimated to be non-uniform, it may be possible to reduce power consumption by stopping the refresh management.

Figure 15:
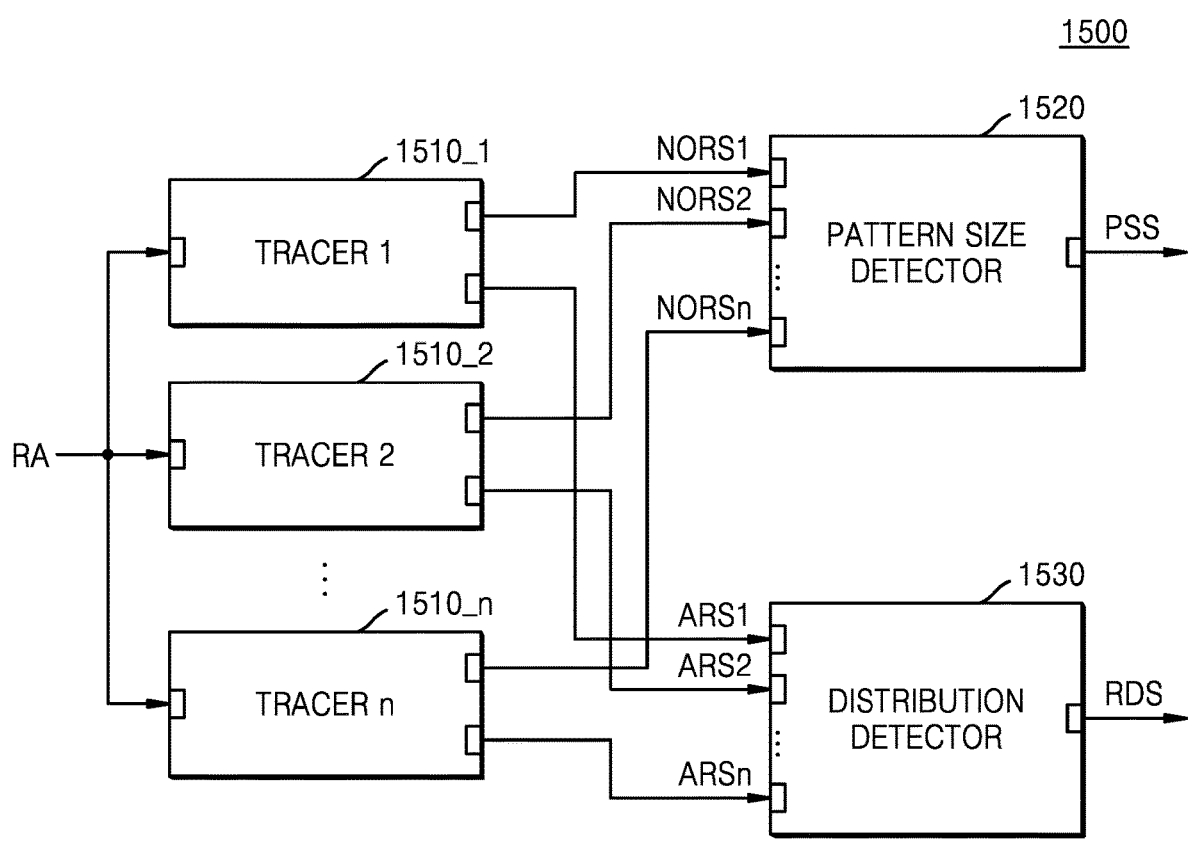
FIG. 15 is a diagram illustrating an attack pattern detector according to some embodiments of the present disclosure.

FIG. 15 is a diagram illustrating an attack pattern detector 1500 according to some embodiments.

Referring to FIG. 15, the attack pattern detector 1500 may correspond to the attack pattern detector 1410 of FIG. 14. The attack pattern detector 1500 may include a plurality of tracers 1510_1, 1510_2, and 1510_n, a pattern size detector 1520, and a distribution detector 1530.

The plurality of tracers 1510_1, 1510_2, and 1510_n may receive input row addresses RA and may output a plurality of row number signals NORS1, NORS2, and NORSn and a plurality of ratio signals ARS1, ARS2, and ARSn. The row number signal may indicate the number of rows of a row hammer address. The ratio signal may indicate an access number ratio. The access number ratio may indicate a ratio of the maximum number of accesses of a pre-row hammer address to the minimum number of accesses of the pre-row hammer address (for example, "the maximum number of accesses/the minimum number of accesses").

In detail, during a monitoring period set for each tracer, the tracer may count the number of rows of a row hammer address based on the input row addresses RA. Each tracer may output the row number signal.

In detail, during the monitoring period set for each tracer, the tracer may count the minimum number of accesses and the maximum number of accesses of the pre-row hammer address based on the input row addresses RA. Each tracer may calculate the access number ratio. Also, each tracer may output the ratio signal.

The monitoring period set for each tracer may be a period during which the same number of input row addresses RA as each different limit value set for each tracer are input.

For example, a first tracer 1510_1 may count a first number of rows during a first monitoring period during which M (M is an integer greater than or equal to 2) input row addresses are input and may calculate a first access number ratio. Also, the first tracer 1510_1 may output a first ratio signal ARS1 and a first row number signal NORS1. Here, when an initial value is 0, a limit value of the first monitoring period may be M−1.

As another example, a second tracer 1510_2 may count a second number of rows during a second monitoring period during which K (K is an integer greater than or equal to 2, which is different from M) input row addresses are input and may calculate a second access number ratio. Also, the second tracer 1510_2 may output a second ratio signal ARS2 and a second row number signal NORS2. Here, when an initial value is 0, a limit value of the second monitoring period may be K−1.

As another example, an nth tracer 1510_n may count an nth number of rows during an nth monitoring period during which P (P is an integer greater than or equal to 2, which is different from M and K) input row addresses are input and may calculate an nth access number ratio. Also, the nth tracer 1510_n may output an nth ratio signal ARSn and an nth row number signal NORSn. Here, when an initial value is 0, a limit value of the nth monitoring period may be P−1.

The pattern size detector 1520 may receive the plurality of row number signals NORS1, NORS2, and NORSn. A minimum limit value that is set for a tracer that outputs the number of rows, determined to be true, from among the numbers of rows, may be detected as the pattern size. The pattern size detector 1520 may output the pattern size signal PSS.

The distribution detector 1530 may receive the plurality of ratio signals ARS1, ARS2, and ARSn. The distribution detector 1530 may divide types of row distribution into a uniform type or a non-uniform type based on the access number ratios and a reference value. Also, the distribution detector 1530 may output a row distribution signal RDS.

Figure 16:
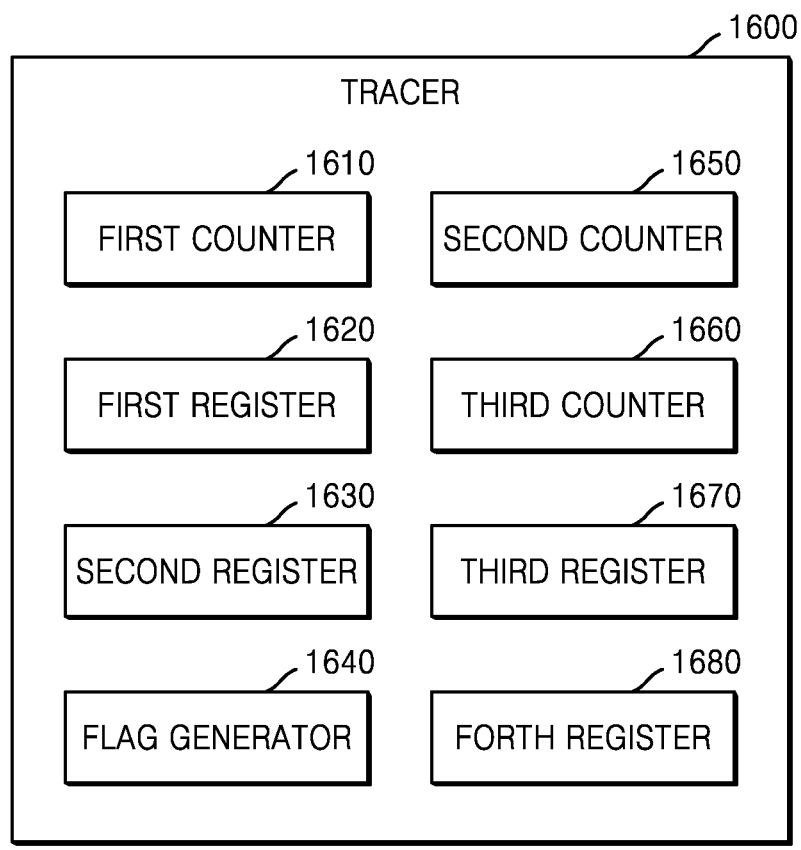
FIG. 16 is a diagram illustrating a tracer according to some embodiments of the present disclosure.

FIG. 16 is a diagram illustrating a tracer 1600 according to some embodiments.

Referring to FIG. 16, the tracer 1600 may exemplify any one of the plurality of tracers 1510_1, 1510_2, and 1510_n of FIG. 15. The tracer 1600 may include a first counter 1610, a first register 1620, a second register 1630, a flag generator 1640, a second counter 1650, a third counter 1660, a third register 1670, and a fourth register 1680.

The first counter 1610 may count the number of times an input row address is input, during a monitoring period, from an initial value to a limit value. The initial value may be, for example, 0, but is not limited thereto. The limit value may be differently set for each tracer 1600. The first counter 1610 may increase the counted number by 1 whenever the input row address is input, during the monitoring period. The first counter 1610 may operate round robin.

The first register 1620 may store a pre-row hammer address.

The second register 1630 may store an input row address that is to correspond to a candidate of a row hammer address.

The flag generator 1640 may generate a flag signal having a first bit value or a second bit value. For example, when an input row address that is less than or equal to a pre-row hammer address is input, the flag signal may have the first bit value. When an input row address that is greater than the pre-row hammer address is input, the flag signal may have the second bit value.

The second counter 1650 may count the number of times an input row address that is the same as a pre-row hammer address is input.

The third counter 1660 may count one by one in response to the first bit value of the flag signal. The third counter 1660 may output the value counted so far in response to the second bit value of the flag signal as the row number signal.

The third register 1670 may store a value counted by the third counter 1660, which is less than or equal to a currently stored value, as a minimum number of accesses.

The fourth register 1680 may store a value counted by the third counter 1660, which is greater than the currently stored value, as a maximum number of accesses.

Figure 17A:
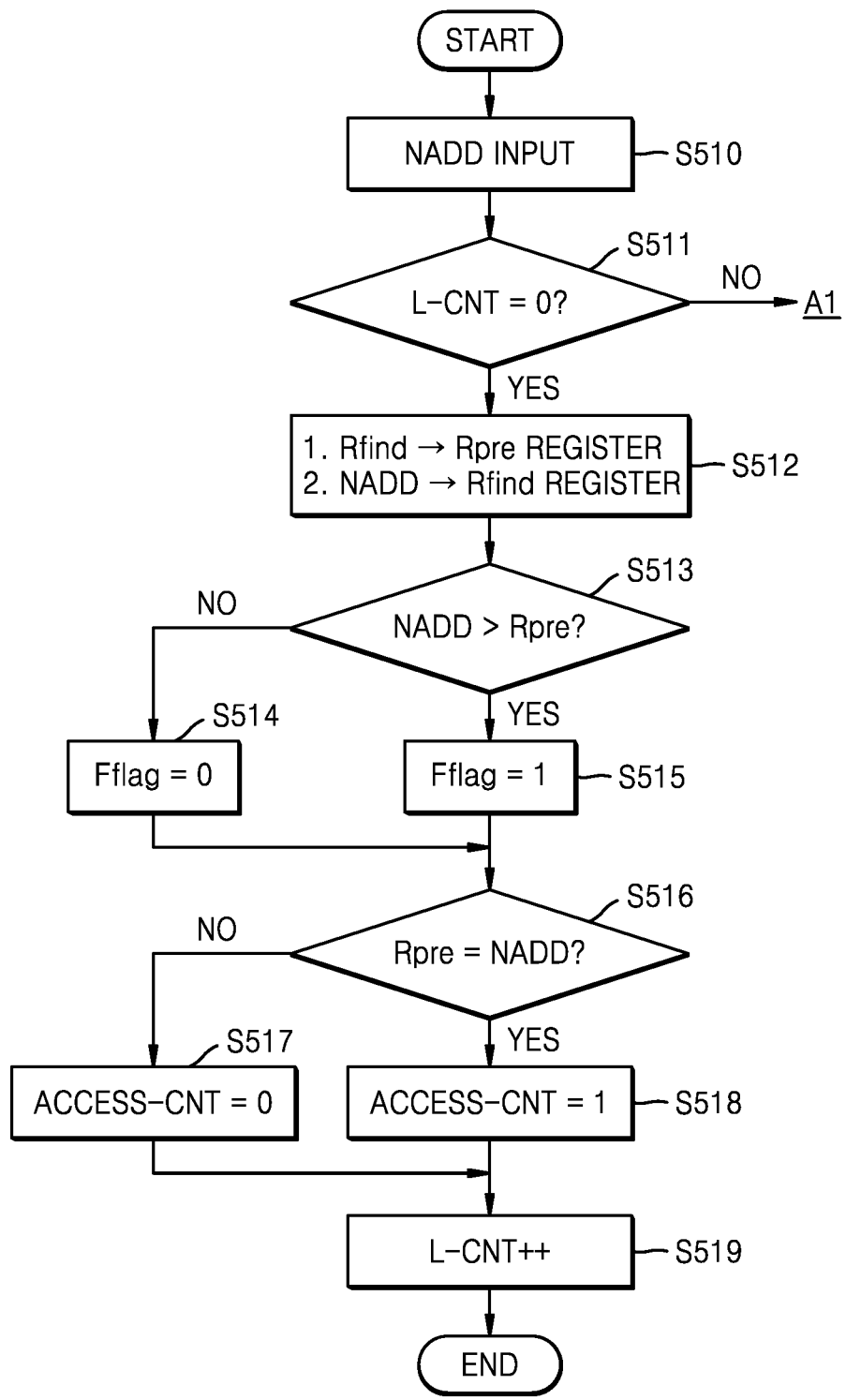
FIGS. 17A, 17B, and 17C are flowcharts illustrating an operating method of the tracer of FIG. 16 according to some embodiments of the present disclosure.
Figure 17B:
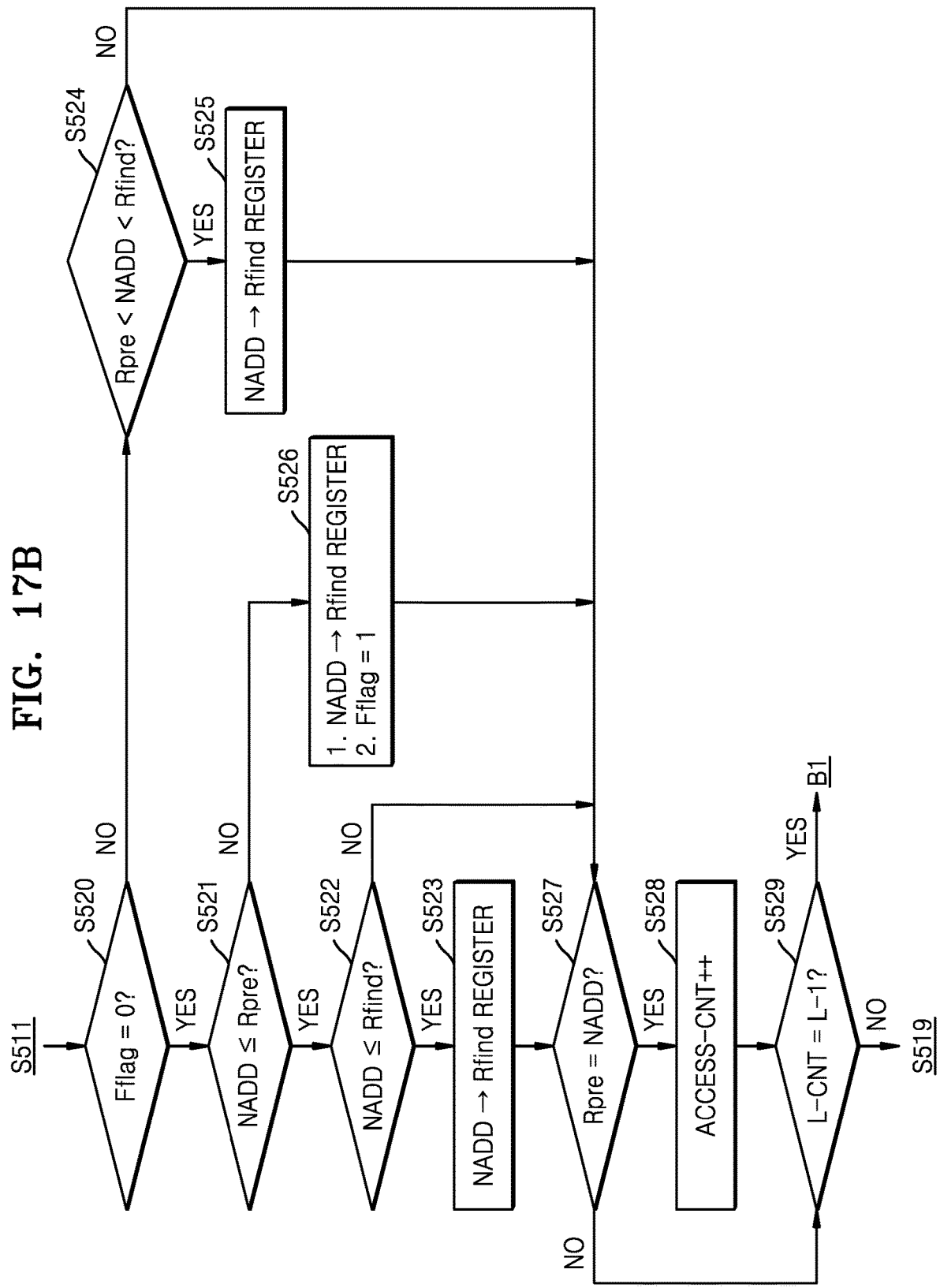
Figure 17C:
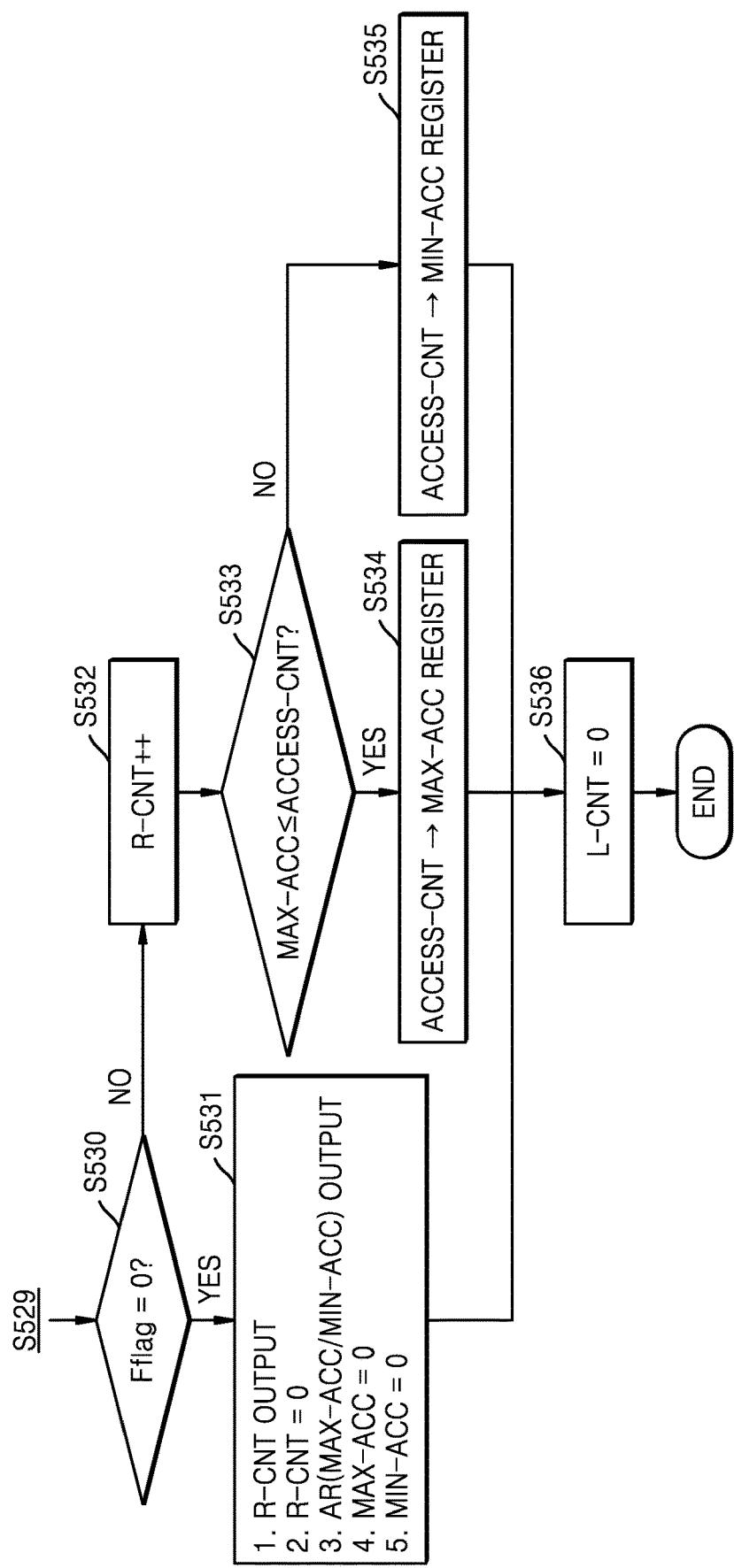

FIGS. 17A, 17B, and 17C are flowcharts of an operating method of the tracer 1600 of FIG. 16.

Referring to FIG. 17A, in operation S510, a new input row address NADD may be input in the tracer 1600.

In operation S511, whether an L-count L-CNT is an initial value (e.g., 0) may be identified. The L-count L-CNT may be a value counted by the first counter 1610 of FIG. 16. "L" of the L-count L-CNT may be related to a limit value set for each tracer.

When the L-count L-CNT is the initial value (e.g., 0) (S511, YES), a row address Rfind may be stored in a register Rpre REGISTER in operation S512. Also, a new input row address NADD may be stored in the register Rfind REGISTER.

The row address Rfind to be stored in the register Rpre REGISTER may be a row address, detection of which as a row hammer address is completed during a previous monitoring period. When storing of the row address Rfind in the register Rpre REGISTER is completed, the corresponding row address may be referred to as a pre-row hammer address Rpre. The register Rpre REGISTER may be the first register 1620 of FIG. 16. The register Rfind REGISTER may be the second register 1630 of FIG. 16.

In operation S513, whether the new input row address NADD is greater than the pre-row hammer address Rpre may be identified.

When the new input row address NADD is not greater than the pre-row hammer address Rpre (S513, NO), a flag signal flag may have a first bit value (e.g., 0) in operation S514. The flag signal Fflag may be generated by the flag generator 1640 of FIG. 16.

When the new input row address NADD is greater than the pre-row hammer address Rpre (S513, YES), the flag signal flag may have a second bit value (e.g., 1) in operation S515.

In operation S516, whether the pre-row hammer address Rpre is the same as the new input row address NADD may be identified.

When the pre-row hammer address Rpre is different from the new input row address NADD (S516, NO), an access-count ACCESS-CNT may be 0 (or an initial value) in operation S517. The access-count ACCESS-CNT may be a value counted by the second counter 1650 of FIG. 16.

When the pre-row hammer address Rpre is the same as the new input row address NADD (S516, YES), the access-count ACCESS-CNT may be 1 (or the initial value+1) in operation S518.

In operation S519, the L-count L-CNT may increase by one (+1).

In operation S511, when the L-count L-CNT is not the initial value (e.g., 0) (S511, NO), an operation A1 of FIG. 17A may be performed. The operation A1 of FIG. 17A is illustrated in FIG. 17B.

Referring to FIG. 17B, in operation S520, whether the bit value of the flag signal Fflag is the first bit value may be identified.

When the bit value of the flag signal Fflag is the first bit value (S520, YES), whether the new input row address NADD is less than or equal to the pre-row hammer address Rpre may be identified in operation S521.

When the new input row address NADD is equal to or less the pre-row hammer address Rpre (S521, YES), whether the new input row address NADD is less than or equal to the row address Rfind may be identified in operation S522. The row address Rfind may be stored in the register Rfind REGISTER.

When the new input row address NADD is less than or equal to the row address Rfind (S522, YES), the new input row address NADD may be stored in the register Rfind REGISTER in operation S523.

When the bit value of the flag signal Fflag is the second bit value (S520, NO), whether the new input row address NADD is greater than the pre-row hammer address Rpre and less than the row address Rfind may be identified in operation S524.

When the new input row address NADD is greater than the pre-row hammer address Rpre and less than the row address Rfind (S524, YES), the new input row address NADD may be stored in the register Rfind REGISTER in operation S525.

When the new input row address NADD is greater than the pre-row hammer address Rpre (S521, NO), the new input row address NADD may be stored in the register Rfind REGISTER in operation S526. Also, the bit value of the flag signal Fflag may be changed from the first bit value to the second bit value.

After operation S523, operation S527 may be performed. Alternatively, when the new input row address NADD is greater than the row address Rfind (S522, NO) in operation S522, operation S527 may be performed. Alternatively, after operation S526, operation S527 may be performed. Alternatively, after operation S525, operation S527 may be performed. In operation S524, when the new input row address NADD is less than or equal to the pre-row hammer address Rpre, or when the new input row address NADD is greater than the row address Rfind (S524, NO), operation S527 may be performed.

In operation S527, whether the pre-row hammer address Rpre is the same as the new input row address NADD may be identified.

When the pre-row hammer address Rpre is the same as the new input row address NADD (S527, YES), the access-count ACCESS-CNT may increase by one (+1) in operation S528.

When the pre-row hammer address Rpre is different from the new input row address NADD (S527, NO), operation S529 may be performed. Alternatively, after operation S528, operation S529 may be performed. In operation S529, whether the L-count L-CNT is L−1 may be identified.

When the L-count L-CNT is not L−1 (or when the L-count L-CNT is less than L−1) (S529, NO), operation S519 may be performed.

When the L-count L-CNT is L−1 (S529, YES), an operation B1 of FIG. 17B may be performed. The operation B1 of FIG. 17B is illustrated in FIG. 17C.

Referring to FIG. 17C, in operation S530, whether the bit value of the flag signal Fflag is the first bit value may be identified.

When the bit value of the flag signal Fflag is the first bit value (S520, YES), an R-count R-CNT may be output in operation S531. Also, after the R-count R-CNT is output, the R-count R-CNT may be initialized. Also, an access number ratio AR of a maximum number of accesses MAX-ACC to a minimum number of accesses MIN-ACC may be output. Also, the maximum number of accesses MAX-ACC may be initialized. Also, the minimum number of accesses MIN-ACC may be initialized.

The R-count R-CNT may be a value counted by the third counter 1660 of FIG. 16. The minimum number of accesses MIN-ACC may be a value stored in the third register 1670 of FIG. 16. The maximum number of accesses MAX-ACC may be a value stored in the fourth register 1680 of FIG. 16.

When the bit value of the flag signal Fflag is the second bit value (S520, NO), the R-count R-CNT may increase by one in operation S532.

In operation S533, whether the maximum number of accesses MAX-ACC is less than or equal to the access-count ACCESS-CNT may be identified.

When the maximum number of accesses MAX-ACC is less than or equal to the access-count ACCESS-CNT (S533, YES), the access-count ACCESS-CNT may be stored in a register MAX-ACC REGISTER in operation S534. The register MAX-ACC REGISTER may be the fourth register 1680 of FIG. 16.

When the maximum number of accesses MAX-ACC is greater than the access-count ACCESS-CNT (S533, NO), the access-count ACCESS-CNT may be stored in a register MIN-ACC REGISTER in operation S535. The register MIN-ACC REGISTER may be the third register 1670 of FIG. 16.

After operation S531, S534, or S535, operation S536 may be performed. In operation S536, the L-count L-CNT may be initialized.

Figure 18:
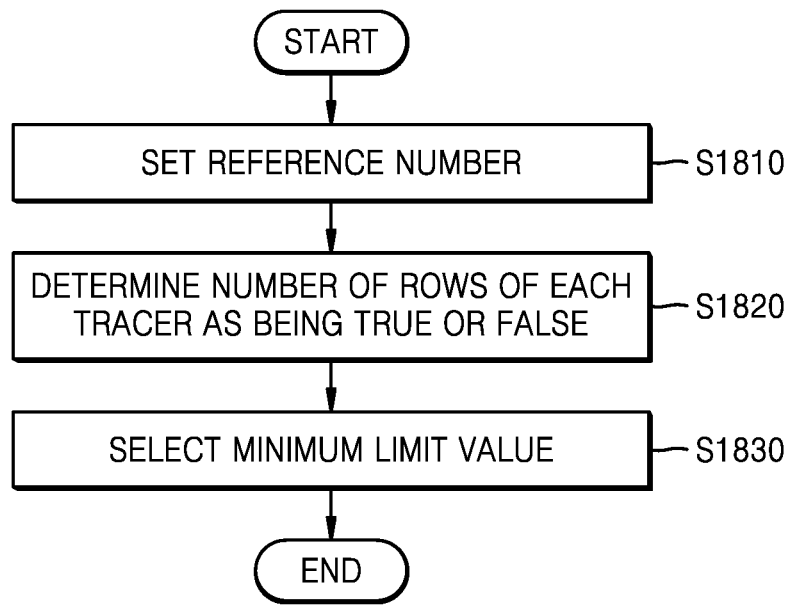
FIG. 18 is a flowchart of a method of detecting a pattern size according to some embodiments of the present disclosure.

FIG. 18 is a flowchart of a method of detecting a pattern size.

Referring to FIG. 18, operations S1810 to S1830 may be performed by the pattern size detector 1520 of FIG. 15.

An operation of setting a reference number may be performed in operation S1810. For example, the pattern size detector 1520 may set, as the reference number, the number of rows output from a tracer, for which a maximum limit value is set, from among the plurality of tracers 1510_1, 1510_2, and 1510_n.

An operation of determining true or false with respect to the number of rows output by each tracer may be performed in operation S1820. For example, the pattern size detector 1520 may determine true or false with respect to the number of rows of each tracer, by determining whether the number of rows of each tracer corresponds to the reference number.

An operation of selecting a minimum limit value may be performed in operation S1830. For example, the pattern size detector 1520 may select the minimum limit value from among limit values of the tracers outputting the number of rows determined as true.

Hereinafter, an example of the method of FIG. 18 based on three tracers will be described below with reference to FIG. 19.

FIG. 19 is a diagram illustrating an operation of detecting a pattern size, according to an embodiment.

Referring to FIG. 19, an attack pattern ATTACK PATTERN may indicate an actual row hammer attack pattern. An actual pattern size APS in the attack pattern ATTACK PATTERN may denote a size, for example, a length, of the actual row hammer attack pattern. The number of row hammers RH # in the attack pattern ATTACK PATTERN may be the total number of row addresses attacked in the actual row hammer attack pattern.

The number of rows NUMBER OF ROW may denote the number of rows output by each tracer.

In FIG. 19, "L=500" may indicate any one tracer of the three tracers, which has a limit value set as 500. In FIG. 19, "L=1000" may indicate another one tracer of the three tracers, which has a limit value set as 1000. In FIG. 19, "L=1500" may indicate yet another one tracer of the three tracers, which has a limit value set as 1500.

Being true or false TRUE/FALSE may indicate whether the number of rows output by each of the three tracers is true or false.

An estimated pattern size PATTERN SIZE (ESTIMATION) may denote a pattern size estimated from at least one of the numbers of rows determined as true.

An output pattern size PATTERN SIZE (OUTPUT) may denote a finally output pattern size.

In FIG. 19, when the actual pattern size APS is 200, and the number of row hammers RH # according to this is A, all the limit values respectively set for the three tracers are greater than 200, and thus, the numbers of rows output by the three tracers may be A. In this case, a maximum limit value is 1500 (i.e., "L=1500"), and thus, the number of rows of the tracer, the limit value of which is set as 1500, from among the three tracers, may be set as the reference number. Also, the number of rows of the tracer, the limit value of which is set as 1500, may be considered as true TRUE. Whether the number of rows output by each of the remaining two tracers corresponds to the reference number may be identified. The numbers of rows output by the remaining two tracers are A and are the same as the reference number, and thus, the numbers of rows output by the other two tracers may also be determined as true. According to this, the estimated pattern size PATTERN SIZE (ESTIMATION) may be 0 to 500. The minimum limit value of the limit values of the tracers outputting the numbers of rows determined as true is 500, and thus, the output pattern size PATTERN SIZE (OUTPUT) may be 500.

When the actual pattern size APS is 800, and the number of row hammers RH # according to this is B, the tracer having the limit value set as 500 may not trace 501 or more row addresses, and thus, the number of rows of the tracer having the limit value set as 500 may be different from B. The numbers of rows of the tracers having the limit values set as 1000 and 1500, respectively, may be B. As described above, the number of rows of the tracer having the limit value set as 1500 may be set as the reference number. When the pattern size detector 1520 determines whether the number of rows and the reference number correspond to each other, only the number of rows of the tracer having the limit value set as 500 from among the three tracers may be determined as false FALSE. The estimated pattern size PATTERN SIZE (ESTIMATION) may be 500 to 1000. The minimum limit value of the limit values of the tracers outputting the numbers of rows determined as true TRUE is 1000, and thus, the output pattern size PATTERN SIZE (OUTPUT) may be 1000.

Similarly to what is described above, when the actual pattern size APS is 1200, and the number of row hammers RH # according to this is C, the numbers of rows of the tracers having the limit values set as 500 and 1000, respectively, may be different from C. The number of rows of the tracer having the limit value set as 1500 may be C. The number of rows of the tracer having the limit value set as 1500 may be set as the reference number, and only the number of rows of the tracer having the limit value set as 1500 may be determined as true TRUE. Accordingly, the estimated pattern size PATTERN SIZE (ESTIMATION) may be 1000 to 1500. The minimum limit value is 1500, and thus, the output pattern size PATTERN SIZE (OUTPUT) may be 1500.

When the actual pattern size APS is 3000, and the number of rows RH # according to this is D, all of the three tracers may count the numbers of rows, which are different from D. The numbers of rows counted by all of the tracers may be different from the actual number of rows. However, because the number of rows of the tracer having the limit value set as 1500 may be set as the reference number, only the number of rows of the tracer having the limit value set as 1500 may be determined as true TRUE. Accordingly, the estimated pattern size PATTERN SIZE (ESTIMATION) may be 1000 to 1500, and the output pattern size PATTERN SIZE (OUTPUT) may be 1500.

FIGS. 20A, 20B, 20C, 20D, and 20E are flowcharts of a method of determining types of row distribution, according to some embodiments. The method of FIGS. 20A, 20B, 20C, 20D, and 20E may be performed by the distribution detector 1530 of FIG. 15.

Figure 20A:
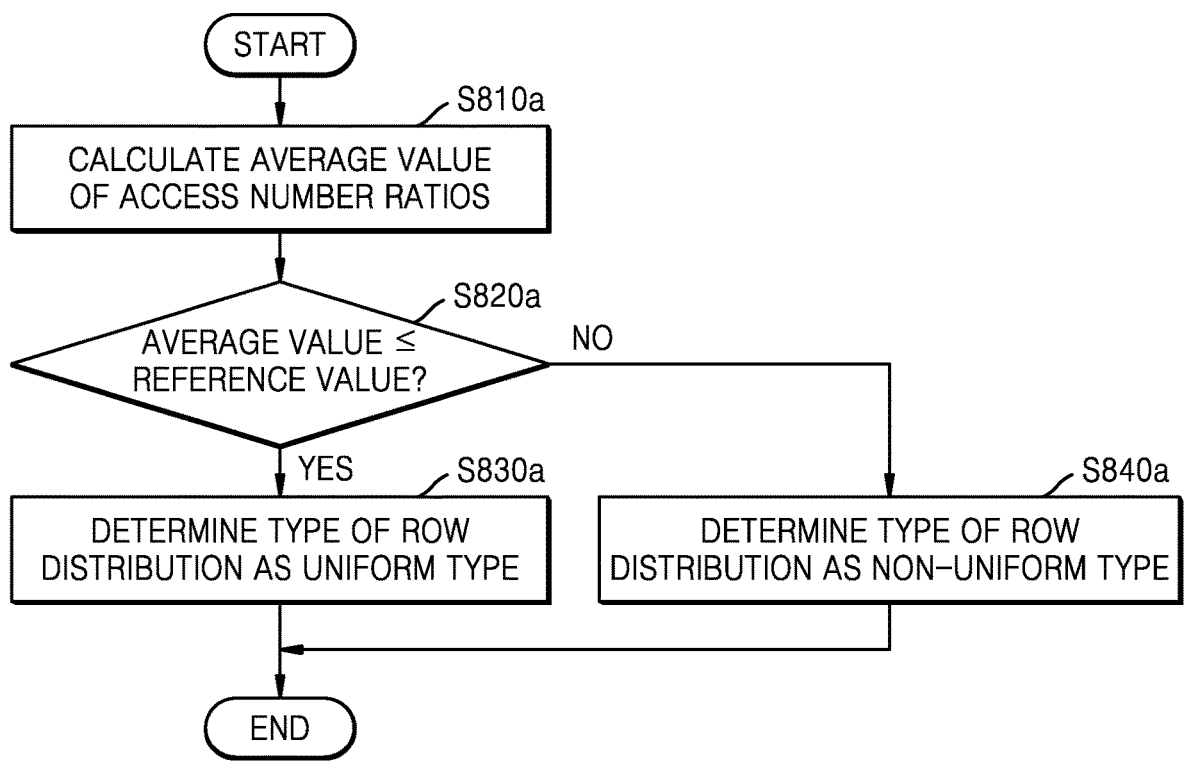
FIGS. 20A, 20B, 20C, 20D, and 20E are flowcharts of a method of determining types of row distribution, according to some embodiments of the present disclosure.

Referring to FIG. 20A, the distribution detector 1530 may calculate an average value of access number ratios in operation S810a. Referring to FIG. 15, for example, the distribution detector 1530 may obtain the access number ratios from the plurality of ratio signals ARS1, ARS2, and ARSn and may calculate the average value of the access number ratios.

The distribution detector 1530 may determine whether the average value is less than or equal to a reference value in operation S820a. The reference value may be, for example, 5, but is not limited thereto.

When the average value is less than or equal to the reference value (S820a, YES), the distribution detector 1530 may determine a row distribution type as a uniform type in operation S830a.

When the average value is greater than the reference value (S820a, NO), the distribution detector 1530 may determine a row distribution type as non-uniform type in operation S840a.

Figure 20B:
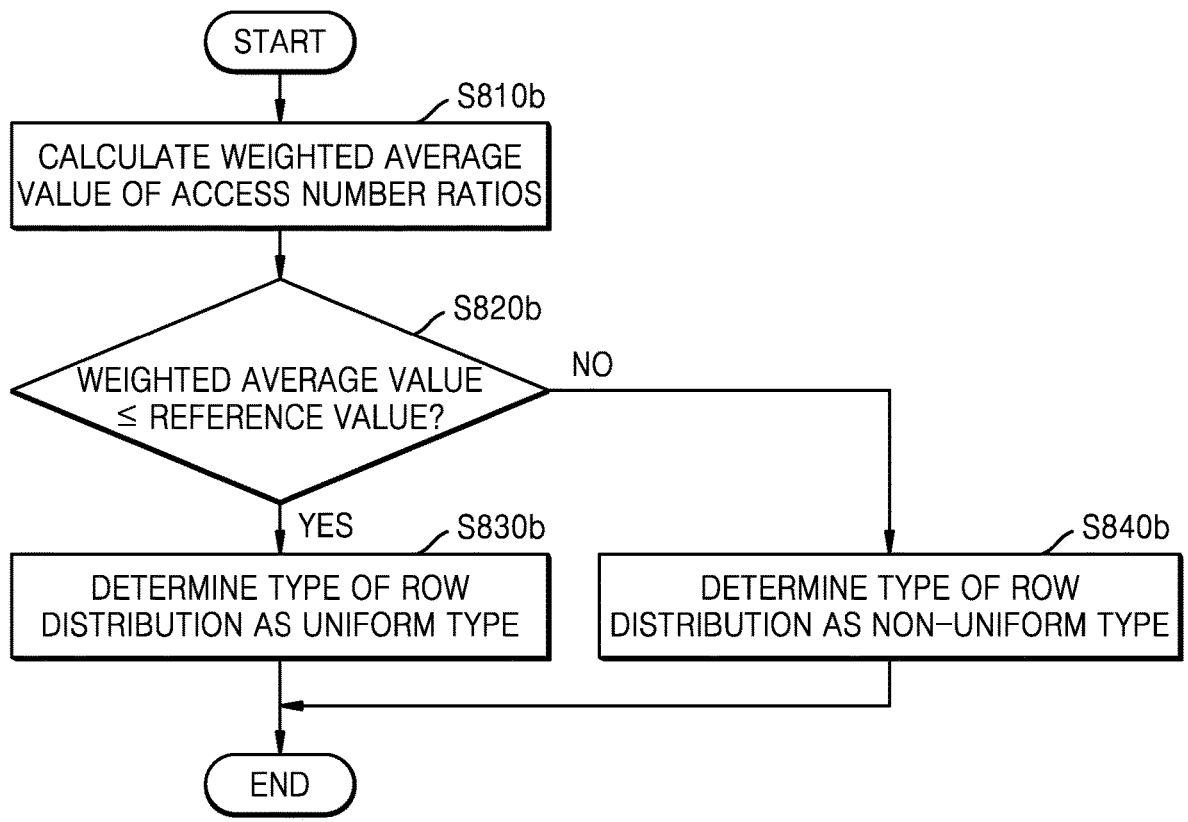

Referring to FIG. 20B, the distribution detector 1530 may calculate a weighted average value of the access number ratios in operation S810b. The weighted average value may be obtained by reflecting each weight value to each access number ratio and calculating an average value of the access number ratios in which the weight values are reflected, respectively. The weight value may be determined according to a limit value set for each tracer. For example, referring to FIG. 15, the distribution detector 1530 may obtain the access number ratios from the plurality of ratio signals ARS1, ARS2, and ARSn. Also, the distribution detector 1530 may multiply the corresponding access number ratio by the weight value set for each tracer. Also, the distribution detector 1530 may calculate the average value of the ratios on which the multiplication is performed.

The distribution detector 1530 may determine whether the weighted average value is less than or equal to the reference value in operation S820b. When the weighted average value is less than or equal to the reference value (S820b, YES), operation S830b, which is the same as operation S830a, may be performed. When the weighted average value is greater than the reference value (S820b, NO), operation S840b, which is the same as operation S840a, may be performed.

Figure 20C:
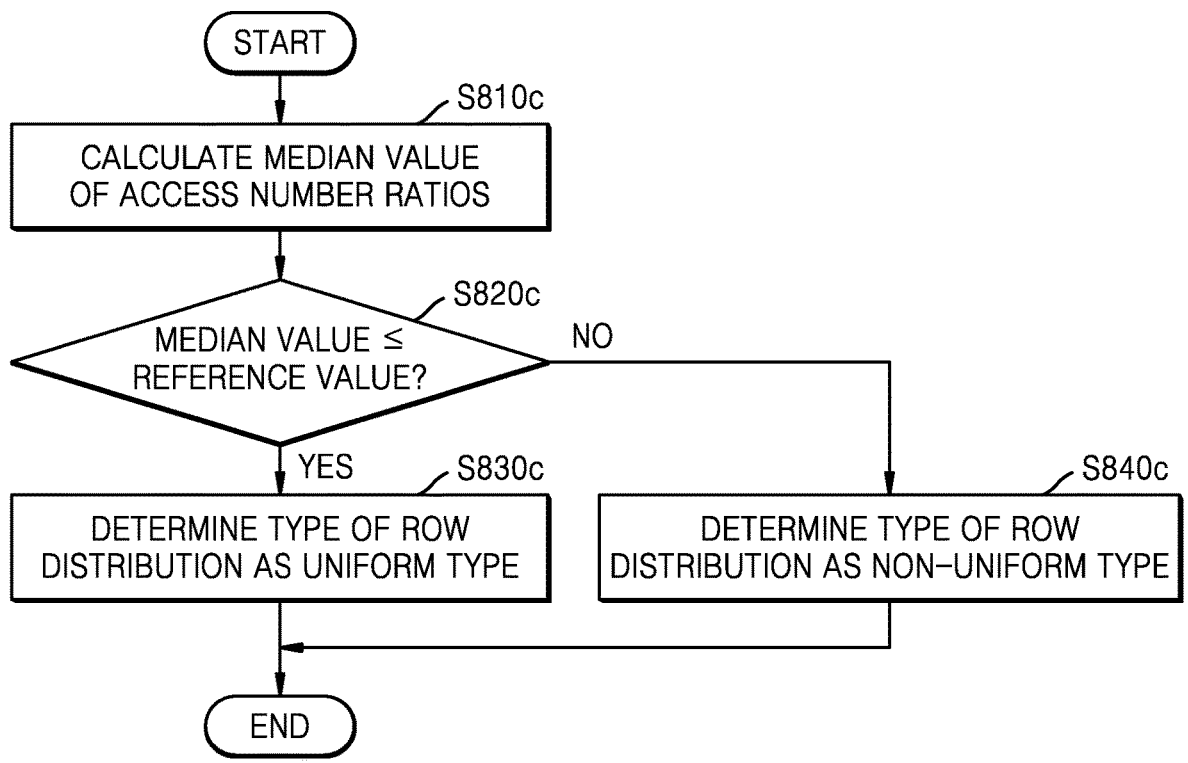

Referring to FIG. 20C, the distribution detector 1530 may calculate a median value of the access number ratios in operation S810c. The distribution detector 1530 may determine whether the median value is less than or equal to the reference value in operation S820c. When the median value is less than or equal to the reference value (S820c, YES), operation S830c, which is the same as operation S830a, may be performed. When the median value is greater than the reference value (S820c, NO), operation S840c, which is the same as operation S840a, may be performed.

Figure 20D:
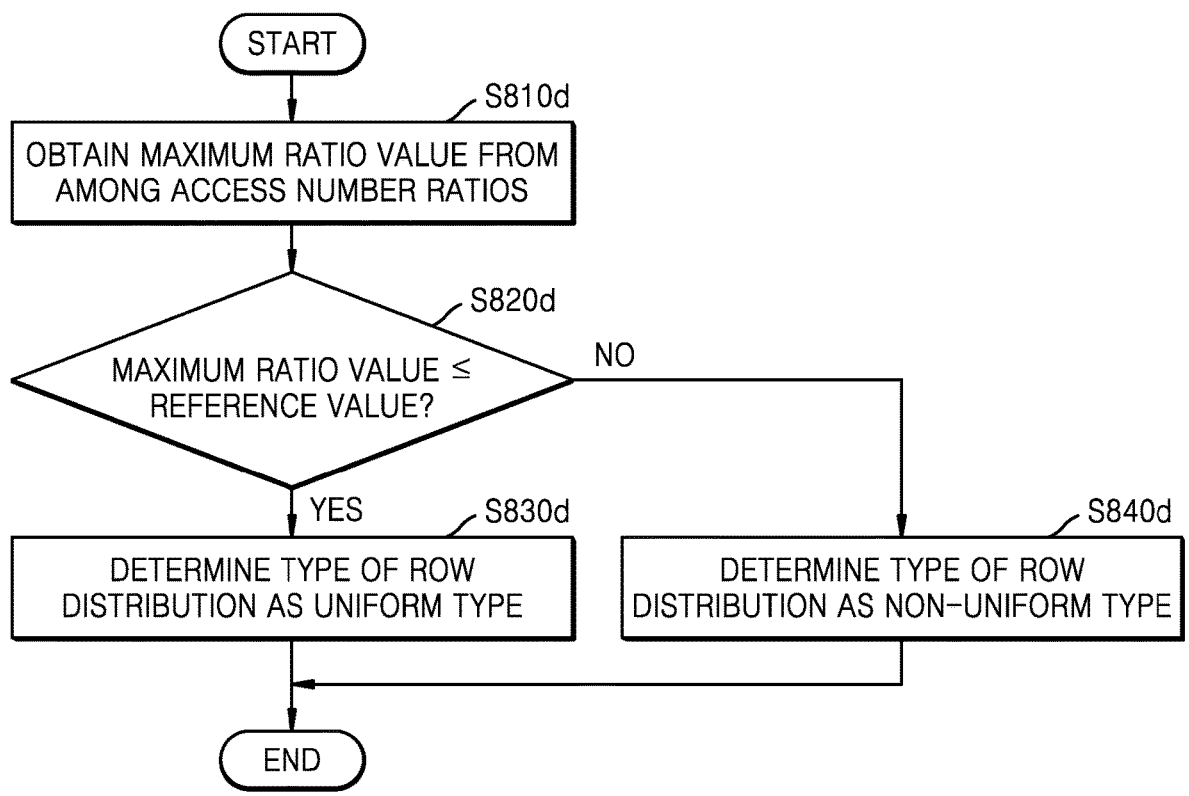

Referring to FIG. 20D, the distribution detector 1530 may obtain a maximum ratio value of the access number ratios in operation S810d. The distribution detector 1530 may determine whether the maximum ratio value is less than or equal to the reference value in operation S820d. When the maximum ratio value is less than or equal to the reference value (S820d, YES), operation S830d, which is the same as operation S830a, may be performed. When the maximum ratio value is greater than the reference value (S820d, NO), operation S840d, which is the same as operation S840a, may be performed.

Figure 20E:
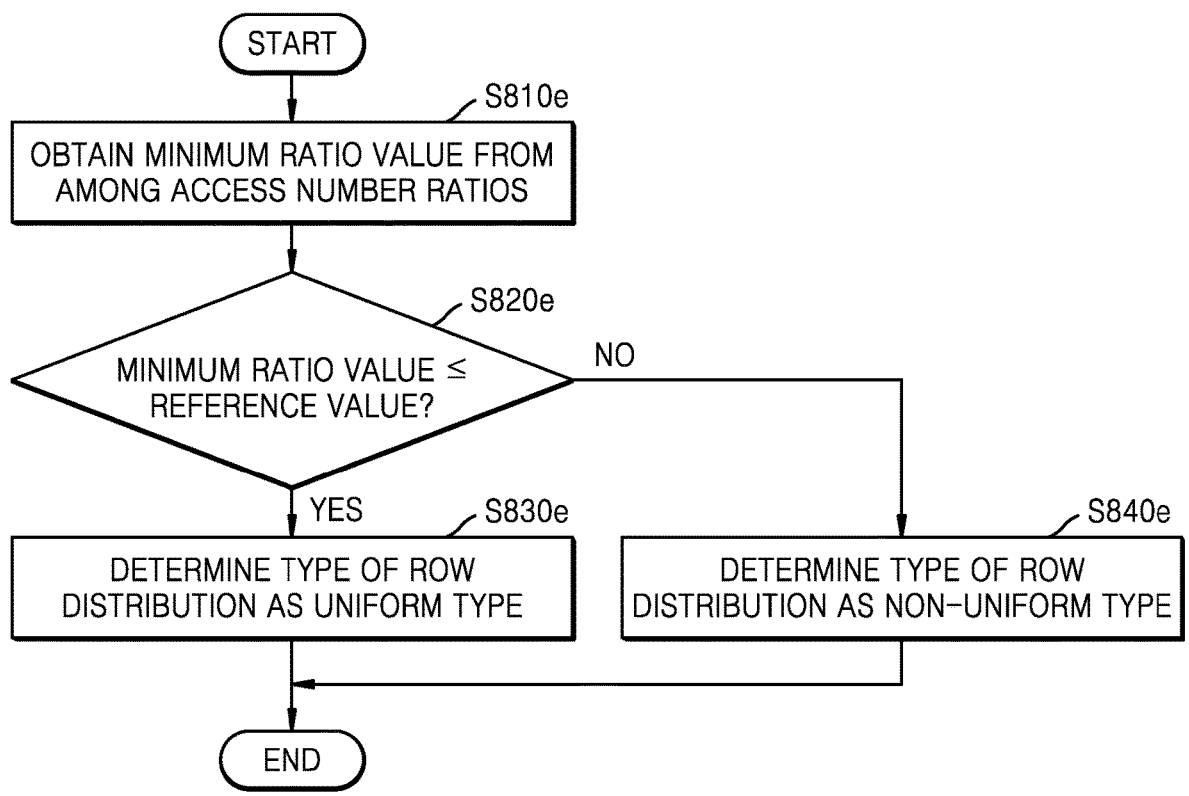

Referring to FIG. 20E, the distribution detector 1530 may obtain a minimum ratio value of the access number ratios in operation S810e. The distribution detector 1530 may determine whether the minimum ratio value is less than or equal to the reference value in operation S820e. When the minimum ratio value is less than or equal to the reference value (S820e, YES), operation S830e, which is the same as operation S830a, may be performed. When the minimum ratio value is greater than the reference value (S820e, NO), operation S840e, which is the same as operation S840a, may be performed.

Figure 21:
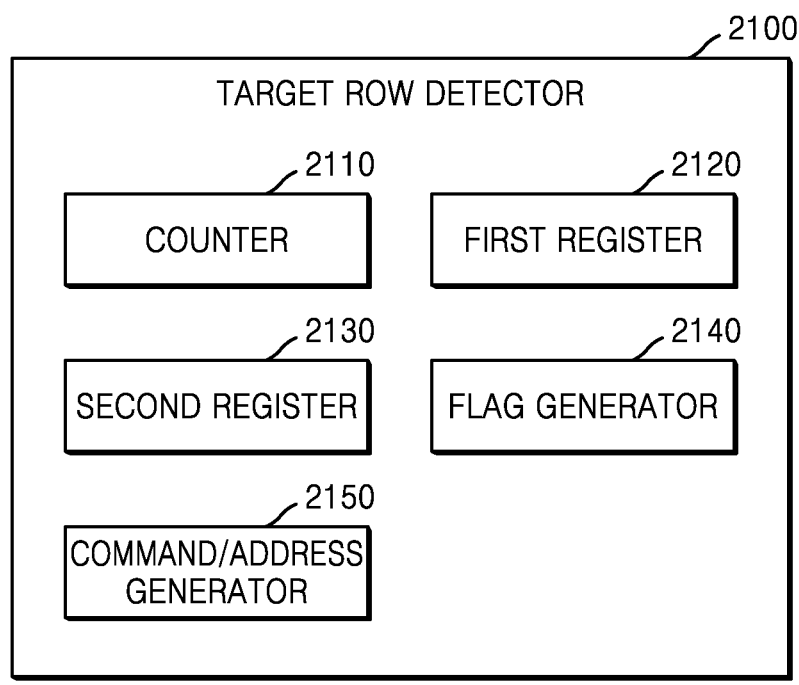
FIG. 21 is a diagram illustrating a target row detector according to some embodiments of the present disclosure.

FIG. 21 is a diagram illustrating a target row detector 2100 according to some embodiments.

Referring to FIG. 21, the target row detector 2100 may correspond to the target row detector 1420 of FIG. 14. The target row detector 2100 may include a counter 2110, a first register 2120, a second register 2130, a flag generator 2140, and a command address generator 2150.

The counter 2110 may count the number of times an input row address is input, during a monitoring period. The counter 2110 may increase the counted number by one whenever the input row address is input, during the monitoring period. The counter 2110 may operate round robin.

The first register 2120 may store a pre-row hammer address.

The second register 2130 may store an input row address that is to correspond to a candidate of a target row address.

The flag generator 2140 may output a flag signal. For example, when an input row address that is less than or equal to a pre-row hammer address is input, a bit value of the flag signal may be a first bit value. When an input row address that is greater than a pre-row hammer address is input, a bit value of the flag signal may be a second bit value.

The command address generator 2150 may output an input row address stored in the second register 2130 and a refresh management command, in response to a row distribution signal.

Figure 22A:
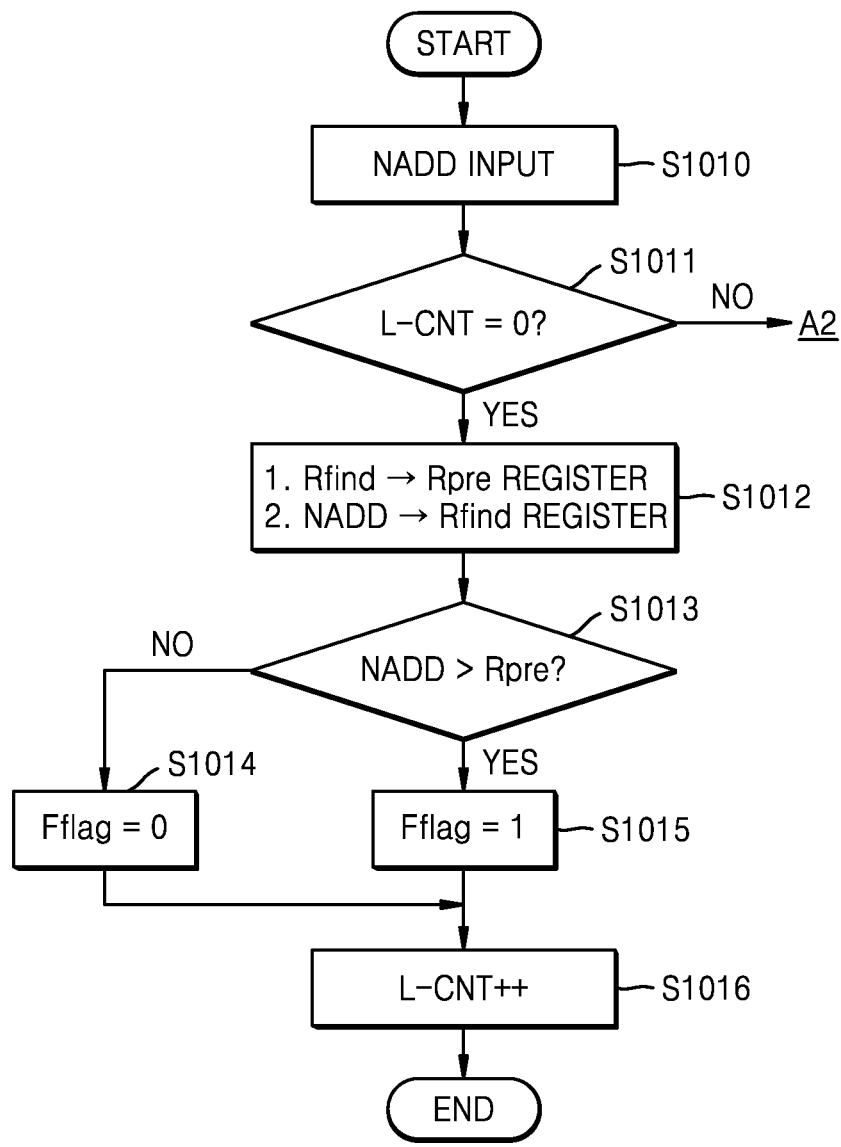
FIGS. 22A, 22B, and 22C are flowcharts of an operating method of the target row detector of FIG. 21 according to some embodiments of the present disclosure.
Figure 22B:
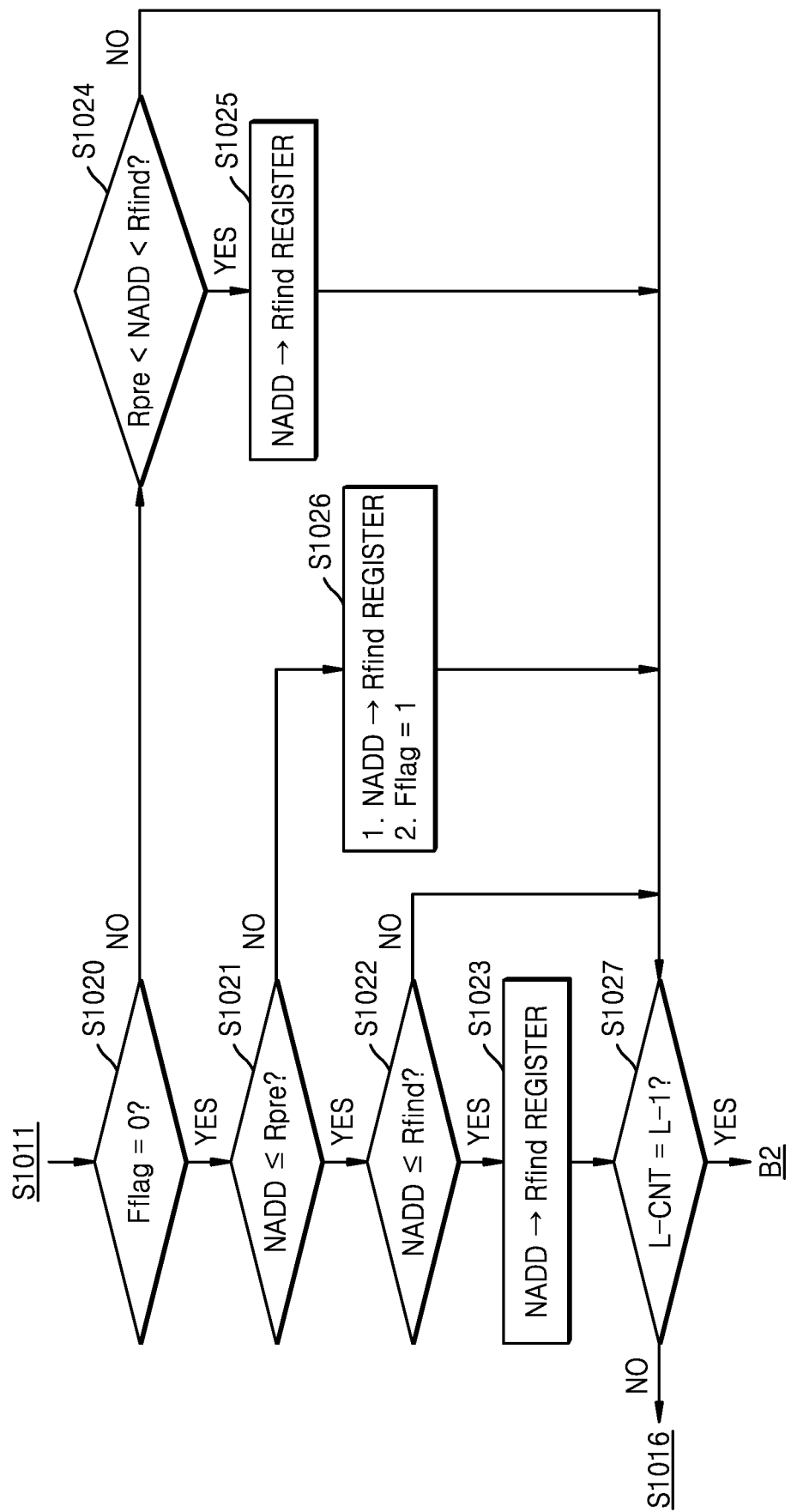
Figure 22C:
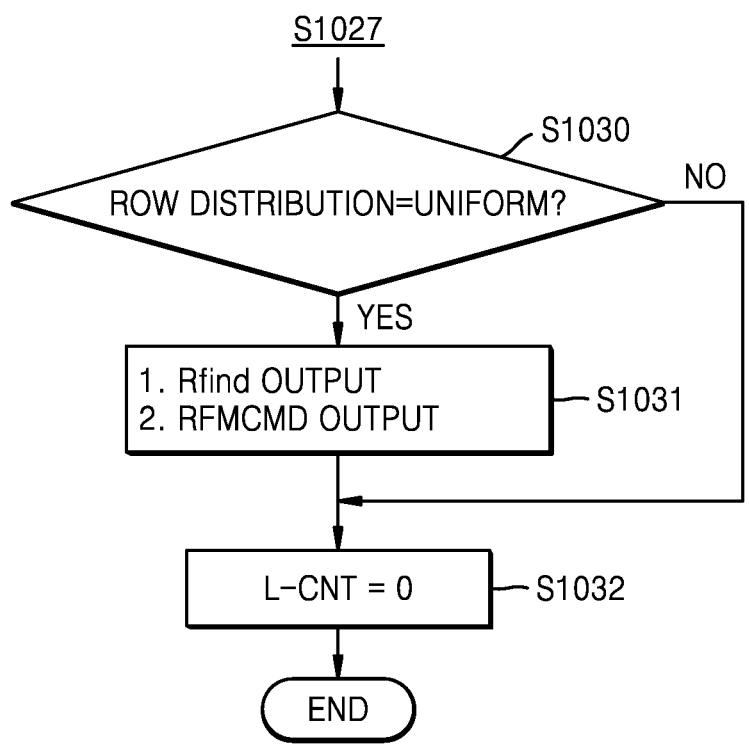

FIGS. 22A, 22B, and 22C are flowcharts of an operating method of the target row detector 2100 of FIG. 21.

Referring to FIG. 22A, in operation S1010, a new input row address NADD may be input to the target row detector 2100.

In operation S1011, whether an L-count L-CNT is an initial value (e.g., 0) may be identified. The L-count L-CNT may be a value counted by the counter 2110 of FIG. 21. "L" of the L-count L-CNT may be related to a detected pattern size.

When the L-count L-CNT is the initial value (e.g., 0) (S1011, YES), a row address Rfind may be stored in a register Rpre REGISTER in operation S1012. Also, a new input row address NADD may be stored in the register Rfind REGISTER.

When the storing of the row address Rfind in the register Rfind REGISTER is completed, the corresponding row address Rfind may be referred to as a pre-row hammer address Rpre. The register Rpre REGISTER may be the first register 2120 of FIG. 21. The register Rpre REGISTER may be the second register 2130 of FIG. 21.

In operation S1013, whether the new input row address NADD is greater than the pre-row hammer address Rpre may be identified.

When the new input row address NADD is less than or equal to the pre-row hammer address Rpre (S1013, NO), a flag signal flag may have a first bit value (e.g., 0) in operation S1014. The flag signal flag may be generated by the flag generator 2140 of FIG. 21.

When the new input row address NADD is greater than the pre-row hammer address Rpre (S1013, YES), the flag signal flag may have a second bit value (e.g., 1) in operation S1015.

In operation S1016, the L-count L-CNT may increase by one (+1).

In operation S1011, when the L-count L-CNT is not the initial value (e.g., 0) (S1011, NO), an operation A2 of FIG. 22A may be performed. The operation A2 of FIG. 22A is illustrated in FIG. 22B.

Referring to FIG. 22B, in operation S1020, whether the bit value of the flag signal Fflag is the first bit value may be identified.

When the bit value of the flag signal flag is the first bit value (S1020, YES), whether the new input row address NADD is less than or equal to the pre-row hammer address Rpre may be identified in operation S1021.

When the new input row address NADD is less than or equal to the pre-row hammer address Rpre (S1021, YES), whether the new input row address NADD is less than or equal to a row address Rfind may be identified in operation S1022. The row address Rfind may be stored in the register Rfind REGISTER.

When the new input row address NADD is less than or equal to the row address Rfind (S1022, YES), the new input row address NADD may be stored in the register Rfind REGISTER in operation S1023.

When the bit value of the flag signal Fflag is the second bit value (S1020, NO), whether the new input row address NADD is greater than the pre-row hammer address Rpre and less than the row address Rfind may be identified in operation S1024.

When the new input row address NADD is greater than the pre-row hammer address Rpre and less than the row address Rfind (S1024, YES), the new input row address NADD may be stored in the register Rfind REGISTER in operation S1025.

When the new input row address NADD is greater than the pre-row hammer address Rpre (S1021, NO), the new input row address NADD may be stored in the register Rfind REGISTER in operation S1026. Also, the bit value of the flag signal Fflag may be changed from the first bit value to the second bit value.

After operation S1023, operation S1027 may be performed. Alternatively, when the new input row address NADD is greater than the row address Rfind (S1022, NO) in operation S1022, operation S1027 may be performed. Alternatively, after operation S1026, operation S1027 may be performed. Alternatively, after operation S1025, operation S1027 may be performed. When the new input row address NADD is less than or equal to the pre-row hammer address Rpre, or the new input row address NADD is greater than the row address Rfind (S1024, NO) in operation S1024, operation S1027 may be performed.

In operation S1027, whether the L-count L-CNT is L−1 may be identified.

When the L-count L-CNT is not L−1 (S1027, NO), operation S1016 may be performed.

When the L-count L-CNT is L−1 (S1027, YES), an operation B2 of FIG. 22B may be performed. The operation B2 of FIG. 22B is illustrated in FIG. 22C.

Referring to FIG. 22C, in operation S1030, whether row distribution (that is, a type of row distribution) is uniform may be identified. When the row distribution type is a uniform type (S1030, YES), the row address Rfind stored in the register Rfind REGISTER may be output as the target row address in operation S1031. Simultaneously, a refresh management command RFMCMD may be output.

When the row distribution type is a non-uniform type (S1030, NO), or after operation S1030, operation S1032 may be performed. In operation S1032, the L-count L-CNT may be initialized.

Figure 23:
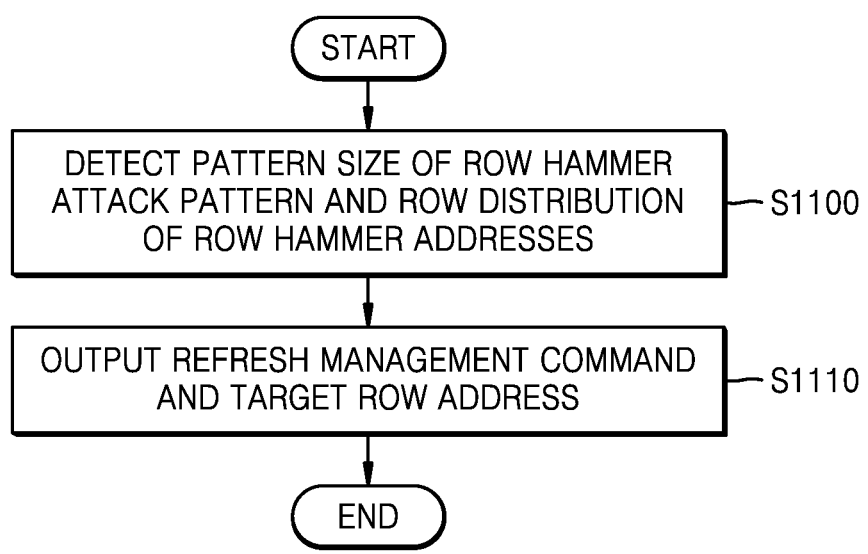
FIG. 23 is a flowchart of an operating method of a memory controller, according to some embodiments of the present disclosure.

FIG. 23 is a flowchart of an operating method of a memory controller, according to some embodiments.

Referring to FIG. 23, the operating method of FIG. 23 may be performed by the memory controller 1310 of FIG. 13, the memory controller 1401 of FIG. 14, etc.

An operation of detecting a pattern size of a row hammer attack pattern and uniform row distribution of row hammer addresses may be performed in operation S1100. The uniform row distribution may denote that a row distribution type is a uniform type. Operation S1100 may be performed by the attack pattern detector 1410 of FIG. 14.

An operation of outputting a refresh management command and a target row address may be performed in operation S1110. Operation S1110 may be performed by the target row detector 1420 of FIG. 14.

Figure 24:
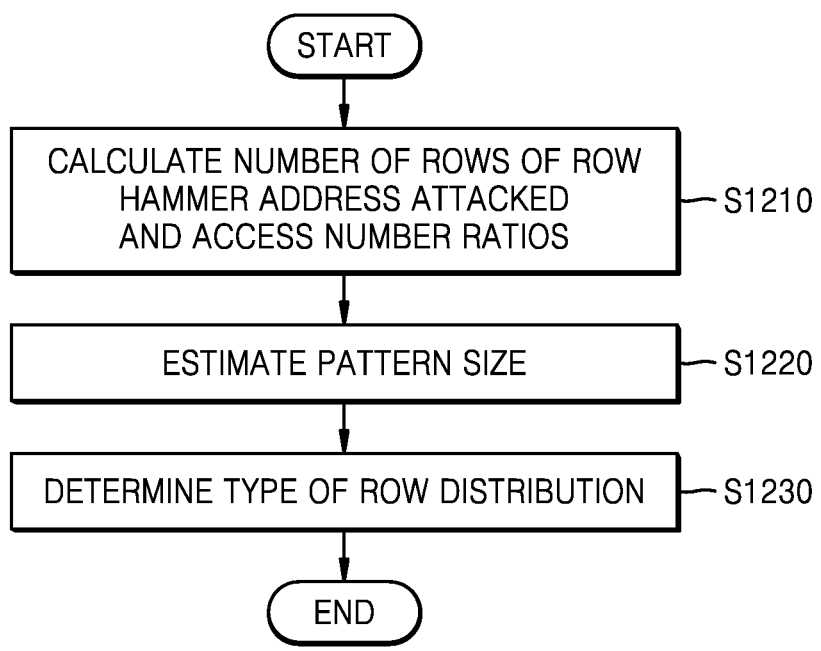
FIG. 24 is a flowchart of an operation of FIG. 23 in detail according to some embodiments of the present disclosure.

FIG. 24 is a detailed flowchart of operation S1100 of FIG. 23.

Referring to FIG. 24, operation S1100 of FIG. 23 may include operation S1210, operation S1220, and operation S1230.

An operation of calculating the number of rows of an attacked row hammer address and access number ratios by using input row addresses may be performed in operation S1210. The access number ratio may be obtained by dividing the number of accesses of a row hammer address most attacked by the number of accesses of a row hammer address least attacked. Operation S1210 is the same as described above with reference to FIGS. 15 to 17C.

An operation of estimating a pattern size by using the number of rows may be performed in operation S1220. Operation S1220 is the same as described above with reference to FIGS. 15, 18, and 19.

An operation of determining row distribution types by using access number ratios and a reference value may be performed in operation S1230. Operation S1230 is the same as described above with reference to FIGS. 15, and 20A to 20E.

Figure 25:
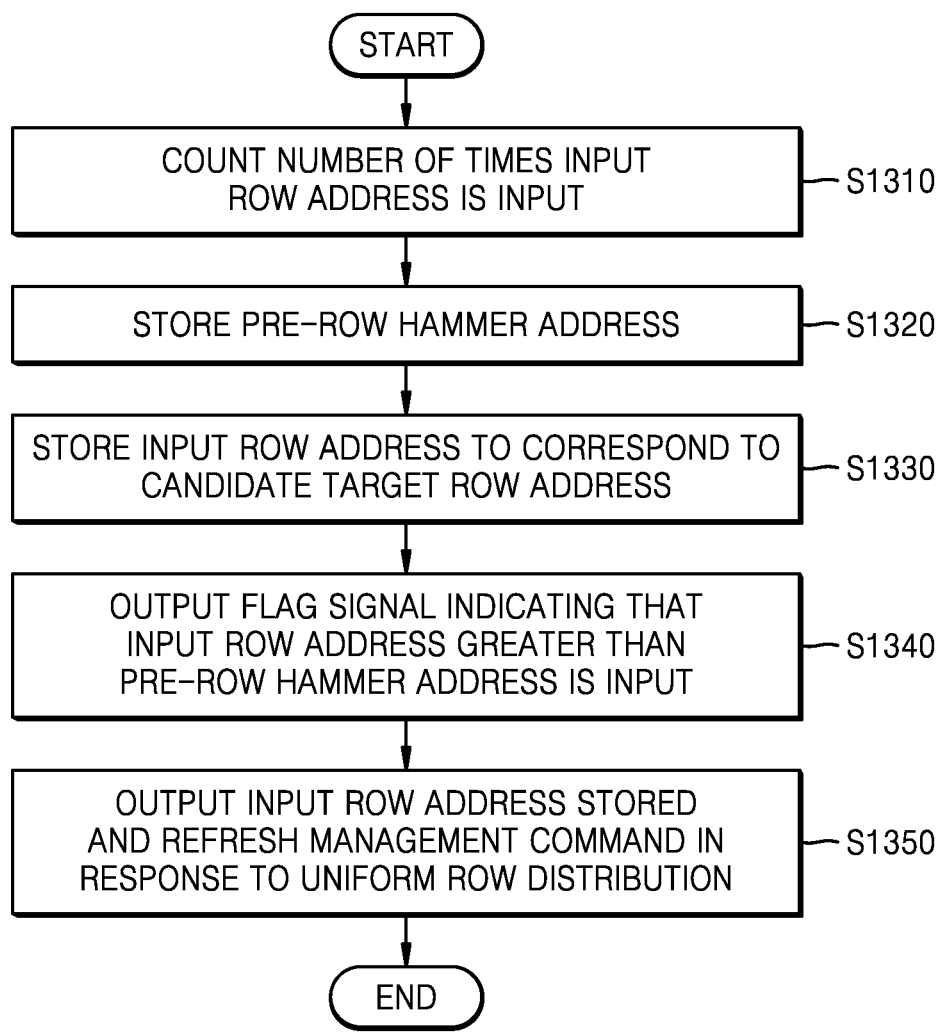
FIG. 25 is a flowchart of an operation of FIG. 23 in detail according to some embodiments of the present disclosure.

FIG. 25 is a detailed flowchart of operation S1110 of FIG. 23.

Referring to FIG. 25, operation S1100 of FIG. 23 may include operations S1310 to S1350.

An operation of counting the number of times an input row address is input, during a monitoring period, may be performed in operation S1310. The monitoring period may be a period during which L input row addresses corresponding to a pattern size are input. Operation S1310 may be performed by the counter 2110 of FIG. 21.

An operation of storing a pre-row hammer address may be performed in operation S1320. Operation S1320 may be performed by the first register 2120 of FIG. 21.

An operation of storing an input row address to correspond to a candidate of a target row address may be performed in operation S1330. Operation S1330 may be performed by the second register 2130 of FIG. 21.

An operation of outputting a flag signal indicating that an input row address which is greater than a pre-row hammer address is input may be performed in operation S1340. Operation S1340 may be performed by the flag generator 2140 of FIG. 21.

An operation of outputting a stored input row address and a refresh management command in response to uniform row distribution may be performed in operation S1350. Operation S1350 may be performed by the command address generator 2150 of FIG. 21.

Figure 26:
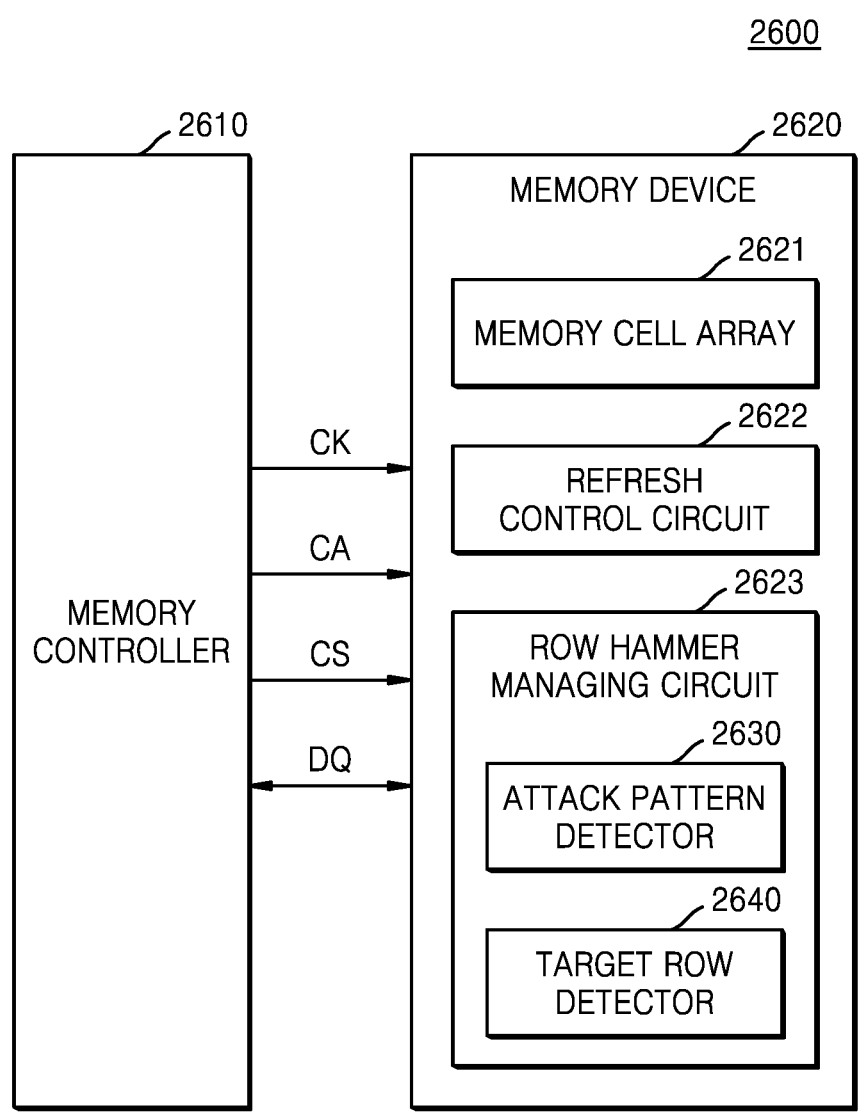
FIG. 26 is a diagram illustrating a memory system according to some embodiments of the present disclosure.

FIG. 26 is a diagram illustrating a memory system 2600 according to some embodiments.

Referring to FIG. 26, the memory system 2600 may include a memory controller 2610 and a memory device 2620. In the embodiments illustrated in FIG. 26, descriptions that are the same as the descriptions in FIG. 1 may be omitted.

The memory controller 2610 may correspond to the memory controller 111 of FIG. 1 and/or the memory controller 1310 of FIG. 13.

The memory device 2620 may correspond to the memory device 120 of FIG. 1 and/or the memory 1320 of FIG. 13. The memory device 2620 may include a memory cell array 2621, a refresh control circuit 2622, and a row hammer management circuit 2623. According to some embodiments, the memory device 2620 may further include the components illustrated in FIG. 2.

The refresh control circuit 2622 may output a target row address based on a row hammer address provided from the row hammer management circuit 2623, during a refresh operation. The target row address may be a row address corresponding to a target memory cell row from among a plurality of memory cell rows.

The refresh control circuit 2622 may perform a refresh operation on a memory cell row corresponding to a row hammer address RH_ADD. For example, the refresh control circuit 2622 may obtain at least one target row address TR_ADD based on the row hammer address RH_ADD transmitted from the row hammer management circuit 2623 and may provide the at least one target row address TR_ADD to the row decoder 220. During the refresh operation, a memory cell row having the target row address TR_ADD may be refreshed.

The row hammer management circuit 2623 may receive accesses from the memory controller 2610. The accesses may include an active command and an input row address. The row hammer management circuit 2623 may detect the row hammer address RH_ADD and may output the detected row hammer address RH_ADD to the refresh control circuit 2622.

The row hammer management circuit 2623 may detect a pattern size of a row hammer attack pattern based on accesses and may detect row distribution of the row hammer addresses in the row hammer attack pattern. The row hammer management circuit 2623 may output the row hammer address when a row distribution type is a uniform type, for every L access (L is an integer that is equal to greater than 1) corresponding to the pattern size.

According to some embodiments, the row hammer management circuit 2623 may include an attack pattern detector 2630 and a target row detector 2640. The attack pattern detector 2630 and the target row detector 2640 are the same as described above with reference to FIG. 14.

According to some embodiments, the attack pattern detector 2630 may include a plurality of tracers, a pattern size detector, and a distribution detector as described above with reference to FIG. 15. The plurality of tracers may perform the operation described above with reference to FIGS. 16 to 17C. The pattern size detector may perform the operation described above with reference to FIGS. 18 and 19. The distribution detector may perform the operation described above with reference to FIGS. 20A to 20E.

The target row detector 2640 may perform the operation described above with reference to FIGS. 21 to 22C.

Figure 27:
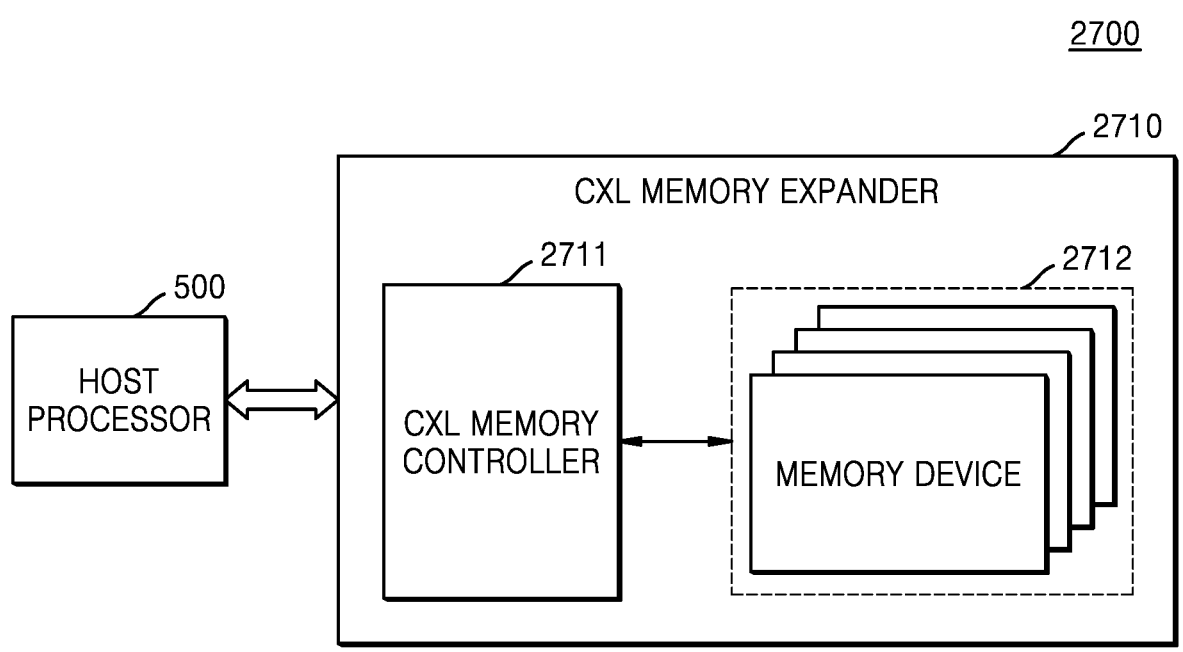
FIG. 27 is a diagram illustrating a system according to some embodiments of the present disclosure.

FIG. 27 is a diagram illustrating a system 2700 according to some embodiments.

Referring to FIG. 27, the system 2700 may include a host processor 500 and a compute express link (CXL) memory expansion device 2710. The host processor 500 may be substantially the same as the host device 110 of FIG. 1.

The CXL memory expansion device 2710 may be a device communicating with the host processor 500 through a non-coherent protocol and a memory access protocol. The CXL memory expansion device 2710 may include a CXL memory controller 2711 and memory devices 2712.

According to some embodiments, the CXL memory controller 2711 may perform the same operation as the memory controller 1310 of FIG. 13. For example, the CXL memory controller 2711 may detect a pattern size and row distribution based on input row addresses accessed by the host processor 500, determine whether to perform refresh management according to a row distribution type, and output a refresh management command and a target row address to at least one memory device from among the memory devices 2712 for every L access.

According to some embodiments, the CXL memory controller 2711 may include an attack pattern detector and a target row detector. The attack pattern detector and the target row detector are the same as described above. The attack pattern detector may include a plurality of tracers, a pattern size detector, and a distribution detector, as described above.

Each of the memory devices 2712 may correspond to the memory 1320 of FIG. 13.

Figure 28:
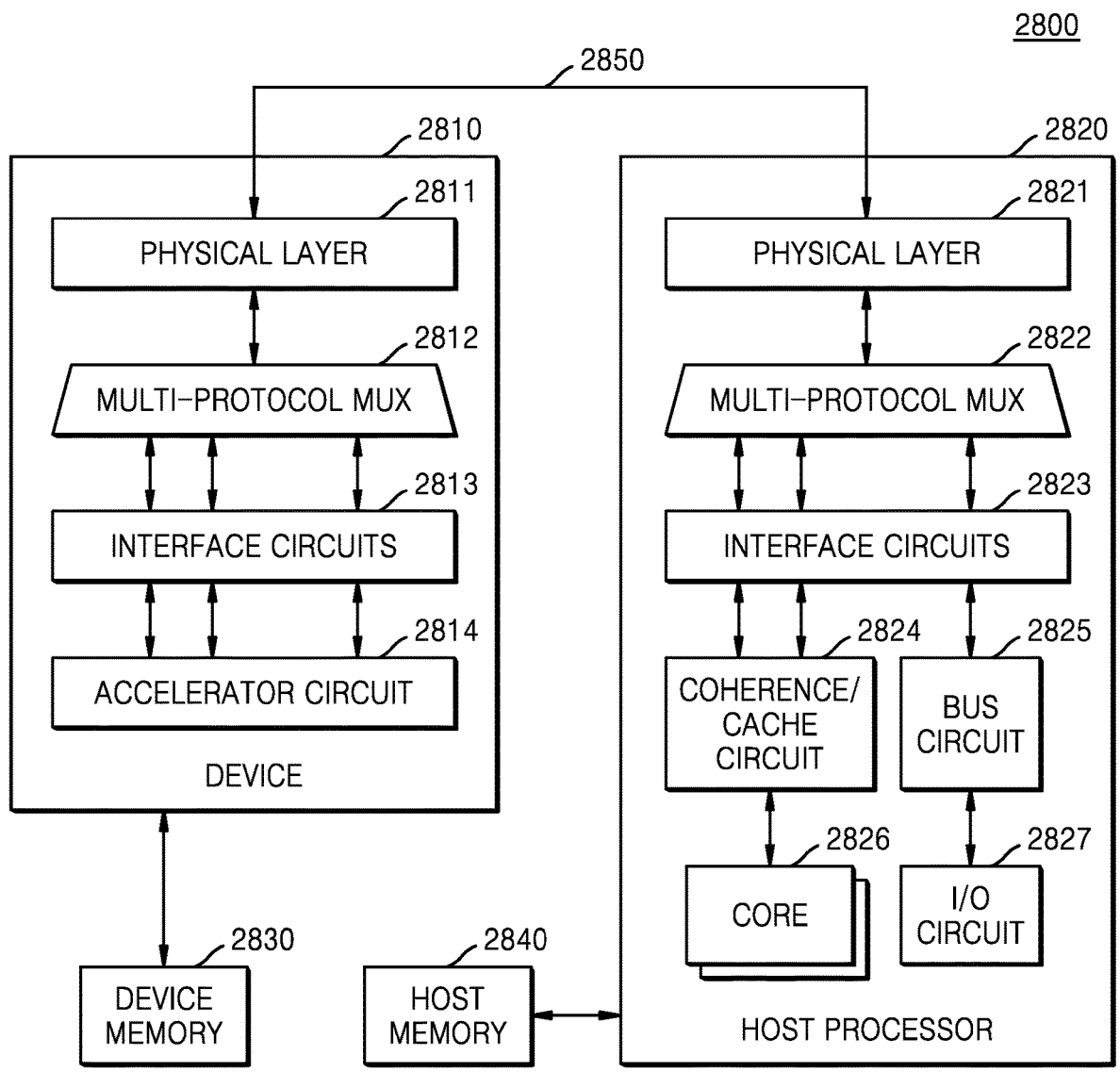
FIG. 28 is a block diagram illustrating a system according to an embodiment of the present disclosure.

FIG. 28 is a block diagram illustrating a system 2800 according to an embodiment.

Referring to FIG. 28, the system 2800 may be an arbitrary computing system (or a component included in the computing system) performing inter-communication. For example, the system 2800 may be included in a stationary computing system, such as a desktop computer, a server, a kiosk, etc., or may be included in a portable computing system, such as a laptop computer, a mobile phone, a wearable device, etc. Also, according to some embodiments, the system 2800 may be included in a system-on-chip (SoC) or a system-in-package (SiP) in which a device 2810 and a host processor 2820 are embodied in a single chip or a single package.

The system 2800 may include the device 2810, the host processor 2820, a device memory 2830, and a host memory 2840.

The device 2810 and the host processor 2820 may communicate with each other through a link 2850 and may transmit or receive a message and/or data to and from each other through the link 2850. Some embodiments are described with reference to the link 2850 based on the CXL specifications supporting CXL protocols. However, the device 2810 and the host processor 2820 may perform inter-communication based on coherent interconnect techniques, such as an XBus protocol, an NVLink protocol, an infinity fabric protocol, a cache coherent interconnect for accelerators (CCIX) protocol, a coherent accelerator processor interface (CAPI), etc., wherein the coherent interconnect techniques are not limited thereto.

According to some embodiments, the link 2850 may support multiple protocols, and a message and/or data may be transmitted through the multiple protocols. For example, the link 2850 may support the CXL protocols including a non-coherent protocol (e.g., CXL.io), a coherent protocol (e.g., CXL.cache), and a memory access protocol (or a memory protocol) (e.g., CXL.mem). According to some embodiments, the link 2850 may support a protocol, such as peripheral component interconnect (PCI), PCI express (PCIe), a universal serial bus (USB), serial advanced technology attachment (SATA), etc. However, the protocol supported by the link 2850 is not limited thereto. In this specification, the protocol supported by the link 2850 may also be referred to as an interconnect protocol.

The device 2810 may refer to an arbitrary device configured to provide a useful function to the host processor 2820, and according to some embodiments, may correspond to an accelerator having the CXL specifications. For example, at least a portion of a computing and/or an input/output (I/O) operation of the software executed by the host processor 2820 may be offloaded to the device 2810. According to some embodiments, the device 2810 may include at least one of a programmable component such as a graphics processing unit (GPU), a neural processing unit (NPU), etc., a component providing a fixed function such as an intellectual property (IP) core, etc., and a reconfigurable component such as a field programmable gate array (FPGA), etc. The device 2810 may include a physical layer 2811, a multi-protocol multiplexer (MUX) 2812, interface circuits 2813, and an accelerator circuit 2814 and may communicate with the device memory 2830.

The accelerator circuit 2814 may execute a useful function provided by the device 2810 to the host processor 2820 and may also be referred to as accelerator logic. The accelerator circuit 2814 may communicate with the host processor 2820 through the interface circuits 2813 by using a plurality of protocols. According to some embodiments, the accelerator circuit 2814 may include a component for resolving coherency of the device memory 2830. According to some embodiments, the accelerator circuit 2814 may be omitted in the device 2810.

The interface circuits 2813 may support the plurality of protocols. For example, the interface circuits 2813 may include two or more circuits for at least two protocols from among a non-coherent protocol, a coherent protocol, and a memory access protocol. Each of the two or more circuits may provide a message received from the host processor 2820 to the accelerator circuit 2814 or a message received from the accelerator circuit 2814 to the host processor 2820, based on a protocol corresponding to each of the two or more circuits.

The multi-protocol multiplexer 2812 may determine one protocol from among the plurality of protocols, based on a message and/or data for communication between the accelerator circuit 2814 and the host processor 2820. The multi-protocol multiplexer 2812 may include at least one protocol queue to which the interface circuits 2813 are connected, and the interface circuits 2813 may exchange a message and/or data with the host processor 2820 through the at least one protocol queue. According to some embodiments, the interface circuits 2813 and the multi-protocol multiplexer 2812 may be combined into one component. According to some embodiments, the multi-protocol multiplexer 2812 may include a plurality of protocol queues respectively corresponding to the plurality of protocols supported by the link 2850. Also, according to some embodiments, the multi-protocol multiplexer 2812 may arbitrate between communications based on different protocols and may provide selected communications to the physical layer 2811. According to some embodiments, the physical layer 2811 may be connected to a physical layer 2821 of the host processor 2820 through a single interconnect, a bus, a trace, etc.

The device memory 2830 may be connected to the device 2810 and may be referred to as a device-attached memory. When the device memory 2830 is included in the system 2800, the accelerator circuit 2814 may communicate with the device memory 2830 and may communicate with the device memory 2830 based on an individual protocol, that is, a device-specific protocol. According to some embodiments, the device memory 2830 may correspond to a device-attached memory having the CXL specifications. In this specification, the device memory 2830 may be referred to as being included in the device 2810 and may be simply referred to as a memory.

The host processor 2820 may correspond to a main processor of the system 2800, for example, a central processing unit (CPU), and according to some embodiments, may correspond to a host processor (or a host) having the CXL specifications. The host processor 2820 may be connected to the host memory 2840 and may include the physical layer 2821, a multi-protocol multiplexer 2822, interface circuits 2823, a coherence/cache circuit 2824, a bus circuit 2825, at least one core 2826, and an I/O circuit 2827.

The at least one core 2826 may execute an instruction and may be connected to the coherence/cache circuit 2824. The coherence/cache circuit 2824 may include a cache hierarchy and may also be referred to as coherence/cache logic. The coherence/cache circuit 2824 may communicate with the at least one core 2826 and the interface circuits 2823. For example, the coherence/cache circuit 2824 may enable communication through two or more protocols including a coherent protocol and a memory access protocol. According to some embodiments, the coherence/cache circuit 2824 may include a direct memory access (DMA) circuit. The I/O circuit 2827 may be used to communicate with the bus circuit 2825. For example, the bus circuit 2825 may be PCIe logic, and the I/O circuit 2827 may be a PCIe I/O circuit.

The interface circuits 2823 may enable communication between the device 2810 and the components of the host processor 2820, for example, the coherence/cache circuit 2824 and the bus circuit 2825. According to some embodiments, the interface circuits 2823 may enable communication of a message and/or data between the components of the host processor 2820 and the device 2810 according to a plurality of protocols, for example, a non-coherent protocol, a coherent protocol, and a memory protocol.

The multi-protocol multiplexer 2822 may include at least one protocol queue. The interface circuits 2823 may be connected to the at least one protocol queue included in the multi-protocol multiplexer 2822 and may exchange a message and/or data with the device 2810 through the at least one protocol queue. According to some embodiments, the multi-protocol multiplexer 2822 may determine one protocol from among the plurality of protocols based on a message and/or data to be communicated between the components of the host processor 2820 and the device 2810. According to some embodiments, the interface circuits 2823 and the multi-protocol multiplexer 2822 may be combined into one component. According to some embodiments, the multi-protocol multiplexer 2822 may include a plurality of protocol queues respectively corresponding to the plurality of protocols supported by the link 2850. Also, according to some embodiments, the multi-protocol multiplexer 2822 may arbitrate between communications based on different protocols and may provide selected communications to the physical layer 2821.

Figure 29A:
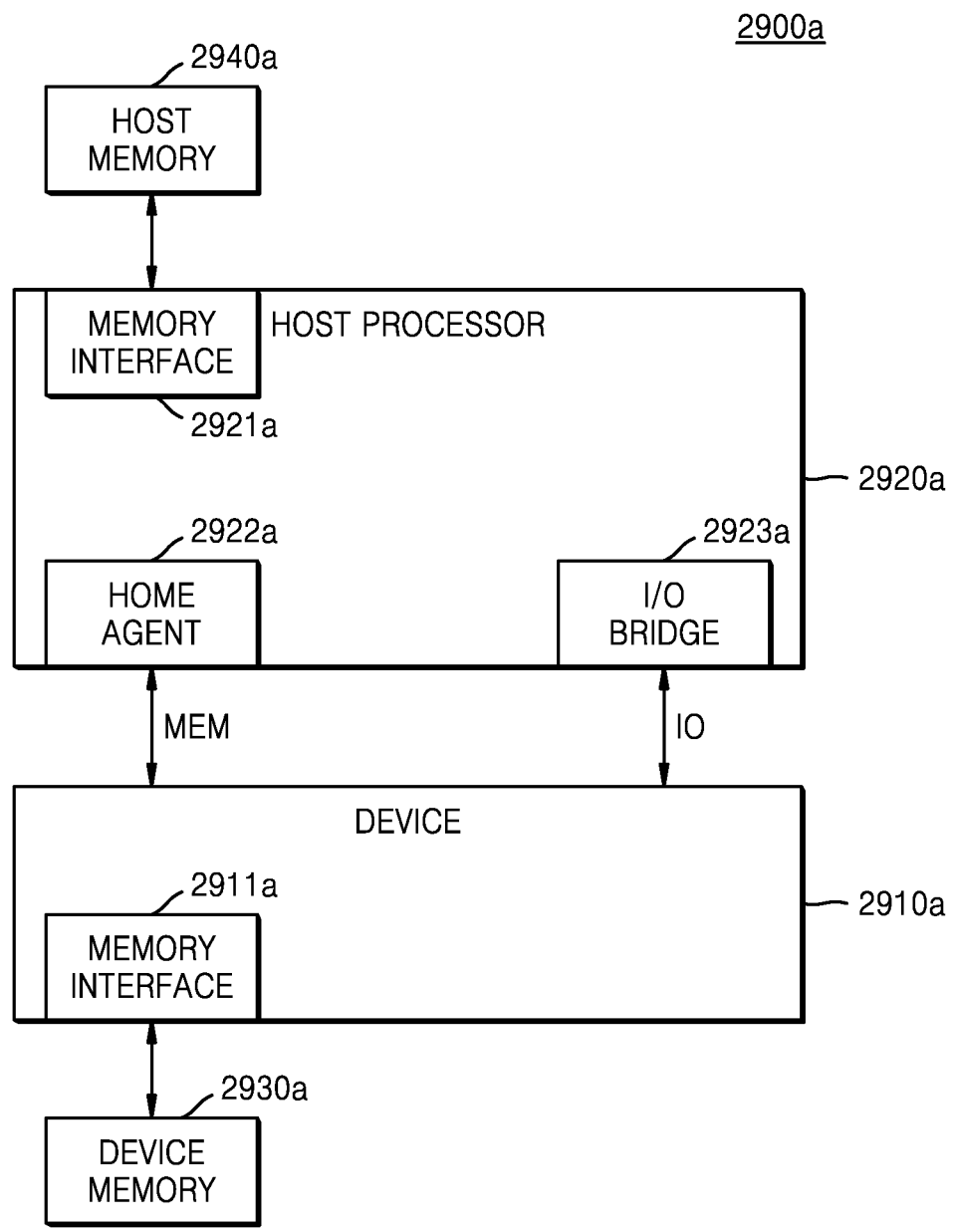
FIGS. 29A and 29B are block diagrams illustrating examples of a system, according to some embodiments of the present disclosure.
Figure 29B:
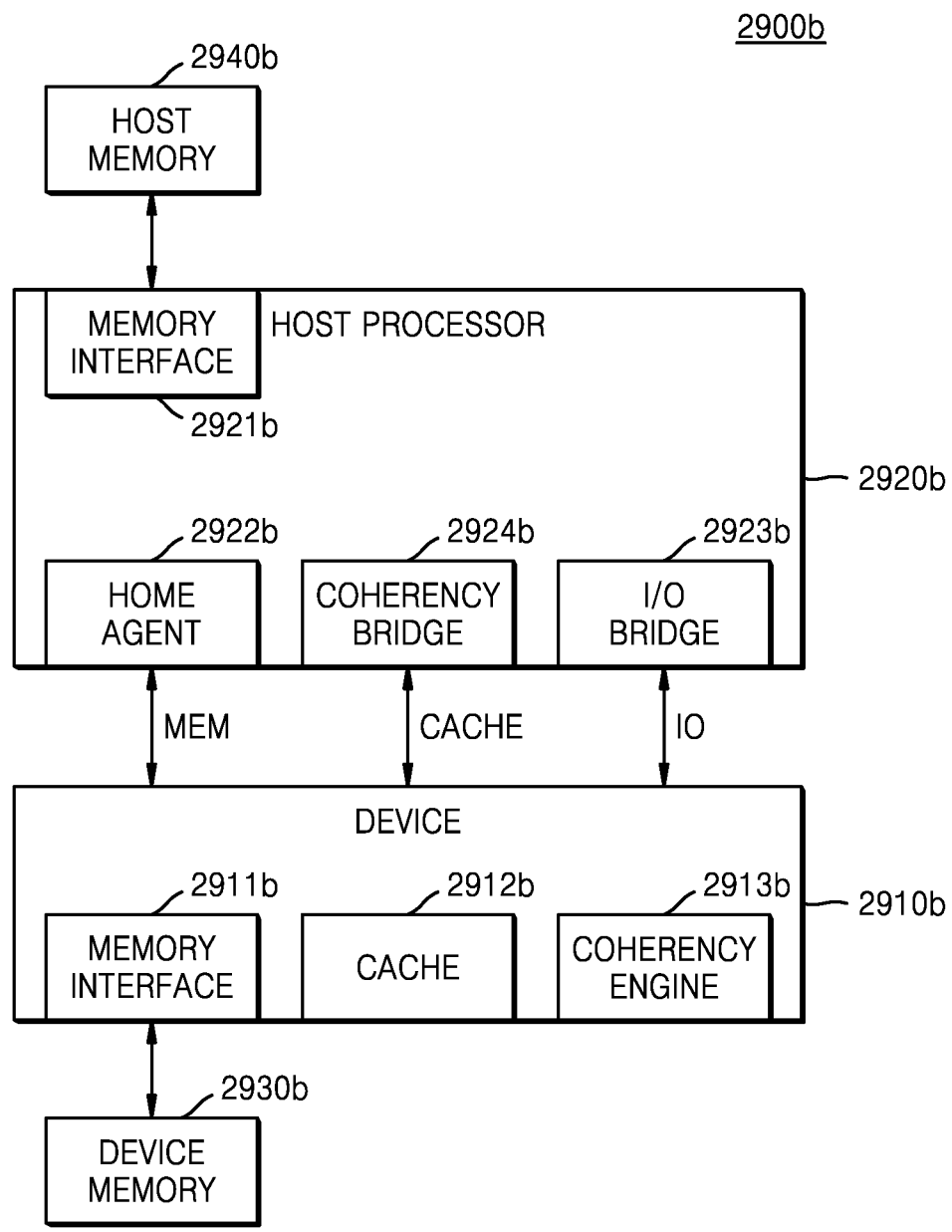

FIGS. 29A and 29B are block diagrams illustrating examples of a system according to some embodiments. In detail, FIG. 29A is the block diagram illustrating a system 2900a including a type 3 CXL device defined in the CXL specifications. FIG. 29B is the block diagram illustrating a system 2900b including a type 2 CXL device defined in the CXL specifications. Hereinafter, the same aspects of FIGS. 29A and 29B are not repeatedly described.

Referring to FIG. 29A, the system 2900a may include a device 2910a, a host processor 2920a, a device memory 2930a, and a host memory 2940a. According to some embodiments, the host processor 2920a may be referred to as a root complex, the device 2910a may be referred to as a memory expander, and the device 2910a and the device memory 2930a may be collectively referred to as the type 3 CXL device.

The host processor 2920a may include a memory interface 2921a, a home agent 2922a, and an I/O bridge 2923a. The memory interface 2921a may provide an access to the host memory 2940a based on an interface of the host memory 2940a. The home agent 2922a may be referred to as a coherence engine, may communicate with the device 2910a based on a memory protocol MEM, and may resolve coherency for a given address. The memory protocol MEM may be an exclusive protocol for an access to the device memory 2930a. The I/O bridge 2923a may communicate with the device 2910a based on a non-coherent protocol IO and according to some embodiments, may include an I/O memory management unit (IOMMU). The host processor 2920a may exchange a message for a device discovery, enumeration, error reporting and management, etc. with the device 2910a through the I/O bridge 2923a.

The device 2910a may include a memory interface 2911a. The memory interface 2911a may be referred to as a memory interface circuit or a memory controller and may provide an access to the device memory 2930a based on an interface of the device memory 2930a. According to some embodiments, the device 2910a may not include an active computing engine and may function as a memory expander. Accordingly, the device 2910a may not issue a request for the host processor 2920a based on a coherent cache and may mainly process a request of the host processor 2920a based on the memory protocol MEM.

Referring to FIG. 29B, the system 2900b may include a host processor 2920b, a device 2910b, a device memory 2930b, and a host memory 2940b. According to some embodiments, the device 2910b may be referred to as a device with a memory, and the device 2910b and the device memory 2930b may be collectively referred to as the type 2 CXL device.

The host processor 2920b may include a memory interface 2921b, a home agent 2922b, an I/O bridge 2923b, and a coherence bridge 2924b. The coherence bridge 2924b may communicate with the device 2910b based on a coherent protocol CACHE defining interactions between the device 2910b and the host processor 2920b. For example, the coherence bridge 2924b may receive a request (e.g., a D2H request), a response (e.g., a D2H response), and data (e.g., D2H data) from the device 2910b and may provide a request (e.g., an H2D request), a response (e.g., an H2D response), and data (e.g., H2D data) to the device 2910b.

The device 2910b may include a memory interface 2911b, a cache 2912b, and a coherence engine 2913b. The cache 2912b may be used by an accelerator circuit. The device 2910b may use the coherent protocol CACHE for coherence transactions of the cache 2912b. The coherence engine 2913b may be referred to as a device coherency engine (DCOH), may resolve coherency of the cache 2912b, and may manage bias states (e.g., a host bias mode, a device bias mode, etc.).

Figure 30A:
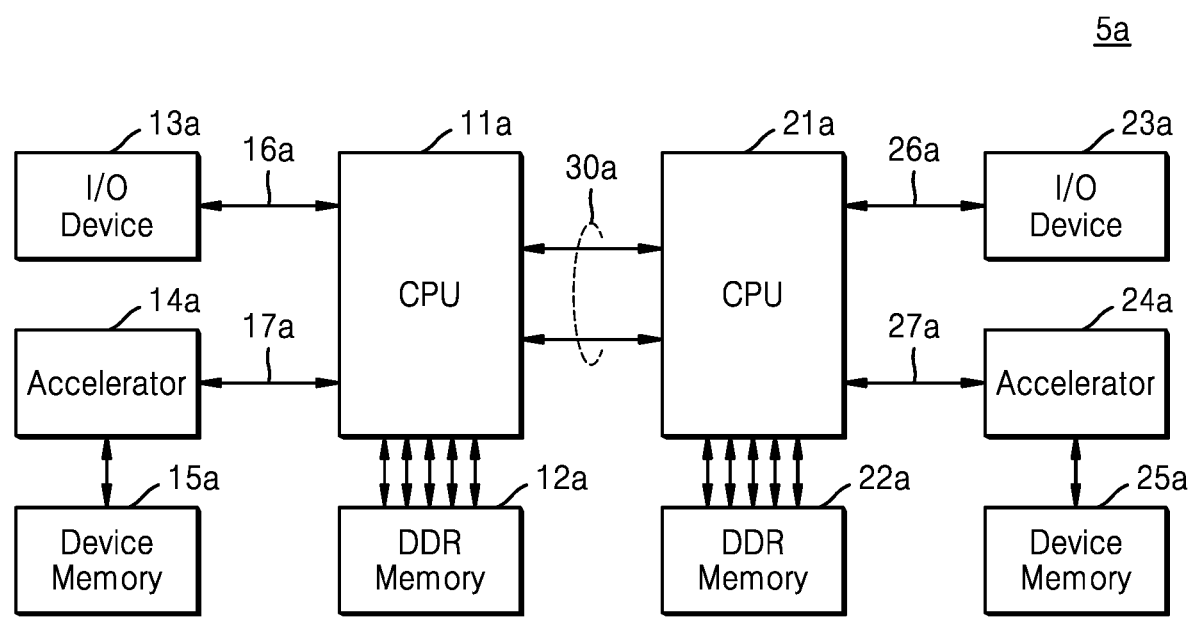
FIGS. 30A and 30B are diagrams illustrating examples of a system, according to some embodiments of the present disclosure.
Figure 30B:
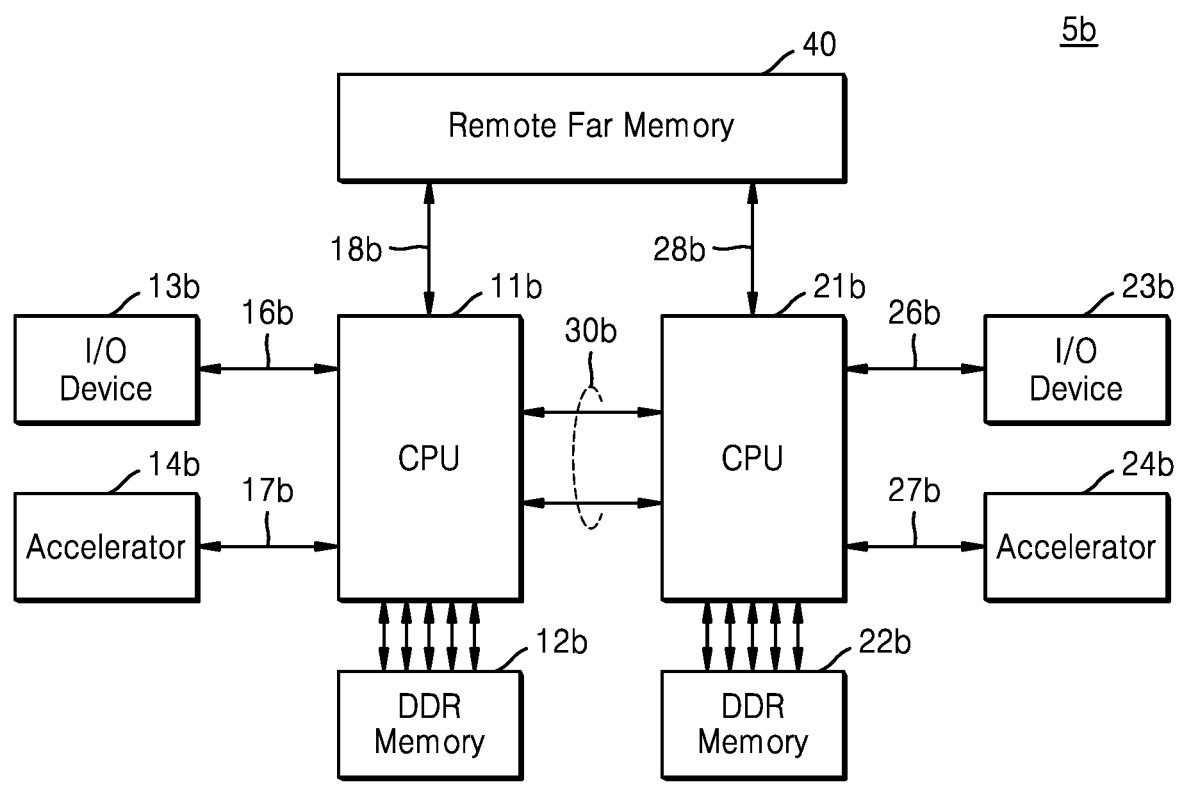

FIGS. 30A and 30B are diagrams illustrating examples of a system according to some embodiments. In detail, FIGS. 30A and 30B are the block diagrams illustrating systems 5a and 5b including a plurality of CPUs.

Referring to FIG. 30A, the system 5a may include a first CPU 11a and a second CPU 21a and a first DDR memory 12a and a second DDR memory 22a, respectively connected to the first CPU 11a and the second CPU 21a. The first CPU 11a and the second CPU 21a may be connected to each other through an interconnect system 30a based on a processor interconnect technique. The interconnect system 30a may provide at least one CPU-to-CPU coherent link.

The system 5a may include a first I/O device 13a and a first accelerator 14a communicating with the first CPU 11a and may include a first device memory 15a connected to the first accelerator 14a. The first CPU 11a and the first I/O device 13a may communicate with each other through a bus 16a, and the first CPU 11a and the first accelerator 14a may communicate with each other through a bus 17a. Also, the system 5a may include a second I/O device 23a and a second accelerator 24a communicating with the second CPU 21a and may include a second device memory 25a connected to the second accelerator 24a. The second CPU 21a and the second I/O device 23a may communicate with each other through a bus 26a, and the second CPU 21a and the second accelerator 24a may communicate with each other through a bus 27a. According to some embodiments, at least one of the first device memory 15a and the second device memory 25a may be omitted in the system 5a.

Communication based on at least one of a plurality of protocols may be performed through buses 16a, 17a, 26a, and 27a. For example, through each of the buses 16a, 17a, 26a, and 27a, information, such as initial setting, etc., may be transmitted based on a non-coherent protocol. Also, through the buses 17a and 27a, a message and/or data may be transmitted based on a coherent protocol and/or a memory protocol.

The first CPU 11a may select one of the plurality of protocols, for example, the memory protocol and the non-coherent protocol, based on a size of the data, and may access the first device memory 15a based on the selected protocol. Thus, an optimal protocol may be selected, and the latency related to the access to the first device memory 15a may be reduced. Also, the second CPU 21a may select one of the plurality of protocols, for example, the memory protocol and the non-coherent protocol, based on a size of the data, and may access the second device memory 25a based on the selected protocol. Thus, an optimal protocol may be selected, and the latency related to the access to the second device memory 25a may be reduced.

Referring to FIG. 30B, similarly to the system 5a of FIG. 30A, the system 5b may include first and second CPUs 11b and 21b, first and second DDR memories 12b and 22b, first and second I/O devices 13b and 23b, and first and second accelerators 14b and 24b, and may further include a remote memory 40. The first CPU 11b and the second CPU 21b may be connected to the remote memory 40 through buses 18b and 28b, respectively. The remote memory 40 may be used for memory expansion in the system 5b, and the buses 18b and 28b may be used as memory expansion ports. According to some embodiments, the remote memory 40 may be omitted in the system 5b.

Figure 31:
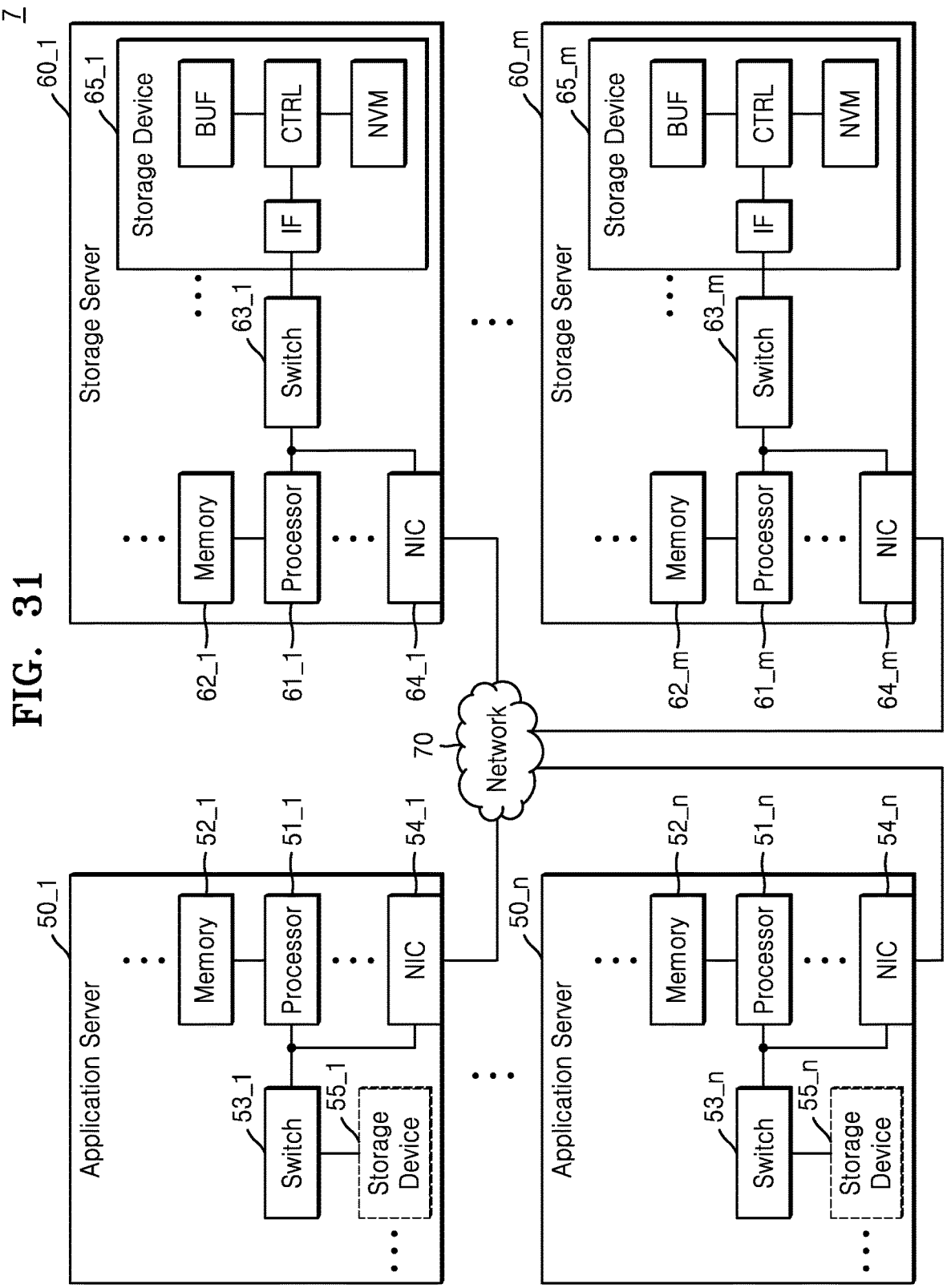
FIG. 31 is a block diagram illustrating a data center including a system according to an embodiment.

FIG. 31 is a block diagram illustrating a data center 7 including a system according to an embodiment.

Referring to FIG. 31, the data center 7 may collect various pieces of data and provide various types of services and may also be referred to as a data storage center. For example, the data center 7 may be a system for operating a search engine and a data base and may be a computing system used in a company such as a bank, etc. or a government agency. The data center 7 may include application servers 50_1 to 50_n and storage servers 60_1 to 60_m (m and n are integers greater than or equal to 1). The number of application servers 50_1 to 50_n, which is n, and the number of storage servers 60_1 to 60_m, which is m, may be variously selected according to an embodiment, and the number of application servers 50_1 to 50_n, which is n, and the number of storage servers 60_1 to 60_m, which is m, may be different from each other (m≠n).

The application server 50_1 or 50_n may include at least one of a processor 51_1 or 51_n, a memory 52_1 or 52_n, a switch 53_1 or 53_n, a network interface controller (NIC) 54_1 or 54_n, and a storage device 55_1 or 55_n. The processor 51_1 or 51_n may control general operations of the application server 50_1 or 50_n and may access the memory 52_1 or 52_n to execute instructions and/or data loaded on the memory 52_1 or 52_n. The memory 52_1 or 52_n may include, but is not limited to, DDR SDRAM, a high bandwidth memory (HBM), a hybrid memory cube (HMC), a dual in-line memory module (DIMM), an optane DIMM, or a non-volatile DIMM (NVMDIMM). According to an embodiment, the number of processors and the number of memories included in the application server 50_1 or 50_n may be variously selected. According to some embodiments, the processor 51_1 or 51_n and the memory 52_1 or 52_n may provide a processor-memory pair. According to some embodiments, the number of processors 51_1 or 51_n and the number of memories 52_1 or 52_n may be different from each other. The processor 51_1 or 51_n may include a single-core processor or a multi-core processor. According to some embodiments, the storage device 55_1 or 55_n may be omitted in the application server 50_1 or 50_n (see dotted lines illustrated in FIG. 31). The number of storage devices 55_1 or 55_n included in the application server 50_1 or 50_n may be variously selected according to an embodiment. The processor 51_1 or 51_n, the memory 52_1 or 52_n, the switch 53_1 or 53_n, the NIC 54_1 or 54_n, and/or the storage device 55_1 or 55_n may communicate with one another through the link described above with reference to the drawings.

The storage server 60_1 or 60_m may include at least one of a processor 61_1 or 61_m, a memory 62_1 or 62_m, a switch 63_1 or 63_m, an NIC 64_1 or 64_m, and a storage device 65_1 or 65_m. The processor 61_1 or 61_m and the memory 62_1 or 62_m may operate substantially the same as the processor 51_1 or 51_n and the memory 52_1 or 52_n of the application server 50_1 or 50_n described above.

The application servers 50_1 to 50_n and the storage servers 60_1 to 60_m may communicate with each other through a network 70. According to some embodiments, the network 70 may be realized by using a fibre channel (FC), the Ethernet, or the like. The FC may be a medium used for relatively high-speed data transmission and may use an optical switch providing high performance/high availability. According to an access type of the network 70, the storage servers 60_1 to 60_m may be provided as a file storage, a block storage, or an object storage.

According to some embodiments, the network 70 may be a storage-exclusive network, such as a storage area network (SAN). For example, the SAN may be an FC-SAN capable of using an FC network and realized according to an FC protocol (FCP). Alternatively, the SAN may be an IP-SAN using a TCP/IP network and realized according to an iSCSI (SCSI over TCP/IP or Internet SCSI) protocol. According to some embodiments, the network 70 may be a general network like the TCP/IP network. For example, the network 70 may be realized according to a protocol, such as an FC over the Ethernet (FCoE), a network attached storage (NAS), NVMe over fabrics (NVMe-oF), etc.

Hereinafter, the application server 50_1 and the storage server 60_1 are mainly described. However, descriptions about the application server 50_1 may be applied to other application servers (e.g., **50_*n*), and descriptions about the storage server 60_1 may be applied to other storage servers (e.g., 60_*m***).

The application server 50_1 may store data requested to be stored by a user or a client in one of the storage servers 60_1 to **60_*m* through the network 70. Also, the application server 50_1 may obtain data requested to be read by a user or a client from one of the storage servers 60_1 to 60_*m* through the network 70. For example, the application server 50_1** may be realized as a web server, a database management system (DBMS), or the like.

The application server 50_1 may access the memory **52_*n* and/or the storage device 55_*n* included in a different application server 50_*n* through the network 70 and/or may access the memories 62_1 to 62_*m* and/or the storage devices 65_1 through 65_*m* included in the storage servers 60_1 to 60_*m* through the network 70. Thus, the application server 50_1 may perform various operations on the data stored in the application servers 50_1 to 50_*n* and/or the storage servers 60_1 to 60_*m*. For example, the application server 50_1 may execute an instruction configured to move or copy data between the application servers 50_1 to 50_*n* and/or the storage servers 60_1 to 60_*m*. Here, the data may be moved from the storage devices 65_1 to 65_*m* of the storage servers 60_1 to 60_*m* to the memories 52_1 to 52_*n* of the application servers 50_1 to 50_*n*, directly or through the memories 62_1 to 62_*m* of the storage servers 60_1 to 60_*m*. According to some embodiments, the data moved through the network 70** may be data encrypted for security or privacy.

In the storage server 60_1, an interface IF may provide physical connection between the processor 61_1 and a controller CTRL and physical connection between the NIC 64_1 and the controller CTRL. For example, the interface IF may be realized as a direct attached storage (DAS) whereby the storage device 65_1 is directly connected by an exclusive cable. Also, for example, the interface IF may be realized as various interfaces, such as advanced technology attachment (ATA), serial ATA (SATA), external SATA (e-SATA), a small computer small interface (SCSI), a serial attached SCSI (SAS), peripheral component interconnection (PCI), PCI express (PCIe), NVM express (NVMe), IEEE 1394, a USB, a secure digital (SD) card, a multi-media card (MMC), an embedded multi-media card (eMMC), a universal flash storage (UFS), an embedded universal flash storage (eUFS), a compact flash (CF) card interface, etc.

In the storage server 60_1, the switch 63_1 may selectively connect the processor 61_1 with the storage device 65_1 or selectively connect the NIC 64_1 with the storage device 65_1 according to control by the processor 61_1.

According to some embodiments, the NIC 64_1 may include a network interface card, a network adaptor, etc. The NIC 64_1 may be connected to the network 70 through a wireless interface, a wired interface, a Bluetooth interface, an optical interface, etc. The NIC 64_1 may include an internal memory, a DSP, a host bus interface, etc. and may be connected to the processor 61_1 and/or the switch 63_1 through the host bus interface. According to some embodiments, the NIC 64_1 may be combined with at least one of the processor 61_1, the switch 63_1, and the storage device 65_1.

In the application servers 50_1 to **50_*n* or the storage servers 60_1 to 60_*m*, the processors 51_1 to 51_*n* and 61_1 to 61_*m* may transmit a command to the storage devices 55_1 to 55_*n* and 65_1 to 65_*m* or the memories 52_1 to 52_*n* and 62_1 to 62_*m*** to program or read data. Here, the data may be data on which error correction is performed through an error correction code (ECC) engine. The data may be data, on which data bus inversion (DBI) or data masking (DM) is processed, and may include cyclic redundancy code (CRC) information. The data may be data encrypted for security or privacy.

The storage devices 55_1 to **55_*n* and 65_1 to 65_*m* may transmit a control signal and a command/address signal to a nonvolatile memory device (NVM) (for example, a NAND flash memory device), in response to a read command received from the processors 51_1 to 51_*n* and 61_1 to 61_*m***. Accordingly, when the data is read from the NVM, a read enable signal may be input as a data output control signal and may output the data through a DQ bus. A data strobe signal may be generated by using the read enable signal. A command and address signal may be latched according to an ascending edge or a descending edge of a write enable signal.

The controller CTRL may generally control operations of the storage device 65_1. According to an embodiment, the controller CTRL may include an SRAM. The controller CTRL may write data to the NVM in response to a write command or read data from the NVM in response to a read command. For example, the write command and/or the read command may be generated based on a request provided from a host, for example, the processor 61_1 in the storage server 60_1, the processor **61_*m* in a different storage server 60_*m*, or a processor 51_1 or 51_*n* in the application server 50_1 or 50_*n*. A buffer BUF may temporarily store (buffer) the data to be written to the NVM or the data read from the NVM. According to some embodiments, the buffer BUF may include a DRAM. Also, the buffer BUF may store metadata, and the metadata may refer to user data or data generated by the controller CTRL to manage the NVM. The storage device 65_1** may include a secure element (SE) for security or privacy.

While the inventive concept has been particularly shown and described with reference to embodiments thereof, it will be understood that various changes in form and details may be made therein without departing from the spirit and scope of the following claims.

What is claimed is:

1. A device configured to communicate with a host, the device comprising:

a volatile memory including a plurality of memory cell rows; and a memory controller configured to detect, based on input row addresses accessed by the host, a pattern size of a row hammer attack pattern and a row distribution of row hammer addresses in the row hammer attack pattern; to determine, according to a type of the row distribution, whether to perform refresh management wherein the type of the row distribution includes a uniform type or non-uniform type; and for every L access corresponding to the pattern size, to provide, to the volatile memory, a refresh management command according to the refresh management and a target row address corresponding to a target memory cell row from among the plurality of memory cell rows, wherein L is an integer greater than or equal to 1.

2. The device of claim 1, wherein the memory controller includes:

an attack pattern detector configured to sequentially receive the input row addresses; based on a number of rows of a row hammer address that is attacked from among the input row addresses, to detect the pattern size of the row hammer attack pattern; based on an access number ratio of a row hammer address most attacked to a row hammer address least attacked, to detect the type of row distribution; and to output a pattern size signal indicating that the pattern size is L and a row distribution signal indicating the type of the row distribution; and a target row detector configured to sequentially receive the input row addresses; during a monitoring period during which the L input row addresses are input according to the pattern size signal, to search, as the target row address, for an input row address from among the input row addresses, the input row address being greater than a pre-row hammer address, detection of the pre-row hammer address being already completed; and in response to the row distribution signal indicating that the type of the row distribution is the uniform type, to output the refreshment management command together with the target row address.

3. The device of claim 2, wherein the attack pattern detector includes:

a plurality of tracers configured to count a number of rows of the row hammer address from the input row addresses during each of monitoring periods, limit values of the plurality of tracers are respectively set and a minimum number of accesses and a maximum number of accesses of the pre-row hammer address, the detection of the pre-row hammer address being already completed; and to output a plurality of ratio signals each indicating an access number ratio of the maximum number of accesses to the minimum number of accesses and a plurality of row number signals each indicating the number of rows;

a pattern size detector configured to receive the plurality of row number signals and to detect, as the pattern size, a minimum limit value that is set for a tracer outputting a number of rows determined to be true, from among the number of rows, to output the pattern size signal; and a distribution detector configured to receive the plurality of ratio signals and, based on the access number ratios and a reference value, to classify the type of the row distribution into the uniform type or the non-uniform type, and to output the row distribution signal.

4. The device of claim 3, wherein the plurality of tracers include:

a first tracer configured to count a first number of rows during a first monitoring period during which M input row addresses are input; to calculate a first access number ratio; and to output a first ratio signal and a first row number signal; and a second tracer configured to count a second number of rows during a second monitoring period during which K input row addresses are input; to calculate a second access number ratio; and to output a second ratio signal and a second row number signal, wherein M is an integer greater than or equal to 2, and wherein K is an integer that is greater than or equal to 2 and is different from M.

5. The device of claim 3, wherein each of the plurality of tracers includes:

a first counter configured to count a number of times the input row address is input during a monitoring period from an initial value to an individually set limit value;

a first register configured to store the pre-row hammer address;

a second register configured to store an input row address to correspond to a candidate row hammer address;

a second counter configured to count a number of times an input row address that is equal to the pre-row hammer address is input;

a flag generator configured to output a flag signal having a first bit value indicating that an input row address that is less than or equal to the pre-row hammer address is input or a second bit value indicating that an input row address that is greater than the pre-row hammer address is input;

a third counter configured to count a number of times the flag signal having the first bit value is input, and output, in response to the second bit value of the flag signal, the respective row number signal having a value indicating the number of times the flag signal having the first bit value is input;

a third register configured to store, as a minimum number of accesses, a first value counted by the third counter, the first value being less than or equal to a currently stored value of the third register; and a fourth register configured to store, as a maximum number of accesses, a second value counted by the third counter, the second value being greater than a currently stored value of the fourth register.

6. The device of claim 3, wherein the pattern size detector is configured to:

set, as a reference number, a number of rows output from a tracer having a maximum limit value from among the plurality of tracers;

by determining whether a number of rows of each tracer corresponds to the reference number, determine the number of rows of each tracer as being true or false; and select a minimum limit value from limit values of tracers outputting numbers of rows determined as true.

7. The device of claim 3, wherein the distribution detector is configured to:

calculate an average value of the access number ratios;

when the average value is less than or equal to the reference value, determine the type of the row distribution as the uniform type; and when the average value is greater than the reference value, determine the type of the row distribution as the non-uniform type.

8. The device of claim 3, wherein the distribution detector is configured to:

calculate a weighted average value of access number ratios in which different weights are reflected according to different limit values;

when the weighted average value is less than or equal to the reference value, determine the type of the row distribution as the uniform type; and when the weighted average value is greater than the reference value, determine the type of the row distribution as the non-uniform type.

9. The device of claim 3, wherein the distribution detector is configured to:

calculate a median value of the access number ratios;

when the median value is less than or equal to the reference value, determine the type of the row distribution as the uniform type; and when the median value is greater than the reference value, determine the type of the row distribution as the non-uniform type.

10. The device of claim 3, wherein the distribution detector is configured to:

obtain a maximum ratio value from among the access number ratios;

when the maximum ratio value is less than or equal to the reference value, determine the type of the row distribution as the uniform type; and when the maximum ratio value is greater than the reference value, determine the type of the row distribution as the non-uniform type.

11. The device of claim 3, wherein the distribution detector is configured to:
obtain a minimum ratio value from among the access number ratios;
when the minimum ratio value is less than or equal to the reference value, determine the type of the row distribution as the uniform type; and
when the minimum ratio value is greater than the reference value, determine the type of the row distribution as the non-uniform type.

12. The device of claim 2, wherein the target row detector includes:
a counter configured to count a number of times an input row address is input during the monitoring period;
a first register configured to store the pre-row hammer address;
a second register configured to store an input row address to correspond to a candidate target row address;
a flag generator configured to output a flag signal indicating that an input row address that is greater than the pre-row hammer address is input; and
a command address generator configured to output the input row address stored in the second register and the refresh management command in response to the row distribution signal.

13. A memory device comprising:
a memory cell array including a plurality of memory cell rows;
a row hammer management circuit configured to detect, based on active commands and input row addresses provided from a memory controller, a pattern size of a row hammer attack pattern and a row distribution of row hammer addresses in the row hammer attack pattern, and to output, for every L access corresponding to the pattern size, the row hammer address, when a type of the row distribution is a uniform type among the uniform type of a non-uniform type; and
a refresh control circuit configured to output, during a refresh operation, based on the row hammer address, a target row address corresponding to a target memory cell row from among the plurality of memory cell rows,
wherein L is an integer greater than or equal to 1.

14. The memory device of claim 13, wherein the row hammer management circuit includes:
an attack pattern detector configured to sequentially receive the input row addresses; based on a number of rows of a row hammer address that is attacked from among the input row addresses, to detect the pattern size of the row hammer attack pattern; and based on an access number ratio of a row hammer address most attacked to a row hammer address least attacked, to detect the row distribution; and
a target row detector configured to sequentially receive the input row addresses; and during a monitoring period during which the L input row addresses are input according to a pattern size signal, to search for an input row address from among the input row addresses, the input row address being greater than a pre-row hammer address, detection of the pre-row hammer address being already completed.

15. The memory device of claim 14, wherein the attack pattern detector includes:
a plurality of tracers configured to count a number of rows of the row hammer address from the input row addresses during each of monitoring periods, limit values of the plurality of tracers are respectively set and a minimum number of accesses and a maximum number of accesses of the pre-row hammer address, the detection of the pre-row hammer address being already completed; and to output a plurality of ratio signals each indicating an access number ratio of the maximum number of accesses to the minimum number of accesses and a plurality of row number signals each indicating the number of rows;
a pattern size detector configured to receive the plurality of row number signals and to detect, as the pattern size, a minimum limit value that is set for a tracer outputting a number of rows determined to be true from among the number of rows; and
a distribution detector configured to determine, based on the access number ratios and a reference value, the type of the row distribution.

16. The memory device of claim 14, wherein the target row detector includes:
a counter configured to count a number of times an input row address is input, during the monitoring period;
a first register configured to store the pre-row hammer address;
a second register configured to store an input row address to correspond to a candidate row hammer address;
a flag generator configured to output a flag signal indicating that an input row address that is greater than the pre-row hammer address is input; and
a command address generator configured to output the input row address stored in the second register according to a type of the detected row distribution.

17. A compute express link (CXL) memory expansion device configured to communicate with a host processor through a non-coherent protocol and a memory access protocol, the CXL memory expansion device comprising:
a volatile memory including a plurality of memory cell rows; and
a CXL memory controller configured to detect, based on input row addresses accessed by the host processor, a pattern size of a row hammer attack pattern and a row distribution of row hammer addresses in the row hammer attack pattern; to determine, according to a type of the row distribution, whether to perform refresh management, wherein the type of the row distribution is a uniform type or a non-uniform type; and for every L access corresponding to the pattern size, to provide, to the volatile memory, a refresh management command according to the refresh management and a target row address corresponding to a target memory cell row from among the plurality of memory cell rows,
wherein L is an integer greater than or equal to 1.

18. The CXL memory expansion device of claim 17, wherein the CXL memory controller includes:
an attack pattern detector configured to sequentially receive the input row addresses; based on a number of rows of a row hammer address that is attacked from among the input row addresses, to detect the pattern size of the row hammer attack pattern; based on an access number ratio of a row hammer address most attacked to a row hammer address least attacked, to detect the row distribution; and to output a pattern size signal indicating that the pattern size is L and a row distribution signal indicating the type of the row distribution; and a target row detector configured to sequentially receive the input row addresses; during a monitoring period during which the L input row addresses are input according to the pattern size signal, to search, as the target row address, for an input row address from among the input row addresses, the input row address being greater than a pre-row hammer address, detection of the pre-row hammer address being already completed; and in response to the row distribution signal indicating that the type of the row distribution is the uniform type, to output the refreshment management command together with the target row address.

19. The CXL memory expansion device of claim 18, wherein the attack pattern detector includes:

a plurality of tracers configured to count a number of rows of the row hammer address from the input row addresses during each of monitoring periods, limit values of the plurality of tracers are respectively set and a minimum number of accesses and a maximum number of accesses of the pre-row hammer address, the detection the pre-row hammer address being already completed; and to output a plurality of ratio signals each indicating an access number ratio of the maximum number of accesses to the minimum number of accesses and a plurality of row number signals each indicating the number of rows;

a pattern size detector configured to receive the plurality of row number signals and to detect, as the pattern size, a minimum limit value that is set for a tracer outputting a number of rows determined to be true from among number of rows to output the pattern size signal; and a distribution detector configured to receive the plurality of ratio signals and, based on the access number ratios and a reference value, to classify the type of the row distribution into the uniform type or the non-uniform type, and to output the row distribution signal.

20. The CXL memory expansion device of claim 19, wherein the plurality of tracers include:

a first tracer configured to: count a first number of rows during a first monitoring period during which M input row addresses are input; to calculate a first access number ratio; and to output a first ratio signal and a first row number signal; and a second tracer configured to: count a second number of rows during a second monitoring period during which K input row addresses are input; to calculate a second access number ratio; and to output a second ratio signal and a second row number signal, wherein M is an integer greater than or equal to 2, and wherein K is an integer that is greater than or equal to 2 and is different from M.

\* \* \* \* \*